US011560733B2

(12) United States Patent
Volin

(10) Patent No.: US 11,560,733 B2
(45) Date of Patent: Jan. 24, 2023

(54) TEN-DEVICE-IN-ONE RECONFIGURABLE ADJUSTABLE CARPORT, CAPABLE OF FUNCTIONING AS PRIVACY SCREEN, WIND SCREEN, CABANA, DOG RUN, RETAIL-TRADESHOW BOOTH, ATTIC, STORAGE, PICNIC TABLE, KENNEL, AND CARPORT

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 365 days.

(21) Appl. No.: 16/938,978

(22) Filed: Jul. 26, 2020

(65) Prior Publication Data
US 2021/0054646 A1    Feb. 25, 2021

Related U.S. Application Data

(60) Provisional application No. 62/891,272, filed on Aug. 23, 2019.

(51) Int. Cl.
*E04H 6/02* (2006.01)
*E04H 15/30* (2006.01)
(Continued)

(52) U.S. Cl.
CPC ............ *E04H 15/30* (2013.01); *A01G 9/14* (2013.01); *A01K 1/02* (2013.01); *A01K 1/03* (2013.01);
(Continued)

(58) Field of Classification Search
CPC ....... E04H 15/30; E04H 15/005; E04H 15/02; E04H 15/64; E04H 15/44; E04H 15/58;
(Continued)

(56) References Cited

U.S. PATENT DOCUMENTS 1,374,300 A    4/1921   Henry
1,961,915 A    6/1934   Salmen, Jr.
(Continued)

FOREIGN PATENT DOCUMENTS

WO    WO-2016087659 A1 *    6/2016    ............. E04H 17/14

*Primary Examiner* — Robert Canfield

(57) ABSTRACT

A ten-device-in-one reconfigurable adjustable carport (capable of functioning as a privacy screen, a wind screen, a cabana, a dog run, a retail-tradeshow booth, an attic, a storage, a picnic table, a kennel, and a carport) comprises: a canopy, roof spines, roof ribs, leg posts, T-shaped joiners and X-shaped joiners spring-snappingly connected to the roof spines and roof ribs and leg posts for configuring the ten-device-in-one carport as a car canopy and a greenhouse and an enclosure and a barrier and a cabana and a privacy room and a privacy screen and a tradeshow booth and a wind barrier, panels, door-frame panel, panel-to-panel-securing brackets and panel-to-post-securing brackets bolted to the panels and the door-frame panel and the roof spines and the roof ribs and the leg posts for configuring the ten-device-in-one carport as a dog run and a greenhouse and an enclosure and a barrier and bleacher shelves to store or display items and an attic to store items off the ground and a hanging cage to house animals off the ground and structures for displaying signs and roof storage, and bracket heads formed into the panel-to-post-securing brackets for automatically centering the bracket-head ends.

20 Claims, 55 Drawing Sheets

(51) Int. Cl.

| | | |
|---|---|---|
| A01K 1/03 | (2006.01) | |
| E04H 1/12 | (2006.01) | |
| E04B 1/343 | (2006.01) | |
| E04H 15/02 | (2006.01) | |
| E04H 15/00 | (2006.01) | |
| E04H 15/64 | (2006.01) | |
| E04H 17/10 | (2006.01) | |
| E04H 17/02 | (2006.01) | |
| E04H 17/18 | (2006.01) | |
| A01K 1/02 | (2006.01) | |
| A47B 43/04 | (2006.01) | |
| A47B 47/02 | (2006.01) | |
| A47B 47/00 | (2006.01) | |
| A47B 47/03 | (2006.01) | |
| A01G 9/14 | (2006.01) | |
| A47B 85/06 | (2006.01) | |
| E04H 15/44 | (2006.01) | |
| A47B 3/06 | (2006.01) | |

(52) U.S. Cl.
CPC ............ *A01K 1/034* (2013.01); *A47B 43/04* (2013.01); *A47B 47/0025* (2013.01); *A47B 47/0091* (2013.01); *A47B 47/02* (2013.01); *A47B 47/021* (2013.01); *A47B 47/03* (2013.01); *A47B 85/06* (2013.01); *E04H 1/1222* (2013.01); *E04H 1/1244* (2013.01); *E04H 1/1272* (2013.01); *E04H 6/025* (2013.01); *E04H 15/003* (2013.01); *E04H 15/005* (2013.01); *E04H 15/02* (2013.01); *E04H 15/44* (2013.01); *E04H 15/64* (2013.01); *E04H 17/124* (2021.01); *E04H 17/127* (2021.01); *E04H 17/18* (2013.01); *A47B 3/06* (2013.01); *Y10S 135/902* (2013.01); *Y10S 135/906* (2013.01)

(58) Field of Classification Search
CPC ..... E04H 1/1222; E04H 1/1272; E04H 6/025; E04H 17/127; E04H 17/18; E04H 17/185; E04H 15/003; E04H 1/1244; A01K 1/03; A01K 1/02; A01K 1/034; A01G 9/14; E04B 2001/3247; E04B 2001/3252; A47B 47/0025; A47B 47/03; A47B 43/04; A47B 47/0091; A47B 47/02; A47B 47/021; Y10S 135/902; Y10S 135/906
USPC .... 52/36.2, 584.1, 654.1, 655.1; 135/87, 96, 135/121, 122, 158, 160, 119, 120.1, 135/120.3, 902, 906; 256/41, 47, 54, 256/65.02–65.6; 211/182; 403/234, 235, 403/385, 389, 396; 47/17
See application file for complete search history.

(56) References Cited

U.S. PATENT DOCUMENTS

| | | | | |
|---|---|---|---|---|
| 2,135,961 | A | | 11/1938 | Chenoweth |
| 2,513,729 | A | | 7/1950 | Lemen |
| 3,212,512 | A | | 10/1965 | Morris |
| 3,424,178 | A | * | 1/1969 | Yazaki ................ E04B 1/34326 |
| | | | | 135/160 |
| 3,604,687 | A | * | 9/1971 | Moore ................ E04H 17/1413 |
| | | | | 256/65.03 |
| 3,820,909 | A | * | 6/1974 | Schindler et al. .. E04H 17/1413 |
| | | | | 403/205 |
| 3,969,869 | A | | 7/1976 | Partridge |
| 3,993,288 | A | * | 11/1976 | Pfarr, Jr. ................ E04H 17/10 |
| | | | | 24/369 |
| 4,066,089 | A | | 1/1978 | Rainwater |
| 4,793,371 | A | * | 12/1988 | O'Ferrell ................ E04H 15/44 |
| | | | | 135/160 |
| 4,944,321 | A | | 7/1990 | Moyet-Ortiz |
| 5,069,238 | A | | 12/1991 | Marks |
| 5,100,108 | A | * | 3/1992 | Schultz ..................... E04H 3/12 |
| | | | | 256/73 |
| 5,116,256 | A | * | 5/1992 | Allen ..................... A01K 1/034 |
| | | | | 119/458 |
| 5,117,853 | A | * | 6/1992 | Pruesner ................ E04H 15/58 |
| | | | | 24/698.3 |
| 5,167,246 | A | | 12/1992 | Mortenson |
| 5,263,507 | A | | 11/1993 | Chuang |
| 5,396,861 | A | * | 3/1995 | Acker ..................... B63B 17/02 |
| | | | | 114/361 |
| 5,584,311 | A | | 12/1996 | Schaefer |
| 5,638,851 | A | | 6/1997 | Baldwin |
| 5,730,281 | A | * | 3/1998 | Powell ................... B65D 5/5028 |
| | | | | 206/443 |
| 5,961,242 | A | * | 10/1999 | Leone ....................... F16B 2/08 |
| | | | | 248/230.1 |
| 6,047,513 | A | | 4/2000 | Gibson |
| 6,098,335 | A | | 8/2000 | Brown, Jr. |
| 6,112,756 | A | * | 9/2000 | Tseng ..................... E04H 15/44 |
| | | | | 135/124 |
| 6,155,280 | A | * | 12/2000 | Powell ................... E04H 15/644 |
| | | | | 135/124 |
| 6,170,503 | B1 | * | 1/2001 | Lin Shy .................. E04H 15/64 |
| | | | | 135/121 |
| 6,260,308 | B1 | | 7/2001 | Looney |
| 6,263,895 | B1 | * | 7/2001 | Bang ....................... E04H 15/44 |
| | | | | 135/138 |
| 6,266,932 | B1 | | 7/2001 | Van Tassel |
| 6,502,593 | B1 | | 1/2003 | Stafford |
| 6,618,988 | B2 | | 9/2003 | Williams |
| 6,666,223 | B2 | * | 12/2003 | Price ....................... E04H 15/50 |
| | | | | 135/147 |
| 6,779,782 | B1 | * | 8/2004 | Webb ..................... E04F 11/1817 |
| | | | | 256/65.01 |
| D512,477 | S | * | 12/2005 | Diaz ............................ D21/839 |
| 7,021,694 | B1 | * | 4/2006 | Roberts ..................... B60P 3/39 |
| | | | | 5/118 |
| 7,275,555 | B2 | | 10/2007 | Powell |
| 7,654,277 | B1 | | 2/2010 | Brewer |
| 7,743,781 | B2 | * | 6/2010 | Slaughter ............... E04H 15/001 |
| | | | | 135/117 |
| 7,770,591 | B2 | * | 8/2010 | Tseng ..................... E04H 15/44 |
| | | | | 135/157 |
| 7,946,306 | B2 | | 4/2011 | Ampoyo |
| 8,141,517 | B2 | | 3/2012 | Shimoda |
| 8,171,947 | B2 | | 5/2012 | Hardie |
| 8,375,969 | B2 | | 2/2013 | McCarty, Sr. |
| 8,438,995 | B1 | * | 5/2013 | Donahue ................. A01K 1/00 |
| | | | | 119/512 |
| 8,959,840 | B1 | * | 2/2015 | Oxley ....................... F21S 4/10 |
| | | | | 210/170.03 |
| 8,959,841 | B1 | * | 2/2015 | Reese .................... E04D 13/076 |
| | | | | 52/12 |
| 8,967,554 | B2 | * | 3/2015 | Gramling ............. E04D 13/0725 |
| | | | | 52/12 |
| 8,997,403 | B1 | * | 4/2015 | Steinberg ................ F16M 13/02 |
| | | | | 52/12 |
| 9,003,714 | B2 | * | 4/2015 | Vance ................... E04D 13/072 |
| | | | | 52/12 |
| 9,010,030 | B2 | * | 4/2015 | Davis .................... E04D 13/076 |
| | | | | 52/12 |
| 9,021,747 | B2 | * | 5/2015 | Lenney ................. E04D 13/076 |
| | | | | 52/12 |
| 9,021,748 | B2 | * | 5/2015 | Nelson .................. E04D 13/076 |
| | | | | 52/12 |
| 9,038,320 | B1 | * | 5/2015 | Deakins .................. E04D 13/08 |
| | | | | 52/12 |
| 9,163,394 | B1 | * | 10/2015 | Barker ...................... E04B 1/40 |
| 9,309,690 | B1 | * | 4/2016 | Payne ................... E04H 17/1447 |
| 9,482,025 | B2 | | 11/2016 | Ludlow |
| 9,556,640 | B2 | * | 1/2017 | Levin ..................... E04B 1/3416 |
| 9,869,110 | B2 | * | 1/2018 | Krenzel ................. E04H 15/50 |
| D826,428 | S | | 8/2018 | Schuette |

(56) References Cited

U.S. PATENT DOCUMENTS

| | | | |
|---|---|---|---|
| 10,119,296 B2 | 11/2018 | Deal | |
| 10,294,691 B1 | 5/2019 | Goncher | |
| 10,344,494 B2* | 7/2019 | Volin | E04H 15/48 |
| 11,225,810 B2* | 1/2022 | Bacon | E04H 17/165 |
| 2003/0084934 A1* | 5/2003 | Goldwitz | E04H 15/322 |
| | | | 135/158 |
| 2003/0101677 A1* | 6/2003 | Hewett | E04H 15/06 |
| | | | 52/16 |
| 2004/0040590 A1* | 3/2004 | Powell | E04H 15/44 |
| | | | 135/128 |
| 2004/0118443 A1 | 6/2004 | Powell | |
| 2006/0157099 A1* | 7/2006 | Park | E04H 15/64 |
| | | | 135/123 |
| 2007/0079855 A1* | 4/2007 | Li | E04H 15/44 |
| | | | 135/117 |
| 2008/0038048 A1* | 2/2008 | Pingel | F16B 41/002 |
| | | | 403/24 |
| 2012/0117866 A1 | 5/2012 | Garbos | |
| 2012/0223283 A1* | 9/2012 | Kobayashi | A01K 1/034 |
| | | | 256/26 |
| 2013/0125946 A1 | 5/2013 | Bourdon | |
| 2013/0276382 A1* | 10/2013 | Workman | E04B 1/34315 |
| | | | 52/63 |
| 2014/0083000 A1* | 3/2014 | DeMerchant, Jr. | A01G 9/14 |
| | | | 47/17 |
| 2014/0231739 A1* | 8/2014 | Marron | E04H 17/1417 |
| | | | 256/65.04 |
| 2016/0108640 A1* | 4/2016 | Graber | E04H 17/1447 |
| | | | 256/65.03 |
| 2016/0157456 A1* | 6/2016 | Volin | A01K 1/03 |
| | | | 119/501 |
| 2017/0112075 A1* | 4/2017 | DeMerchant, Jr. | A01G 9/247 |
| 2017/0284117 A1* | 10/2017 | Volin | E04H 15/46 |
| 2019/0040640 A1* | 2/2019 | Rainville | E04G 21/3233 |
| 2019/0208741 A1* | 7/2019 | Huthmaker | A01K 1/034 |
| 2022/0205273 A1* | 6/2022 | Vingerhoets | E04H 17/20 |

* cited by examiner

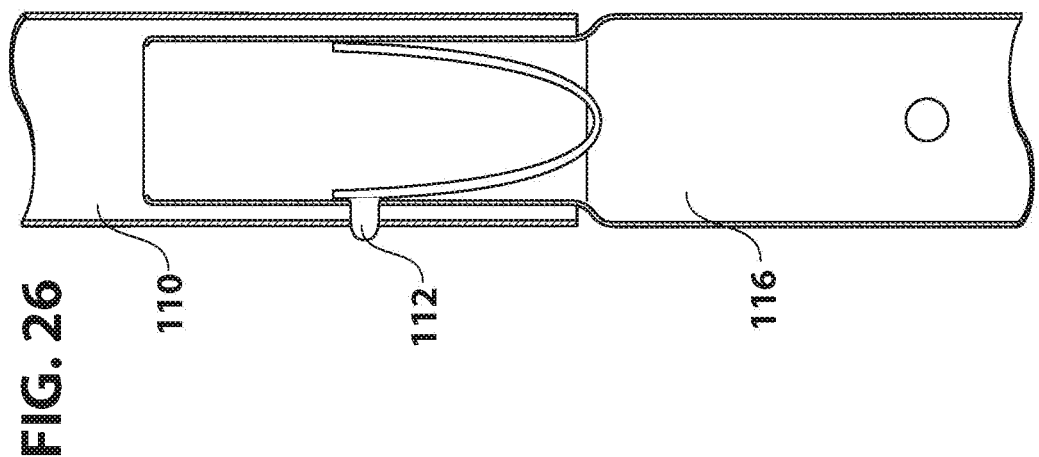
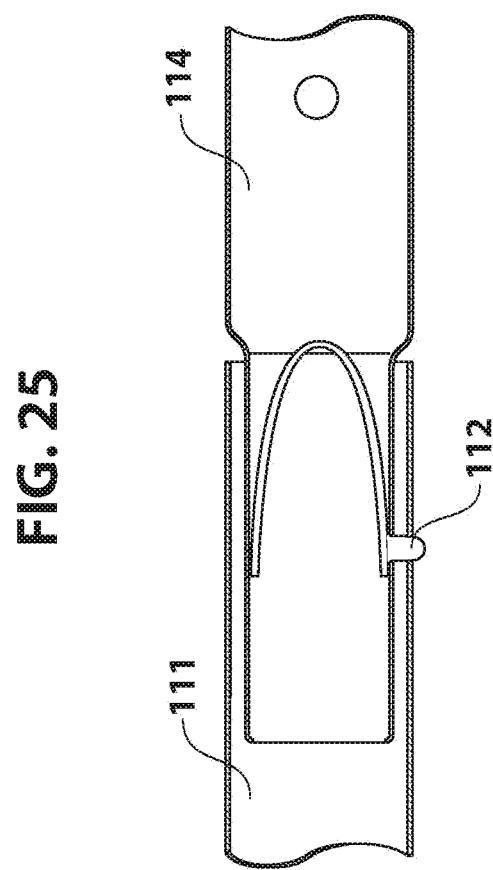

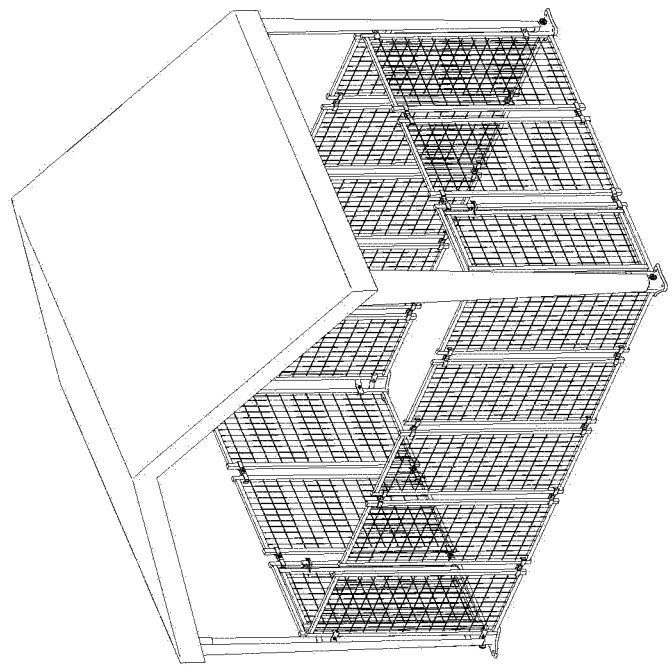
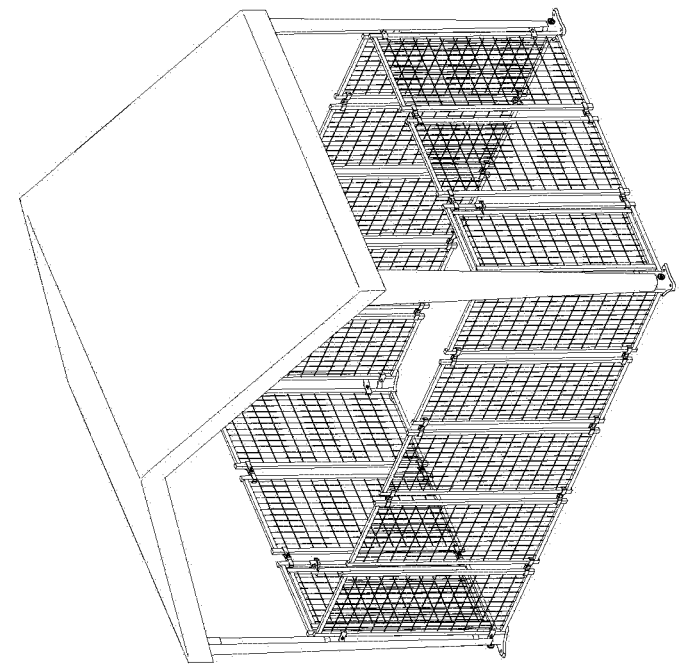
FIG. 56

TEN-DEVICE-IN-ONE RECONFIGURABLE ADJUSTABLE CARPORT, CAPABLE OF FUNCTIONING AS PRIVACY SCREEN, WIND SCREEN, CABANA, DOG RUN, RETAIL-TRADESHOW BOOTH, ATTIC, STORAGE, PICNIC TABLE, KENNEL, AND CARPORT

REFERENCE TO PREVIOUSLY FILED PROVISIONAL PATENT APPLICATION

Provisional Patent Application Number 62,891,272 was filed on Aug. 23, 2019.

1. Field of the Invention

The present invention relates to a ten-device-in-one carport, which is cheap to produce, is easy to ship as one unit, can quickly and easily be assembled and disassembled, and can quickly and be easily folded and unfolded. Particularly, the present invention relates to a ten-device-in-one reconfigurable adjustable carport (capable of functioning as a privacy screen, a wind screen, a cabana, a dog run, a retail-tradeshow booth, an attic, a storage, a picnic table, a kennel, and a carport) comprising:
1) Reversible multi-function carport privacy-screen windscreen cabana retail-booth canopy system,
2) Tension-locking bungee-ball system,
3) Multi-configurable multi-function articulated canopy frame system, and
4) Multi-configurable kennel cabana wind-barrier privacy-screen privacy-room dog-run shelf attic cage table sign panel system.

2. DESCRIPTION OF THE PRIOR ART

A number of carports have been introduced.

U.S. Pat. No. 1,374,300 issued 1921 Apr. 12, to Rene Achille Henry, demonstrates a certain number of similar trusses, the constituent parts of which have been designed and connected together in such a way as to form a unit and at the same time admitting of being folded up and thrown back on to one another for the transport or of being opened out instantaneously when being pitched, all for the purpose of remedying the defects that have just been mentioned.

U.S. Pat. No. 1,961,915 issued 1934 Jun. 5, to Fred Salmen Jr., demonstrates a tent frame, which embodies a series of foldable sections adapted to be readily assembled to form a support for a tent of the box type equipped with a gable roof. Another object is to provide a tent frame which is so formed as to afford, when assembled, an unobstructed floor space throughout the interior of the tent, and in which the parts are so arranged as to be thoroughly braced and thereby provide a strong and substantial structure.

U.S. Pat. No. 2,135,961 issued 1938 Nov. 8, to Elijah P. Chenoweth, demonstrates an improved tent supporting frame, which is adapted to be partially collapsed to facilitate the application of the tent canvas thereto and to then be raised beneath the canvas and at the same time become automatically adjusted under the canvas to draw the same tightly into position.

U.S. Pat. No. 2,513,729 issued 1950 Jul. 4, to Charles W. Lemen, demonstrates a tent, which is a structure that is essentially temporary in character. It is ordinarily placed over a grave after the latter has been dug and is designed not only to shelter the minister or other party conducting the burial services. The tents are usually removed a short time subsequent to the lowering of the coffin.

U.S. Pat. No. 3,212,512 issued 1965 Oct. 19, to Lowell H. Morris, demonstrates a novel tent peg, which, when projected through the grommet in the bottom flange of a tent and driven into the ground, securely holds such grommet and bottom flange against the ground. Another important object of the invention is to provide a tent peg, as above, which includes a head that remains clear of the grommet a sufficient distance to enable a peg withdrawing or pulling tool to be engaged under sch head without the possibility of damaging the grommet or the bottom flange of the tent.

U.S. Pat. No. 3,969,869 issued 1976 Jul. 20, to Arthur F. Partridge, demonstrates trusses for static structures, which comprises a framework of structural members forming peaked or extended trusses. Truss components can be prefabricated to provide compact, easily assembled components for trusses in residential and commercial buildings. Peaked and extended scissors trusses can also be assembled from prefabricated, interlocking truss components to provide integrally supported, peaked and extended scissors trusses. Static structures and building modules comprising the trusses are described.

U.S. Pat. No. 4,066,089 issued 1978 Jan. 3, to Orman M. Rainwater, demonstrates a pair of composite frame sections corresponding, generally, to front and back walls of the shelter. The front and back frame sections are held in spaced relationship by struts that themselves may be foldable as by a retractable splint structure. The struts are external of the fabric or other flexible walls forming the shelter and all of the frame elements remain connected to the companion elements when the structure is collapsed. In a tent configuration, the front and rear frame sections each include rafters that pivotally connect together to form a weather stable arrangement even absent a ridge pole.

U.S. Pat. No. 4,944,321 issued 1990 Jul. 31, to Francisco Moyet-Ortiz, demonstrates a combination portable vehicle garage and tent structure incorporating support members, which in the garage mode are retained under the wheels of the vehicle which support members have a framework of support poles and cross members with a cover to shelter the vehicle which structure, when a vehicle is not positioned therein, can be utilized as a tent.

U.S. Pat. No. 5,069,238 issued 1991 Dec. 3, to Lloyd A. Marks, demonstrates a pivotable joint and a joint locking mechanism for a foldable frame apparatus, which are disclosed. The joint comprises mating male and female joint members mounted to the ends of tubular frame members and pivotably connected together to form oppositely articulatable joints of a foldable frame useful for tent enclosures and the like. A one-piece joint locking mechanism made of wire is provided for locking the joint in its erected or folded positions.

U.S. Pat. No. 5,167,246 issued 1992 Dec. 1, to Carl N. Mortenson, demonstrates a rapidly erectable four cornered shelter frame for use with a canvas top, which has a pair of foldable end frame members with corner posts and an end joint at the upper end of each having a pair of upwardly inclined end rafters connected by an end ridge joint which has a ridge member projecting perpendicularly to the rafters. A foldable intermediate frame member has ground support posts with side joints at the upper ends having a pair of upwardly inclined intermediate rafters connected by an intermediate ridge joint to which each of the end frame members also connects.

U.S. Pat. No. 5,263,507 issued 1993 Nov. 23, to Ching-Pao Chuang, demonstrates a collapsible tent frame, which has two side frames connected with three lengthwise connecting tubes and four lengthwise locating tubes, each side frame consisting of two sloping-down top tubes connected with an angle-adjustable joint, two intermediate tubes connected with a one-direction adjustable joint to keep an upper tube sloping down and a lower tube upright and two leg tubes respectively connected with an upright tube of the intermediate tubes, which is connected with one of the sloping-down tubes, each leg tube having a caster to stand and move on the ground, the caster having a fixing pedal for securing it on something to keep it immovable.

U.S. Pat. No. 5,584,311 issued 1996 Dec. 17, to Gary Schaefer, demonstrates an internal, self-supporting tent support framework. The collapsible framework includes a number of side and ridge support poles which mount to radially adjustable pole couplers. The couplers retain the support poles at preferred angular orientations in multiple wall planes as a support skeleton for an overlying fabric cover. Each coupler includes a pair of cast sleeves wherein a body piece includes a longitudinal bore, a projecting wing arm and a pair of hinge arms having transverse bores. A horizontal pole couples the hinge arms together in one plane, as a pair of other poles are supported to the longitudinal bores in a second plane at a splay angle established by the wing arms.

U.S. Pat. No. 5,638,851 issued 1997 Jun. 17, to David Baldwin, demonstrates a modular shelter, which comprises a framework for supporting a cover sheet, the framework including at least two frames each composed of an upward curved arch having two ends, two upstanding legs, each leg having an upper end connected to a respective end of said arch by means of respective upward angled connecting members, each arch end attached to a respective upper end of said legs, each leg having a bottom end, and anchoring means for anchoring the bottom end of each leg to ground.

U.S. Pat. No. 5,730,281 issued 1998 Mar. 24, to Billy R. Powell, demonstrates a plurality of elongated pipes and a series of corner connectors and a package for containing the various kit components. An elongated container is provided and the various components of the kit, including the corner connectors and pipes, are disposed within the container such that the components of the kit structurally reinforce the total package and wherein the individual corner connectors are strategically disposed throughout the package so as to support the elongated pipes.

U.S. Pat. No. 6,047,513 issued 2000 Apr. 11, to J. W. Gibson, demonstrates a construction system for building a steel frame using steel members. Rafters form a roof portion of the steel frame, and a ceiling joist having two ends forms a ceiling portion of the steel frame. Compression webs and tension webs, disposed between the rafters and the ceiling joists, distribute the load between the rafters and the ceiling joists. The tension webs are disposed between the rafters, the ceiling joists, and the compression webs, and inhibit distortion of the roof. A peak bracket connects two rafters and a compression web together.

U.S. Pat. No. 6,098,335 issued 2000 Aug. 8, to Burgess J. Brown Jr., demonstrates a portable greenhouse. When assembled, the greenhouse of the present invention comprises a frame constructed of tubular members over which a covering is fit. In its unassembled form, the greenhouse components may be packaged in a standard corrugated paper container, wherein selected components of the greenhouse form a rigid internal frame that provides strength and support to the container.

U.S. Pat. No. 6,112,756 issued 2000 Sep. 5, to Chuen-Jong Tseng, demonstrates a covering frame for supporting a canopy above a ground surface, which includes a plurality of legs adapted to extend uprightly from the ground surface, and a canopy support frame mounted on top of the legs. The canopy support frame includes at least one pair of parallel support rods having lower ends mounted on the legs and upper ends, an upper horizontal bar interconnecting the upper ends of the support rods, a lower horizontal bar parallel to the upper horizontal bar and interconnecting the lower ends of the support rods, and a supplementary canopy support member extending transversely between the support rods.

U.S. Pat. No. 6,170,503 issued 2001 Jan. 9, to Mei-Mei Lin Shy, demonstrates a waterproof shelter, which includes a frame having two elongated first sides and two short second sides, a canopy mounted on the top of the frame and having two elongated first sides and two short second sides, two elongated side panels each mounted on one of the two first sides of the frame and each having a top side securely bonded to one of the two first sides of the canopy by means of a heat welding process, two end connecting panels each having a first side and a second side, the first side securely bonded to one of the two second sides of the canopy by means of a heat welding process, and at least one auxiliary sheltering panel mounted on one of the two second sides of the frame, and having a top side secured to the second side of one of the two end connecting panels.

U.S. Pat. No. 6,260,308 issued 2001 Jul. 17, to Donald F. Looney, demonstrates a mechanism for covering a greenhouse, which has rotating shaft upon which a flexible cover is wound. The shaft travels along an arch or bow truss with the cover being wound upon or released from the shaft to uncover or cover the greenhouse. Two rotating shafts are provided on opposite sides of the roof ridge and each are attached to two sets of cables. One set of cables serving to pull the covers and a second set serving to apply tension to the covers during the covering and uncovering process.

U.S. Pat. No. 6,266,932 issued 2001 Jul. 31, to Harry Norman Van Tassel, demonstrates (a) a rigid, spaced apart, parallel array of arches, each lying in a vertical plane and spaced apart along a longitudinal axis, wherein each arch is formed of a unitary generally semi-circular bow member having rigid bracing members mountable thereto within a perimeter of the bow member, and (b) a rigid, spaced apart, substantially parallel array of cross-bracing bows mountable to the array of arches so as to be generally perpendicular to each arch, the array of cross-bracing bows radially spaced apart about a center of curvature of each arch in the array of arches.

U.S. Pat. No. 6,502,593 issued 2003 Jan. 7, to Robert M. Stafford, demonstrates a method of erecting a tent, which comprises two or more beam assemblies is provided. Each of the beam assemblies comprises a roof portion and a pair of legs for supporting the roof portion. A number of base members are secured to the ground at predetermined locations. The roof portions are pivotally connected to the base members and rotated upwardly from the ground while maintaining the connection to the base members. A first side of each of the roof portions is disconnected from an associated one of the base members and raised above the base member. A first leg is connected to the first side. The first leg is then connected to the base member. A second side of each of the roof portions is disconnected from an associated one of the base members and raised above the base member.

U.S. Pat. No. 6,618,988 issued 2003 Sep. 16, to David Allen Williams, demonstrates a rectangular base frame, which supports a plurality of vertical tubes, which, in turn, support a rectangular gable-type roof frame. Some of the tube-to-fitting couplings are friction-fit connections, some are glued connections and others are quick connect/disconnect connections for rapid assembly and disassembly of the greenhouse. A poly cover includes a center portion which extends from the base frame over the vertical tubes and the gabled roof frame and is coupled thereto by quick-connect/disconnect retainers, and a pair of end portions are releasably connected to respective ends of the center portion by double-pull zippers having box and pin connectors for variable, regulated ventilation and complete removal of the end portions.

U.S. Pat. No. 6,666,223 issued 2003 Dec. 23, to Walter L. Price, demonstrates a collapsible frame for use in erecting tents, canopies and the like at outdoor venues, which includes a plurality of telescopic legs for providing vertical structural support, and a plurality of top corner joints each fixedly mounted upon a top end of a corresponding telescopic leg. A leg slider joint is adjustably mounted upon each telescopic leg for sliding along that telescopic leg. A truss pair of link members is mounted to a pair of top corner joints and to a corresponding pair of leg slider joints mounted on adjacent pairs of telescopic legs for providing a scissors connector.

U.S. Pat. No. 7,275,555 issued 2007 Oct. 2, to Billy R. Powell, demonstrates a canopy of the type that is typically packaged in a kit form that permits consumers to assemble a group of pipe members into a canopy structure. Once assembled and erected, the canopy includes a series of vertical posts and a series of rafters that extend upwardly from the post. In order to provide additional structural support, especially to the rafters and to the roof structure formed by the rafters, a series of cross or brace members are interconnected between the vertical posts and the rafters. These cross or brace members are arranged in sets with each set including two brace members that extend between a pair of vertical posts and a pair of rafters.

U.S. Pat. No. 7,654,277 issued 2010 Feb. 2, to Don C. Brewer, demonstrates a portable shade. An illustrative embodiment of the portable shade includes a canopy; a plurality of generally elongated, curved, spaced-apart tent poles carried by the canopy; and a plurality of anchor units receiving the plurality of tent poles, respectively. Each of the anchor units comprises an anchor plate, a striker plate pivotally carried by the anchor plate and a pole receptacle pivotally carried by the striker plate and receiving a corresponding one of the tent poles.

U.S. Pat. No. 7,770,591 issued 2010 Sep. 10, to Chuen-Jong Tseng, demonstrates a tent frame, which includes two main supporting units, a connecting rod unit interconnecting the main supporting units, and two oblique supporting units. Each main supporting unit includes two foot rods, first and second corner connectors mounted respectively on the foot rods, an intermediate connector, a first supporting rod interconnecting the first corner connector and a first rod connecting portion of the intermediate connector, and a second supporting rod interconnecting the second corner connector and a second rod connecting portion of the intermediate connector.

U.S. Pat. No. 7,946,306 issued 2011 Apr. 24, to Geoffrey Ampoyo, demonstrates a portable shelter that attaches to the outsides of the tires of the vehicle, as opposed to the body or wheel hubs of the vehicle. The shelter includes a canopy attached to an upper end of at least one mast, and a mast base that is attached to a lower end of the mast. The mast base comprises a threaded bolt, a plate having a threaded opening for receiving the bolt therethrough, and a holder for receiving a lower end of the bolt. The base also includes a plurality of arms that each have a first end attached to the holder and a second end attached to a hook.

U.S. Pat. No. 8,141,517 issued 2012 Mar. 27, to Naoki Shimoda, demonstrates a pet pen for housing a pet, which is provided. The pet pen comprises a plurality of enclosing members with each enclosing member having a wall body and an opening end. The enclosing members form the pen by overlapping a portion of the wall body at two or more of the opening ends, and the pen width can be adjusted by adjusting the length of the overlapping portion. The pen width can be adjusted without removing an enclosing member.

U.S. Pat. No. 8,171,947 issued 2012 May 8, to Leslie Glenn Hardie, demonstrates a car cover apparatus, which has a frame, a plurality of ribs moveably attached to the frame, and a cover attached to the plurality of ribs. Movement of the ribs allow the car cover to be opened and closed. When the ribs are pulled apart, the cover is expanded to cover an automobile. When the ribs are compressed, the user can access the automobile parked within the car cover. According to certain embodiments of the invention, the car cover can be motor-driven and operated by remote control.

U.S. Pat. No. 8,375,969 issued 2013 Feb. 19, to Michael Duane McCarty Sr., demonstrates a canopy, that can be used in the area around a campfire for shelter during adverse weather conditions. The canopy includes a frame, a cover having a centrally located opening support by the frame, and a set of legs supporting the frame with the cover in an elevated position. The frame is constructed with a set of trusses which interconnect a lower support frame and an upper support frame. The trusses and support members are assembled such that the central opening remains unobstructed.

U.S. Pat. No. 9,482,025 issued 2016 Nov. 1, to Brian J. Ludlow, demonstrates a self-contained folding shelter, including a rigid base with a first base portion and a second base portion and a hinge coupled to the first base portion and the second base portion. The hinge defines a hinge axis such that the first base portion and the second base portions are pivotally movable between an open configuration and a closed configuration. The folding shelter further includes a first pair of rail members disposed along the sides of the first base portion and a second pair of rail members disposed along the sides of the second base portion.

U.S. Pat. No. 10,119,296 issued 2018 Nov. 6, to Harry Deal, demonstrates a collapsible vehicle cover, which is positioned in a parking spot, garage or carport, is a retractable cover to protect a vehicle from the elements. The collapsible vehicle cover includes a front member, a rear member, a first hinged leg, a second hinged leg, a plurality of cross supports, a pair of cross support straps and a cover sheet. The front member, the rear member, the first hinged leg and the second hinged leg delineate a base supporting a framework of the plurality of cross supports and the pair of cross support straps. The cover sheet is fixed to the front member and the rear member while being supported by the plurality of cross supports and the pair of cross support straps.

U.S. Pat. No. 10,294,691 issued 2019 May 21, to Nicholas Joseph Goncher, demonstrates a portable shelter, which includes a canopy frame with frame support beams, that are connected at corner junctions to define a frame perimeter. Roof support beams extend from the corner junctions to a rooftop peak. A base including legs is connected to the canopy frame at the corner junctions. A canopy extends over the canopy frame to form a roof. The canopy may be attached to the base and/or the canopy frame by hook-and-loop fastener strips. A rooftop opening is provided in the canopy adjacent the rooftop peak to allow smoke to escape from under the canopy when a fire is lit under the portable shelter. A removable top cap is retained over the rooftop opening by a magnetic coupling that allows the rooftop opening to be closed when not in use. Partial side curtains may be provided that cover only a lower half of the base.

U.S. Pat. No. D826,428 issued 2018 Aug. 21, to Luke Dean Schuette, demonstrates the ornamental design for a carport, as shown and described.

U.S. Patent No 20040118443 issued 2004 Jun. 24, to Billy R. Powell, demonstrates a canopy of the type, that is typically packaged in a kit form that permits consumers to assemble a group of pipe members into a canopy structure. Once assembled and erected, the canopy includes a series of vertical posts and a series of rafters that extend upwardly from the post. In order to provide additional structural support, especially to the rafters and to the roof structure formed by the rafters, a series of cross or brace members are interconnected between the vertical posts and the rafters.

U.S Patent No 20120117866 issued 2012 May 17, to Gregory Ryan Garbos, demonstrates a movable greenhouse and track system, which may include a track configured to be anchored to a first plot of farming land and a second plot of farming land. The movable greenhouse and track system may further include a greenhouse is capable of being anchored to the track and an anchoring member. The greenhouse may include a series of hoops forming an interior area; a member attached to the hoops for keeping the interior area of the greenhouse a certain temperature different than a temperature from an area exterior to the greenhouse; and a member for facilitating movement of the greenhouse along the tunnel of the track.

U.S. Patent No 20130125946 issued 2013 May 23, to Denis Bourdon, demonstrates a temporary shelter for use in a variety of situations, and the various components (bracket and tarp clamp) that are used in the construction of the shelter, which is disclosed. In particular, such a shelter may be used to cover an outdoor swimming pool, serve as a greenhouse, or serve as a temporary shelter from snow. The temporary shelter has a structural frame having a base frame and a rib frame, a sheet for covering the rib frame, one or more tarp clamps for stretching the sheet over the rib frame and one or more attachment members for securing the sheet to the base frame.

DISADVANTAGES OF THE PRIOR ART

The prior art have failed to solve many problems associated with such carport, as follows:

1) No prior art mention or disclose any carport, having multi-configurable T-shaped joiner 110.
   Therefore, the prior art of carport is (or are each):
   a) Not capable of connecting multi-configurable roof spines 114, multi-configurable roof ribs 115, and/or multi-configurable vertical leg posts 116 together;
   b) Not capable of being configured as a car canopy (see FIG. 16);
   c) Not capable of being configured as a greenhouse (see FIG. 7 and FIG. 62);
   d) Not capable of being configured as an enclosure (see FIG. 10 and FIG. 65);
   e) Not capable of being configured as a barrier (see FIG. 9 and FIG. 64);
   f) Not capable of being configured as a cabana (see FIG. 7, FIG. 8, FIG. 62, and FIG. 63);
   g) Not capable of being configured as a privacy room (see FIG. 10 and FIG. 65);
   h) Not capable of being configured as a privacy screen (see FIG. 11 and FIG. 66);
   i) Not capable of being configured as a tradeshow booth (see FIG. 11 and FIG. 66); and
   j) Not capable of being configured as a wind barrier (see FIG. 9 and FIG. 64).

2) No prior art mention or disclose any carport, having multi-configurable X-shaped joiner 111.
   Therefore, the prior art of carport is (or are each):
   a) Not capable of connecting multi-configurable roof spines 114, multi-configurable roof ribs 115, and/or multi-configurable vertical leg posts 116 together;
   b) Not capable of being configured as a car canopy (see FIG. 16);
   c) Not capable of being configured as a greenhouse (see FIG. 7 and FIG. 62);
   d) Not capable of being configured as an enclosure (see FIG. 10 and FIG. 65);
   e) Not capable of being configured as a barrier (see FIG. 9 and FIG. 64);
   f) Not capable of being configured as a cabana (see FIG. 7, FIG. 8, FIG. 62, and FIG. 63);
   g) Not capable of being configured as a privacy room (see FIG. 10 and FIG. 65);
   h) Not capable of being configured as a privacy screen (see FIG. 11 and FIG. 66);
   i) Not capable of being configured as a tradeshow booth (see FIG. 11 and FIG. 66); and
   j) Not capable of being configured as a wind barrier (see FIG. 9 and FIG. 64).

3) No prior art mention or disclose any carport, having multi-configurable roof spines 114.
   Therefore, the prior art of carport is (or are each):
   a) Not capable of being Configured as a car canopy (see FIG. 16);
   b) Not capable of being configured as a greenhouse (see FIG. 7 and FIG. 62);
   c) Not capable of being configured as an enclosure (see FIG. 10 and FIG. 65);
   d) Not capable of being configured as a barrier (see FIG. 9 and FIG. 64);
   e) Not capable of being configured as a shed (see FIG. 13, FIG. 14, and FIG. 15);
   f) Not capable of being configured as a cabana (see FIG. 7, FIG. 8, FIG. 62, and FIG. 63);
   g) Not capable of being configured as a privacy room (see FIG. 10 and FIG. 65);
   h) Not capable of being configured as a privacy screen (see FIG. 11 and FIG. 66);
   i) Not capable of being configured as a tradeshow booth (see FIG. 11 and FIG. 66);
   j) Not capable of being configured as a wind barrier (see FIG. 9 and FIG. 64); and
   k) Not capable of providing structure and strength to multi-configurable multi-function articulated canopy frame system 109.

4) No prior art mention or disclose any carport, having multi-configurable roof ribs 115.
   Therefore, the prior art of carport is (or are each):
   a) Not capable of being configured as a car canopy (see FIG. 16);
   b) Not capable of being configured as a greenhouse (see FIG. 7 and FIG. 62);
   c) Not capable of being configured as an enclosure (see FIG. 10 and FIG. 65);
   d) Not capable of being configured as a barrier (see FIG. 9 and FIG. 64);

e) Not capable of being configured as a shed
   (see FIG. 13, FIG. 14, and FIG. 15);
f) Not capable of being configured as a cabana
   (see FIG. 7, FIG. 8, FIG. 62, and FIG. 63);
g) Not capable of being configured as a privacy room
   (see FIG. 10 and FIG. 65);
h) Not capable of being configured as a privacy screen
   (see FIG. 11 and FIG. 66);
i) Not capable of being configured as a tradeshow booth
   (see FIG. 11 and FIG. 66);
j) Not capable of being configured as a wind barrier
   (see FIG. 9 and FIG. 64); and
k) Not capable of providing structure and strength to multi-configurable multi-function articulated canopy frame system 109.

5) No prior art mention or disclose any carport, having multi-configurable vertical leg posts 116.
   Therefore, the prior art of carport is (or are each):
   a) Not capable of being configured as a car canopy
      (see FIG. 16);
   b) Not capable of being configured as a greenhouse
      (see FIG. 7 and FIG. 62);
   c) Not capable of being configured as an enclosure
      (see FIG. 10 and FIG. 65);
   d) Not capable of being configured as a barrier
      (see FIG. 9 and FIG. 64);
   e) Not capable of being configured as a shed
      (see FIG. 13, FIG. 14, and FIG. 15);
   f) Not capable of being configured as a cabana
      (see FIG. 7, FIG. 8, FIG. 62, and FIG. 63);
   g) Not capable of being configured as a privacy room
      (see FIG. 10 and FIG. 65);
   h) Not capable of being configured as a privacy screen
      (see FIG. 11 and FIG. 66);
   i) Not capable of being configured as a tradeshow booth
      (see FIG. 11 and FIG. 66);
   j) Not capable of being configured as a wind barrier
      (see FIG. 9 and FIG. 64); and
   k) Not capable of providing structure and strength to multi-configurable multi-function articulated canopy frame system 109.

6) No prior art mention or disclose any carport, having multi-configurable panel 123
   Therefore, the prior art of carport is (or are each):
   a) Not capable of providing a modular building options for multi-configurable multi-function articulated canopy frame system 109;
   b) Not capable of being configured as a dog run
      (see FIG. 4 and FIG. 58);
   c) Not capable of being configured as a greenhouse
      (see FIG. 7 and FIG. 62);
   d) Not capable of being configured as an enclosure
      (see FIG. 10 and FIG. 65);
   e) Not capable of being configured as a barrier
      (see FIG. 9 and FIG. 64);
   f) Not capable of being configured as bleacher shelves to store or display items
      (see FIG. 5 and FIG. 60);
   g) Not capable of being configured as an attic to store items off the ground
      (see FIG. 3 and FIG. 57);
   h) Not capable of being configured as a hanging cage to house animals off the ground
      (see FIG. 2 and FIG. 56);
   i) Not capable of being configured as a table
      (see FIG. 6 and FIG. 61);
   j) Not capable of being configured as structures for displaying signs
      (see FIG. 1 and FIG. 52); and
   k) Not capable of being configured for roof storage
      (see FIG. 1 and FIG. 52).

7) No prior art mention or disclose any carport, having multi-configurable panel-to-panel-securing gap-controlling brackets 128.
   Therefore, the prior art of carport is (or are each):
   a) Not capable of connecting one or more multi-configurable panel 123 and/or multi-configurable door frame panel 124 together;
   b) Not capable of being configured as a dog run
      (see FIG. 4 and FIG. 58);
   c) Not capable of being configured as a greenhouse
      (see FIG. 7 and FIG. 62);
   d) Not capable of being configured as an enclosure
      (see FIG. 10 and FIG. 65);
   e) Not capable of being configured as a barrier
      (see FIG. 9 and FIG. 64);
   f) Not capable of being configured as bleacher shelves to store or display items
      (see FIG. 5 and FIG. 60);
   g) Not capable of being configured as an attic to store items off the ground
      (see FIG. 3 and FIG. 57);
   h) Not capable of being configured as a hanging cage to house animals off the ground
      (see FIG. 2 and FIG. 56);
   i) Not capable of being configured as a table
      (see FIG. 6 and FIG. 61);
   j) Not capable of being configured as structures for displaying signs
      (see FIG. 1 and FIG. 52); and
   k) Not capable of being configured for roof storage
      (see FIG. 1 and FIG. 52).

8) No prior art mention or disclose any carport, having multi-configurable panel-to-post-securing gap-controlling self-centering brackets 129.
   Therefore, the prior art of carport is (or are each):
   a) Not capable of connecting at least one multi-configurable panel 123 and/or at least one multi-configurable door frame panel 124 to multi-configurable roof spines 114, multi-configurable roof ribs 115, and/or multi-configurable vertical leg posts 116 together;
   b) Not capable of being configured as a dog run
      (see FIG. 4 and FIG. 58);
   c) Not capable of being configured as a greenhouse
      (see FIG. 7 and FIG. 62);
   d) Not capable of being configured as an enclosure
      (see FIG. 10 and FIG. 65);
   e) Not capable of being configured as a barrier
      (see FIG. 9 and FIG. 64);
   f) Not capable of being configured as bleacher shelves to store or display items
      (see FIG. 5 and FIG. 60);
   g) Not capable of being configured as an attic to store items off the ground
      (see FIG. 3 and FIG. 57);
   h) Not capable of being configured as a hanging cage to house animals off the ground
      (see FIG. 2 and FIG. 56);
   i) Not capable of being configured as a table
      (see FIG. 6 and FIG. 61);

j) Not capable of being configured as structures for displaying signs
   (see FIG. 1 and FIG. 52); and
k) Not capable of being configured for roof storage
   (see FIG. 1 and FIG. 52).

OBJECTS AND ADVANTAGES OF THE INVENTION

The new invention substantially departs from the conventional concepts and designs of the prior art. In doing so, the new invention provides (a or an) ten-device-in-one reconfigurable adjustable carport (capable of functioning as a privacy screen, a wind screen, a cabana, a dog run, a retail-tradeshow booth, an attic, a storage, a picnic table, a kennel, and a carport) having many unique and significant features, functions, and advantages, which overcome all the disadvantages of the prior art, as follows:

1) It is an object of the new invention to provide (a or an) ten-device-in-one reconfigurable adjustable carport, having
   multi-configurable T-shaped joiner 110.
   Therefore, the ten-device-in-one reconfigurable adjustable carport is (or are each):
   a) Capable of connecting multi-configurable roof spines 114, multi-configurable roof ribs 115, and/or multi-configurable vertical leg posts 116 together;
   b) Capable of being configured as a car canopy
      (see FIG. 16);
   c) Capable of being configured as a greenhouse
      (see FIG. 7 and FIG. 62);
   d) Capable of being configured as an enclosure
      (see FIG. 10 and FIG. 65);
   e) Capable of being configured as a barrier
      (see FIG. 9 and FIG. 64);
   f) Capable of being configured as a cabana
      (see FIG. 7, FIG. 8, FIG. 62, and FIG. 63);
   g) Capable of being configured as a privacy room
      (see FIG. 10 and FIG. 65);
   h) Capable of being configured as a privacy screen
      (see FIG. 11 and FIG. 66);
   i) Capable of being configured as a tradeshow booth
      (see FIG. 11 and FIG. 66); and
   j) Capable of being configured as a wind barrier
      (see FIG. 9 and FIG. 64).

2) It is another object of the new invention to provide (a or an) ten-device-in-one reconfigurable adjustable carport, having
   multi-configurable X-shaped joiner 111.
   Therefore, the ten-device-in-one reconfigurable adjustable carport is (or are each):
   a) Capable of connecting multi-configurable roof spines 114, multi-configurable roof ribs 115, and/or multi-configurable vertical leg posts 116 together;
   b) Capable of being configured as a car canopy
      (see FIG. 16);
   c) Capable of being configured as a greenhouse
      (see FIG. 7 and FIG. 62);
   d) Capable of being configured as an enclosure
      (see FIG. 10 and FIG. 65);
   e) Capable of being configured as a barrier
      (see FIG. 9 and FIG. 64);
   f) Capable of being configured as a cabana
      (see FIG. 7, FIG. 8, FIG. 62, and FIG. 63);
   g) Capable of being configured as a privacy room
      (see FIG. 10 and FIG. 65);
   h) Capable of being configured as a privacy screen
      (see FIG. 11 and FIG. 66);
   i) Capable of being configured as a tradeshow booth
      (see FIG. 11 and FIG. 66); and
   j) Capable of being configured as a wind barrier
      (see FIG. 9 and FIG. 64).

3) It is still another object of the new invention to provide (a or an) ten-device-in-one reconfigurable adjustable carport, having
   multi-configurable roof spines 114.
   Therefore, the ten-device-in-one reconfigurable adjustable carport is (or are each):
   a) Capable of being Configured as a car canopy
      (see FIG. 16);
   b) Capable of being configured as a greenhouse
      (see FIG. 7 and FIG. 62);
   c) Capable of being configured as an enclosure
      (see FIG. 10 and FIG. 65);
   d) Capable of being configured as a barrier
      (see FIG. 9 and FIG. 64);
   e) Capable of being configured as a shed
      (see FIG. 13, FIG. 14, and FIG. 15);
   f) Capable of being configured as a cabana
      (see FIG. 7, FIG. 8, FIG. 62, and FIG. 63);
   g) Capable of being configured as a privacy room
      (see FIG. 10 and FIG. 65);
   h) Capable of being configured as a privacy screen
      (see FIG. 11 and FIG. 66);
   i) Capable of being configured as a tradeshow booth
      (see FIG. 11 and FIG. 66);
   j) Capable of being configured as a wind barrier
      (see FIG. 9 and FIG. 64); and
   k) Capable of providing structure and strength to multi-configurable multi-function articulated canopy frame system 109.

4) It is yet still another object of the new invention to provide (a or an) ten-device-in-one reconfigurable adjustable carport, having
   multi-configurable roof ribs 115.
   Therefore, the ten-device-in-one reconfigurable adjustable carport is (or are each):
   a) Capable of being configured as a car canopy
      (see FIG. 16);
   b) Capable of being configured as a greenhouse
      (see FIG. 7 and FIG. 62);
   c) Capable of being configured as an enclosure
      (see FIG. 10 and FIG. 65);
   d) Capable of being configured as a barrier
      (see FIG. 9 and FIG. 64);
   e) Capable of being configured as a shed
      (see FIG. 13, FIG. 14, and FIG. 15);
   f) Capable of being configured as a cabana
      (see FIG. 7, FIG. 8, FIG. 62, and FIG. 63);
   g) Capable of being configured as a privacy room
      (see FIG. 10 and FIG. 65);
   h) Capable of being configured as a privacy screen
      (see FIG. 11 and FIG. 66);
   i) Capable of being configured as a tradeshow booth
      (see FIG. 11 and FIG. 66);
   j) Capable of being configured as a wind barrier
      (see FIG. 9 and FIG. 64); and
   k) Capable of providing structure and strength to multi-configurable multi-function articulated canopy frame system 109.

5) It is a further object of the new invention to provide (a or an) ten-device-in-one reconfigurable adjustable carport, having
multi-configurable vertical leg posts 116.
Therefore, the ten-device-in-one reconfigurable adjustable carport is (or are each):
   a) Capable of being configured as a car canopy
      (see FIG. 16);
   b) Capable of being configured as a greenhouse
      (see FIG. 7 and FIG. 62);
   c) Capable of being configured as an enclosure
      (see FIG. 10 and FIG. 65);
   d) Capable of being configured as a barrier
      (see FIG. 9 and FIG. 64);
   e) Capable of being configured as a shed
      (see FIG. 13, FIG. 14, and FIG. 15);
   f) Capable of being configured as a cabana
      (see FIG. 7, FIG. 8, FIG. 62, and FIG. 63);
   g) Capable of being configured as a privacy room
      (see FIG. 10 and FIG. 65);
   h) Capable of being configured as a privacy screen
      (see FIG. 11 and FIG. 66);
   i) Capable of being configured as a tradeshow booth
      (see FIG. 11 and FIG. 66);
   j) Capable of being configured as a wind barrier
      (see FIG. 9 and FIG. 64); and
   k) Capable of providing structure and strength to multi-configurable multi-function articulated canopy frame system 109.
6) It is an even further object of the new invention to provide (a or an) ten-device-in-one reconfigurable adjustable carport, having
multi-configurable panel 123.
Therefore, the ten-device-in-one reconfigurable adjustable carport is (or are each):
   a) Capable of providing a modular building options for multi-configurable multi-function articulated canopy frame system 109;
   b) Capable of being configured as a dog run
      (see FIG. 4 and FIG. 58);
   c) Capable of being configured as a greenhouse
      (see FIG. 7 and FIG. 62);
   d) Capable of being configured as an enclosure
      (see FIG. 10 and FIG. 65);
   e) Capable of being configured as a barrier
      (see FIG. 9 and FIG. 64);
   f) Capable of being configured as bleacher shelves to store or display items
      (see FIG. 5 and FIG. 60);
   g) Capable of being configured as an attic to store items off the ground
      (see FIG. 3 and FIG. 57);
   h) Capable of being configured as a hanging cage to house animals off the ground
      (see FIG. 2 and FIG. 56);
   i) Capable of being configured as a table
      (see FIG. 6 and FIG. 61);
   j) Capable of being configured as structures for displaying signs
      (see FIG. 1 and FIG. 52); and
   k) Capable of being configured for roof storage
      (see FIG. 1 and FIG. 52).
7) It is still an even further object of the new invention to provide (a or an) ten-device-in-one reconfigurable adjustable carport, having
multi-configurable panel-to-panel-securing gap-controlling brackets 128.
Therefore, the ten-device-in-one reconfigurable adjustable carport is (or are each):
   a) Capable of connecting one or more multi-configurable panel 123 and/or multi-configurable door frame panel 124 together;
   b) Capable of being configured as a dog run
      (see FIG. 4 and FIG. 58);
   c) Capable of being configured as a greenhouse
      (see FIG. 7 and FIG. 62);
   d) Capable of being configured as an enclosure
      (see FIG. 10 and FIG. 65);
   e) Capable of being configured as a barrier
      (see FIG. 9 and FIG. 64);
   f) Capable of being configured as bleacher shelves to store or display items
      (see FIG. 5 and FIG. 60);
   g) Capable of being configured as an attic to store items off the ground
      (see FIG. 3 and FIG. 57);
   h) Capable of being configured as a hanging cage to house animals off the ground
      (see FIG. 2 and FIG. 56);
   i) Capable of being configured as a table
      (see FIG. 6 and FIG. 61);
   j) Capable of being configured as structures for displaying signs
      (see FIG. 1 and FIG. 52); and
   k) Capable of being configured for roof storage
      (see FIG. 1 and FIG. 52).
8) It is yet still an even further object of the new invention to provide (a or an) ten-device-in-one reconfigurable adjustable carport, having
multi-configurable panel-to-post-securing gap-controlling self-centering brackets 129.
Therefore, the ten-device-in-one reconfigurable adjustable carport is (or are each):
   a) Capable of connecting at least one multi-configurable panel 123 and/or at least one multi-configurable door frame panel 124 to multi-configurable roof spines 114, multi-configurable roof ribs 115, and/or multi-configurable vertical leg posts 116 together;
   b) Capable of being configured as a dog run
      (see FIG. 4 and FIG. 58);
   c) Capable of being configured as a greenhouse
      (see FIG. 7 and FIG. 62);
   d) Capable of being configured as an enclosure
      (see FIG. 10 and FIG. 65);
   e) Capable of being configured as a barrier
      (see FIG. 9 and FIG. 64);
   f) Capable of being configured as bleacher shelves to store or display items
      (see FIG. 5 and FIG. 60);
   g) Capable of being configured as an attic to store items off the ground
      (see FIG. 3 and FIG. 57);
   h) Capable of being configured as a hanging cage to house animals off the ground
      (see FIG. 2 and FIG. 56);
   i) Capable of being configured as a table
      (see FIG. 6 and FIG. 61);
   j) Capable of being configured as structures for displaying signs
      (see FIG. 1 and FIG. 52); and
   k) Capable of being configured for roof storage
      (see FIG. 1 and FIG. 52).

Other objects and advantages of the present invention will become apparent from a consideration of the accompanying drawings and ensuing description.

SUMMARY OF THE INVENTION

A ten-device-in-one reconfigurable adjustable carport (capable of functioning as a privacy screen, a wind screen, a cabana, a dog run, a retail-tradeshow booth, an attic, a storage, a picnic table, a kennel, and a carport) comprises: a canopy, roof spines, roof ribs, leg posts, T-shaped joiners and X-shaped joiners spring-snappingly connected to the roof spines and roof ribs and leg posts for configuring the ten-device-in-one carport as a car canopy and a greenhouse and an enclosure and a barrier and a cabana and a privacy room and a privacy screen and a tradeshow booth and a wind barrier, panels, door-frame panel, panel-to-panel-securing brackets and panel-to-post-securing brackets bolted to the panels and the door-frame panel and the roof spines and the roof ribs and the leg posts for configuring the ten-device-in-one carport as a dog run and a greenhouse and an enclosure and a barrier and bleacher shelves to store or display items and an attic to store items off the ground and a hanging cage to house animals off the ground and structures for displaying signs and roof storage, and bracket heads respectively formed into the panel-to-post-securing brackets for automatically centering the bracket-head ends.

BRIEF DESCRIPTION OF THE DRAWINGS

FIG. 20, FIG. 21, FIG. 22, FIG. 23, FIG. 24, FIG. 25, FIG. 26, FIG. 27, FIG. 28, and FIG. 29 illustrate perspective and side cross-sectional views of multi-configurable articulated canopy frame system 109 and its components.

FIG. 56 illustrates a perspective view demonstrating the ten-device-in-one reconfigurable adjustable carport being configured as two smaller canopies with covered kennels.

DETAILED DESCRIPTION OF THE INVENTION

Figure 1:
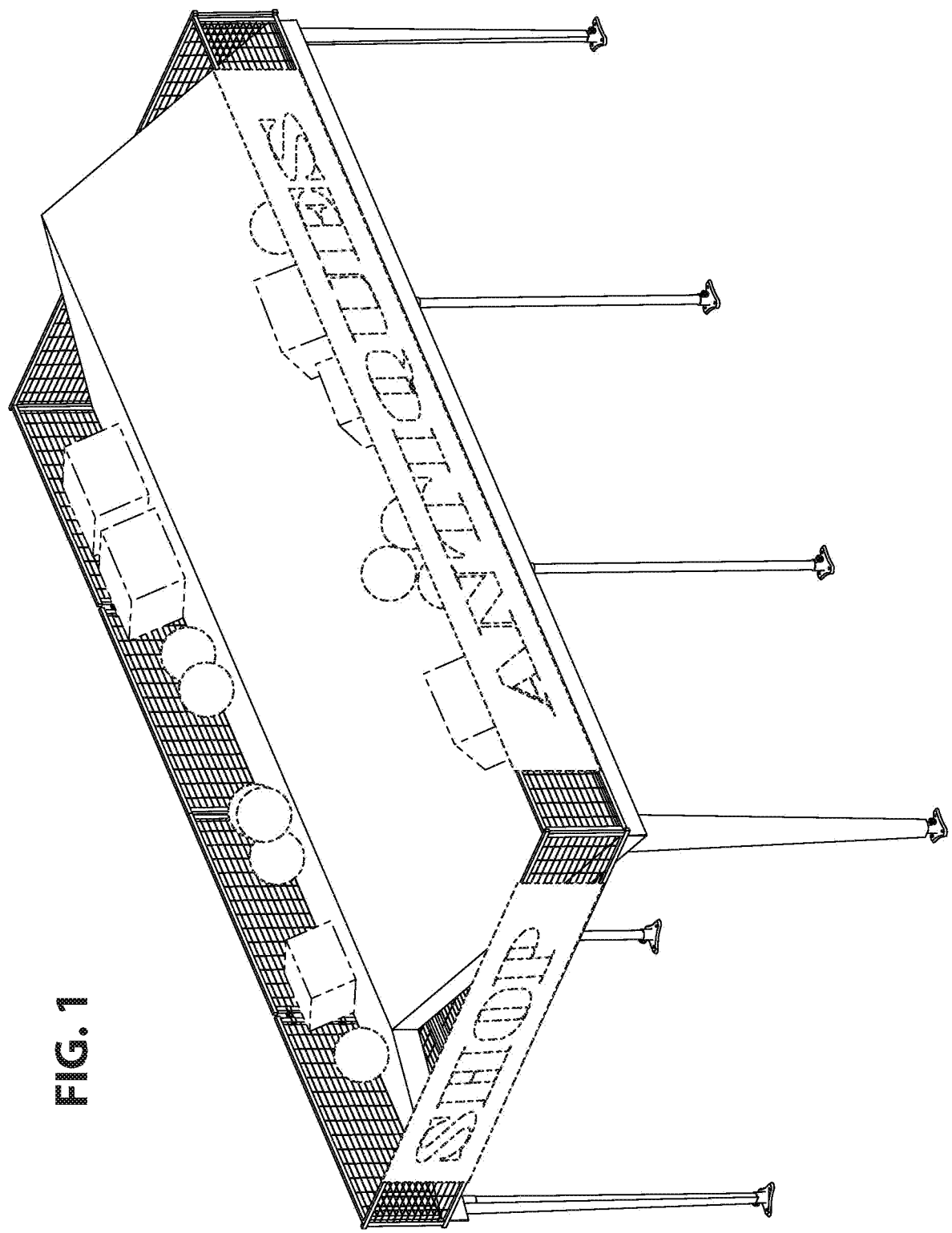
FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 illustrate perspective views of various configuration options of the ten-device-in-one reconfigurable adjustable carport.
Figure 2:
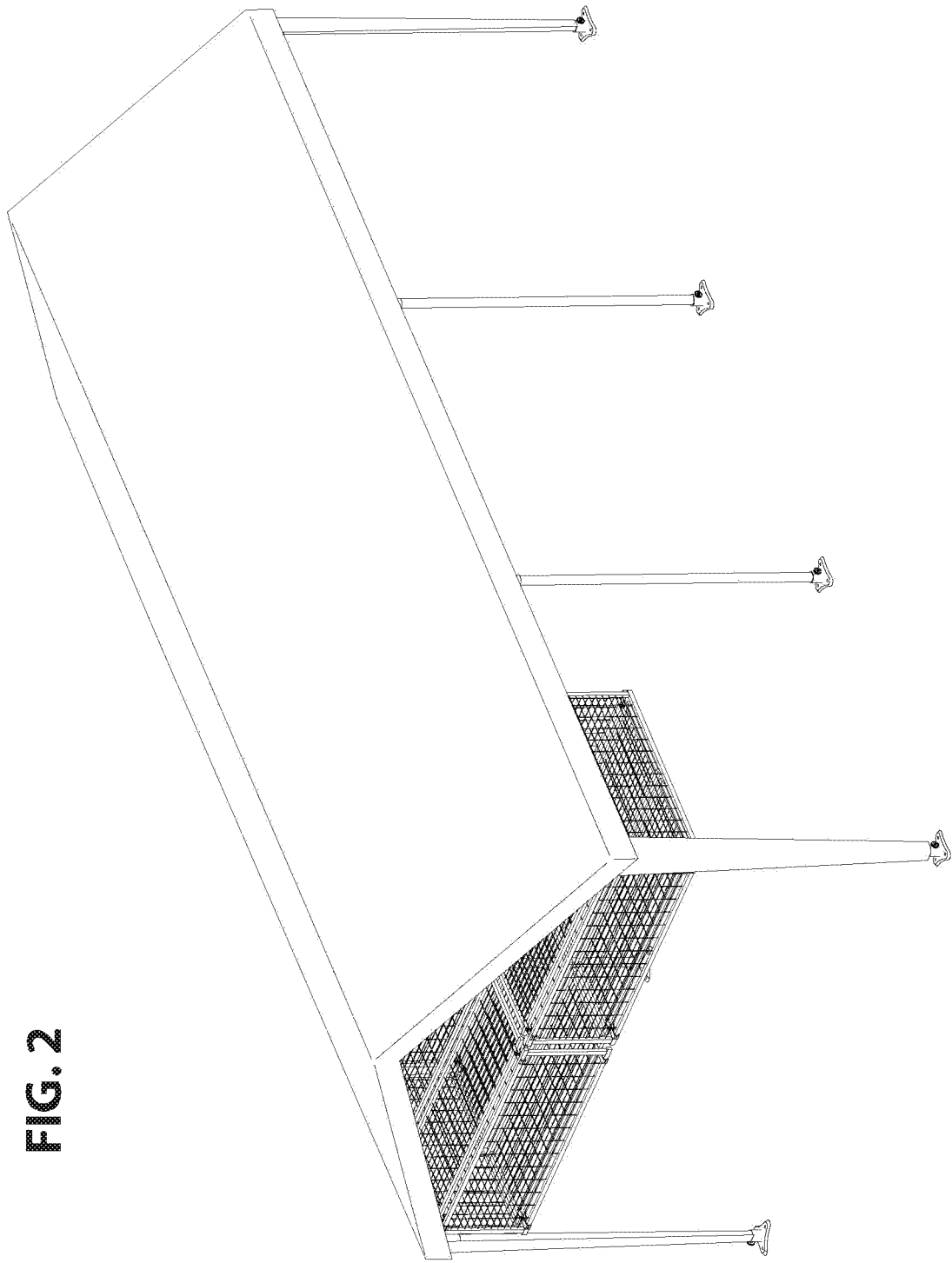
Figure 3:
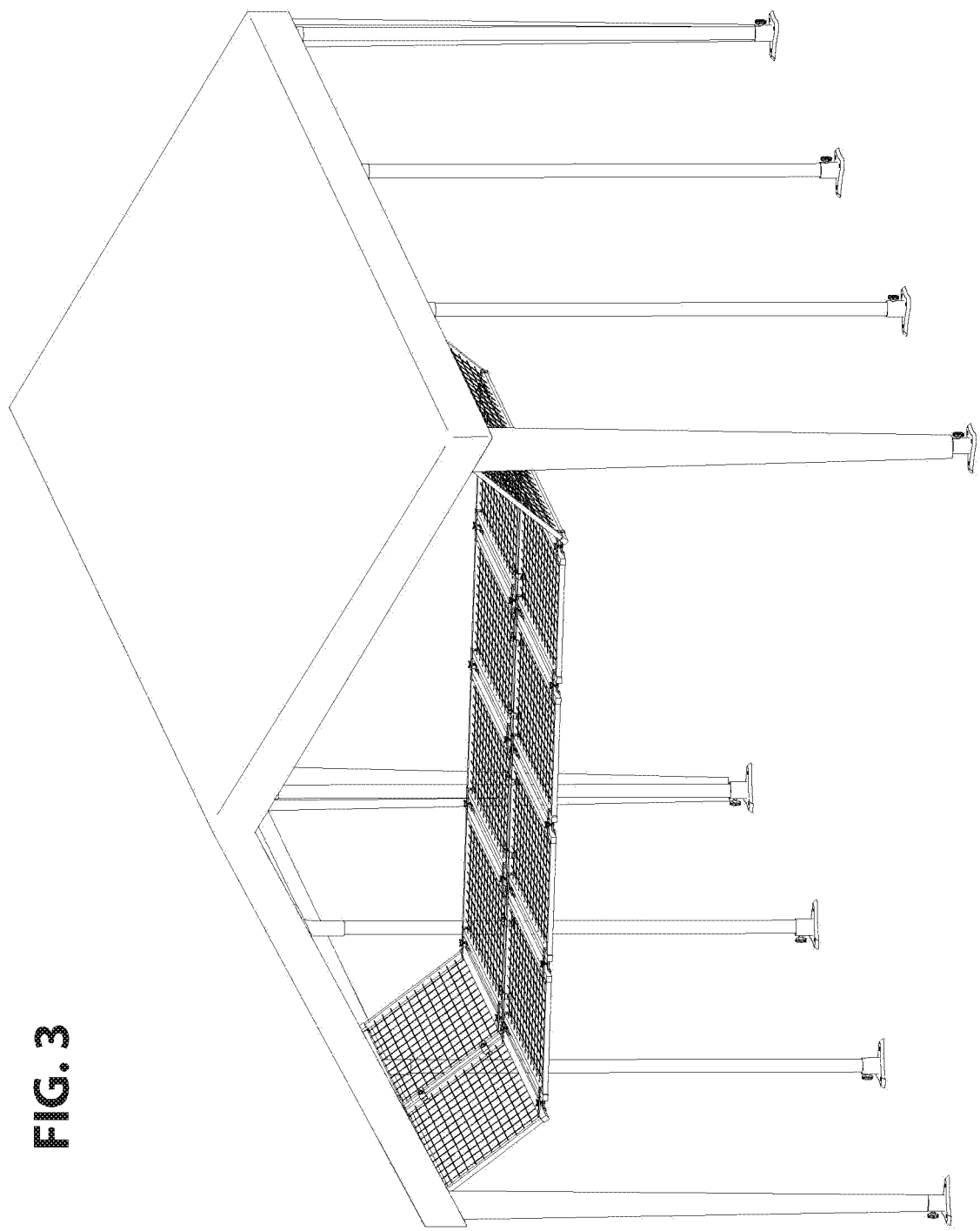
Figure 4:
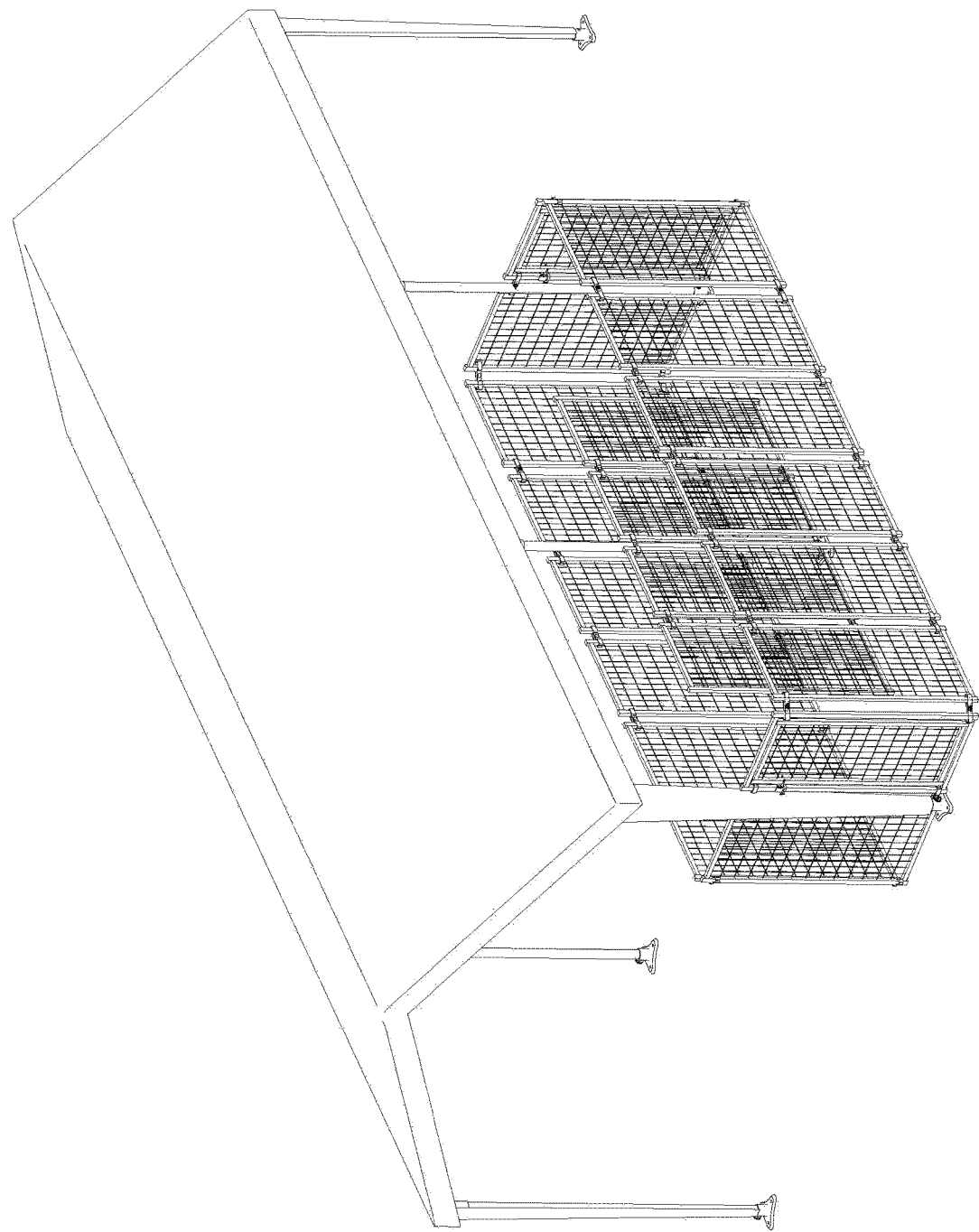
Figure 5:
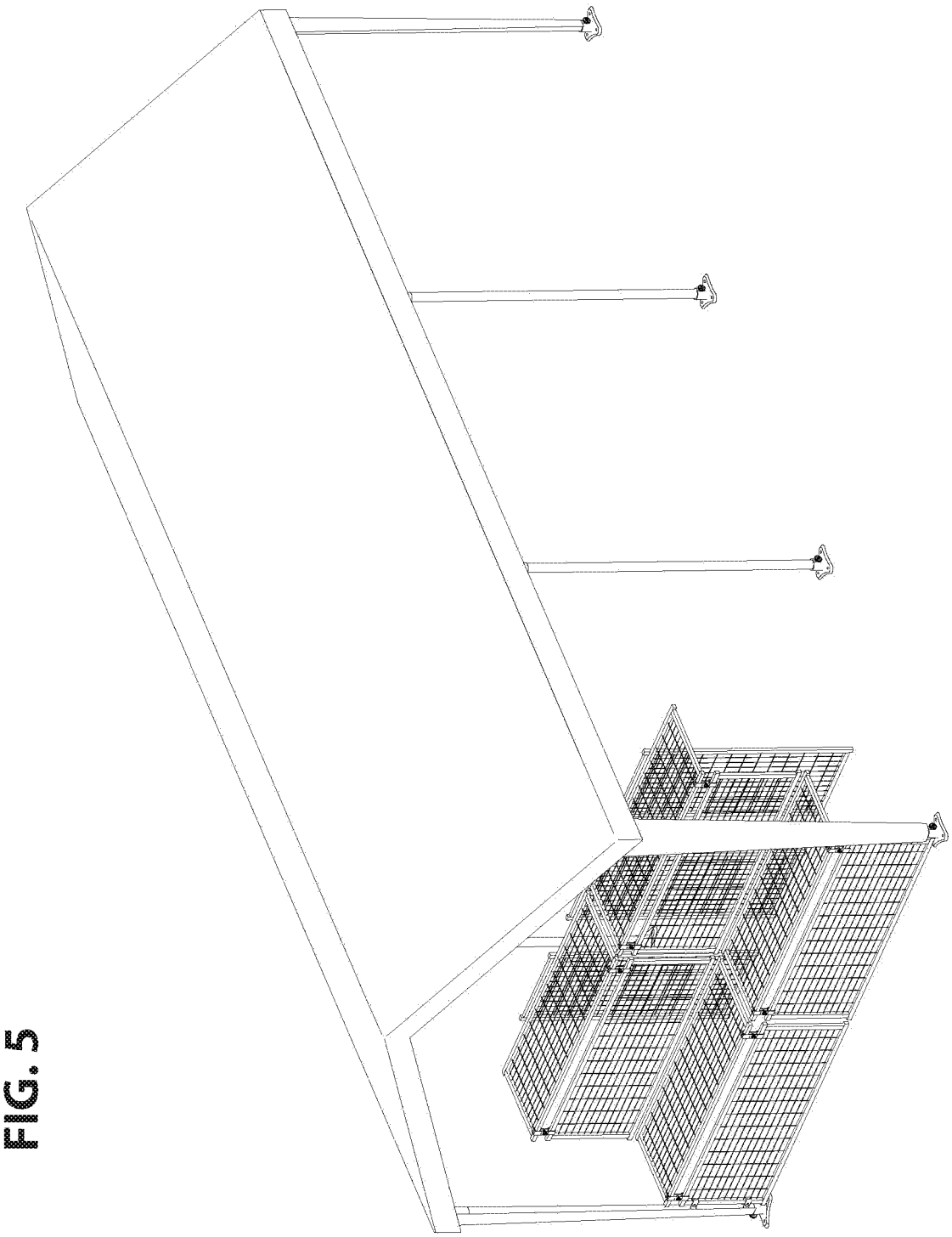
Figure 6:
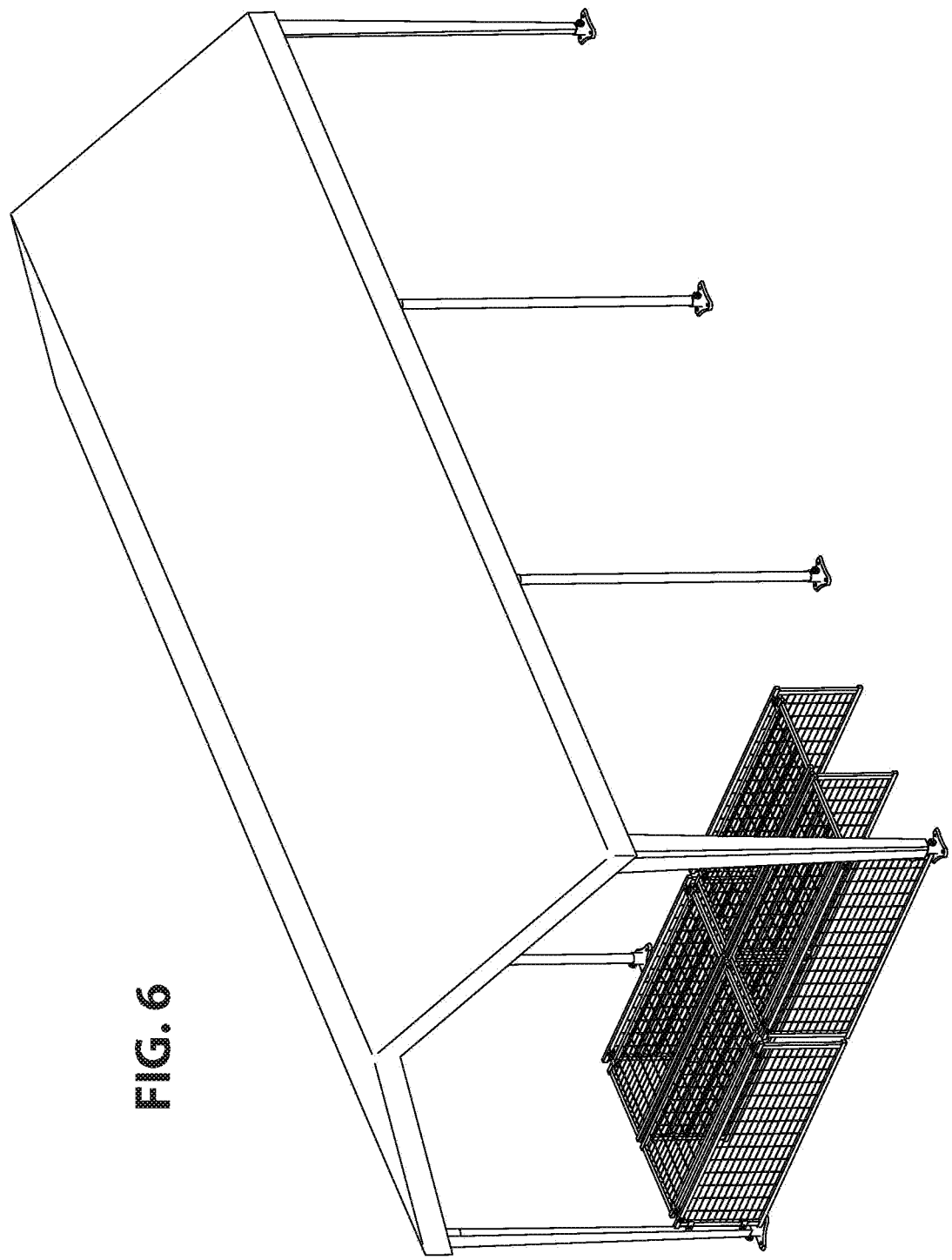
Figure 7:
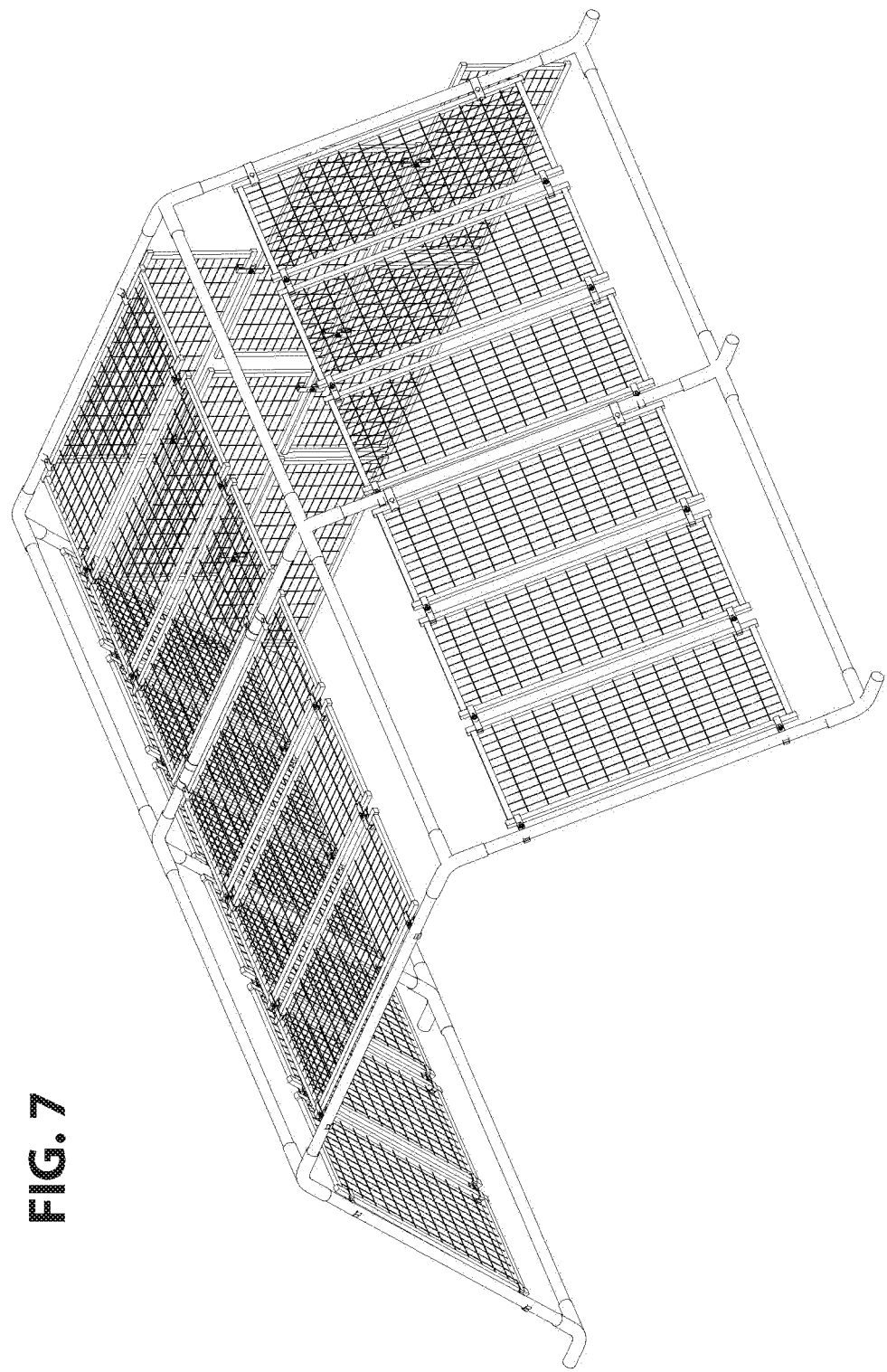
Figure 8:
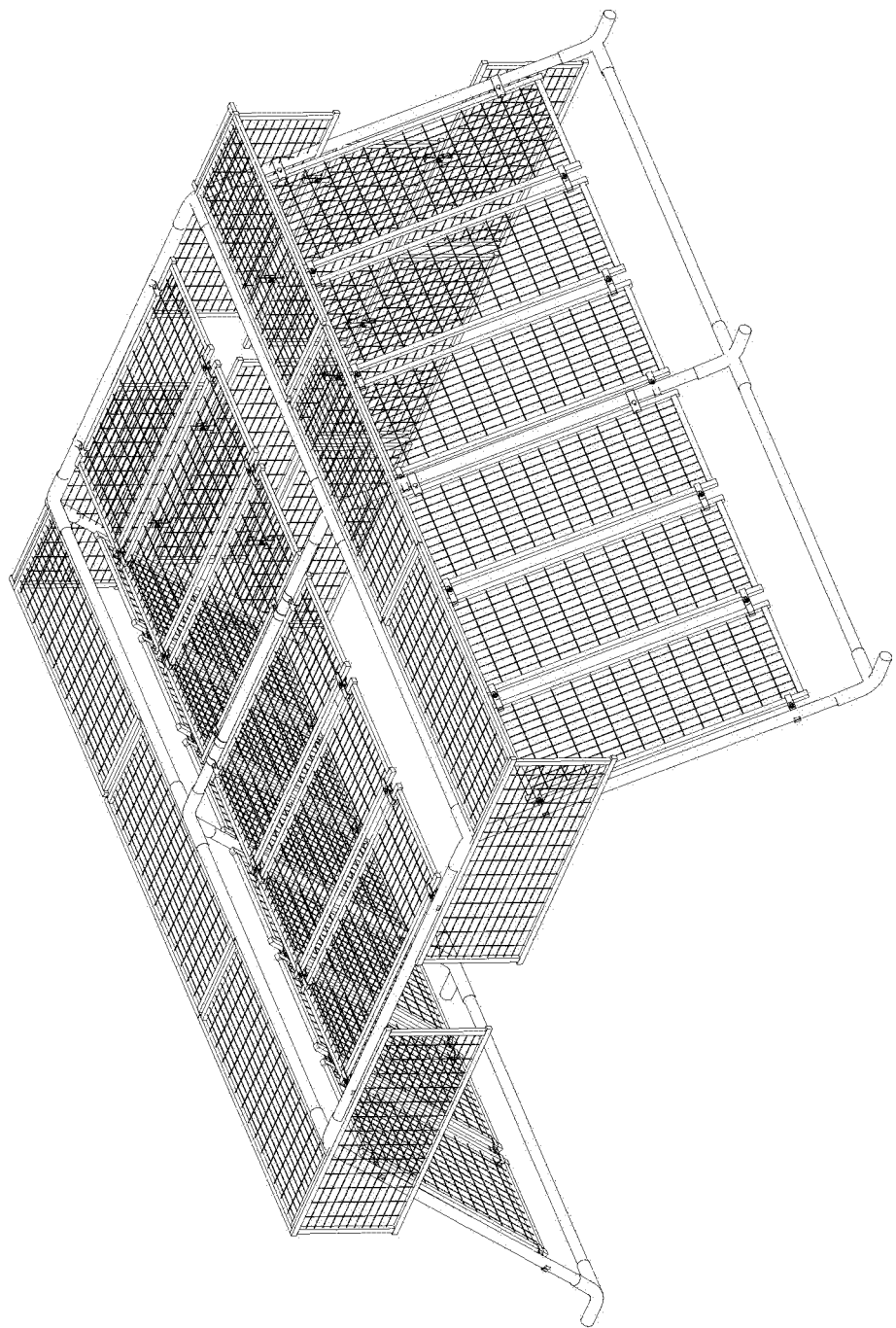
Figure 9:
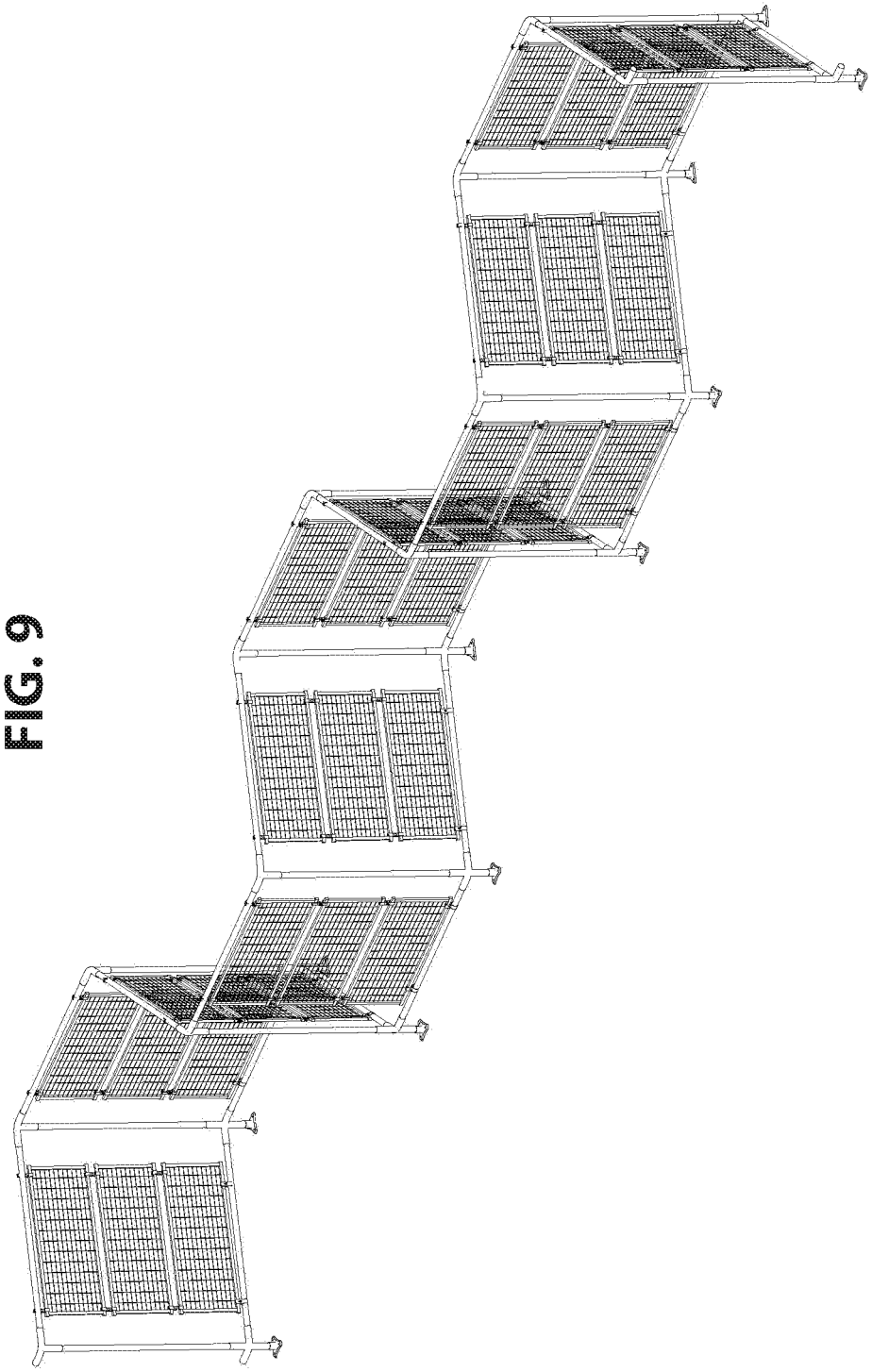
Figure 10:
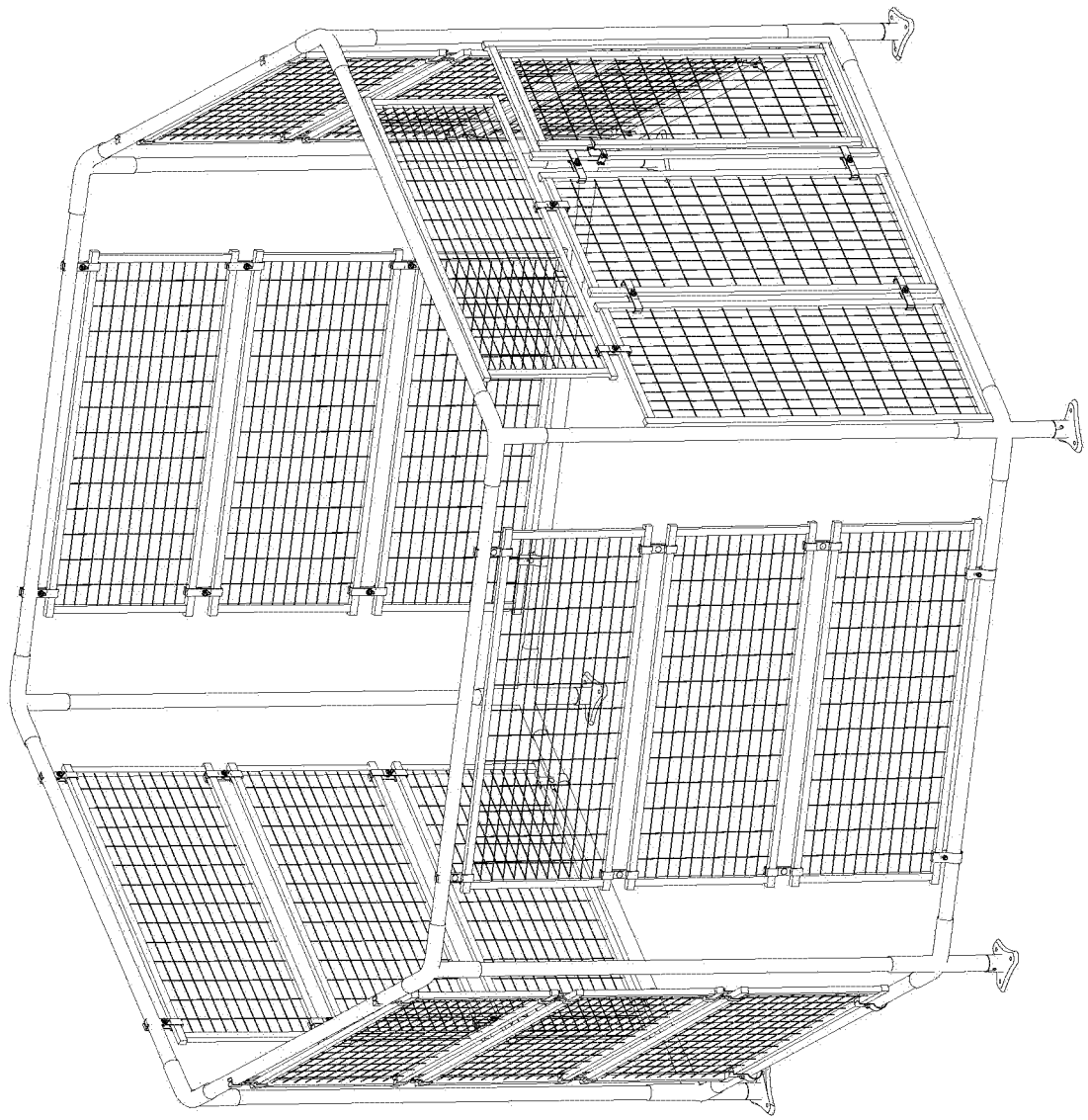
Figure 11:
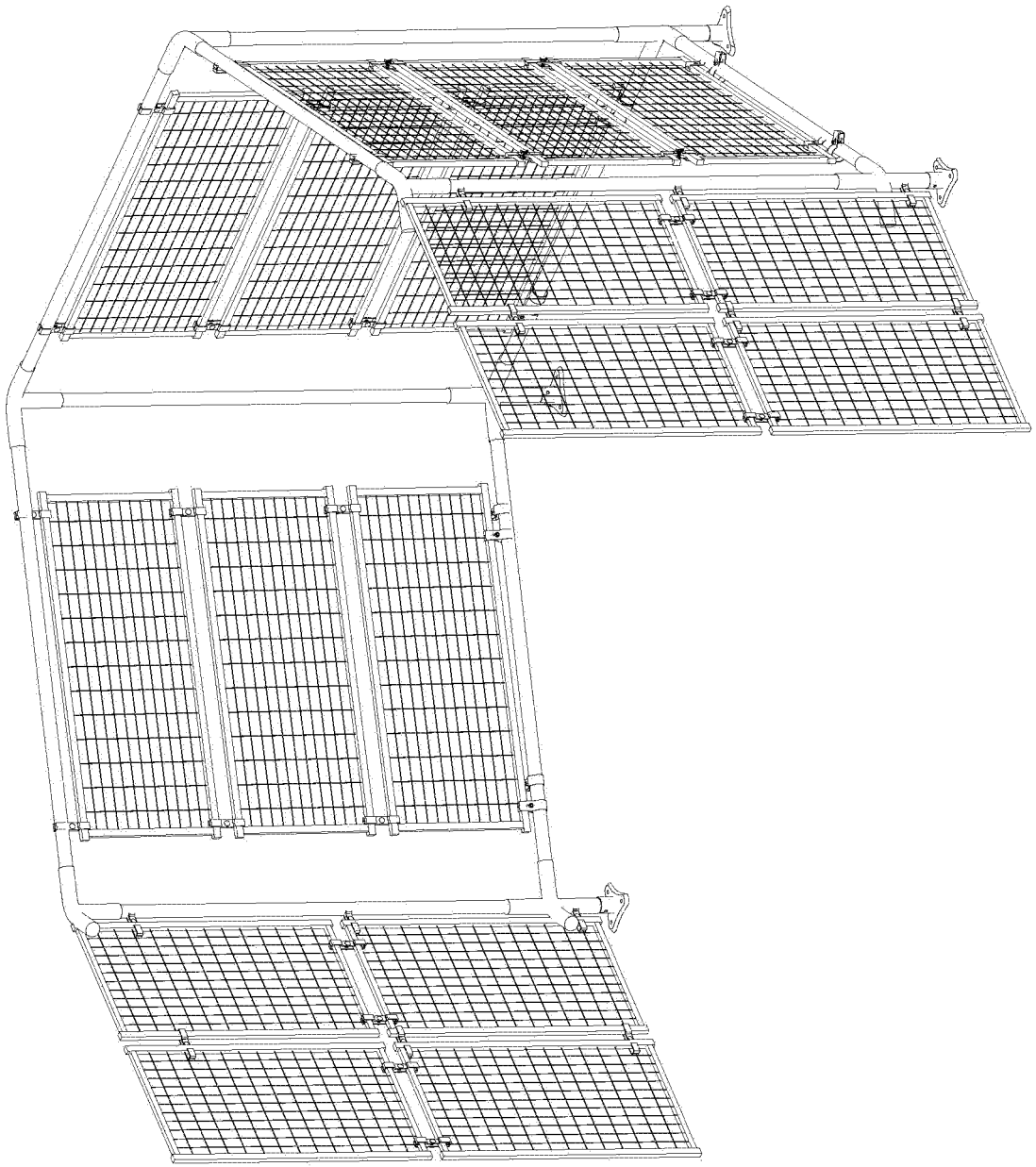
Figure 12:
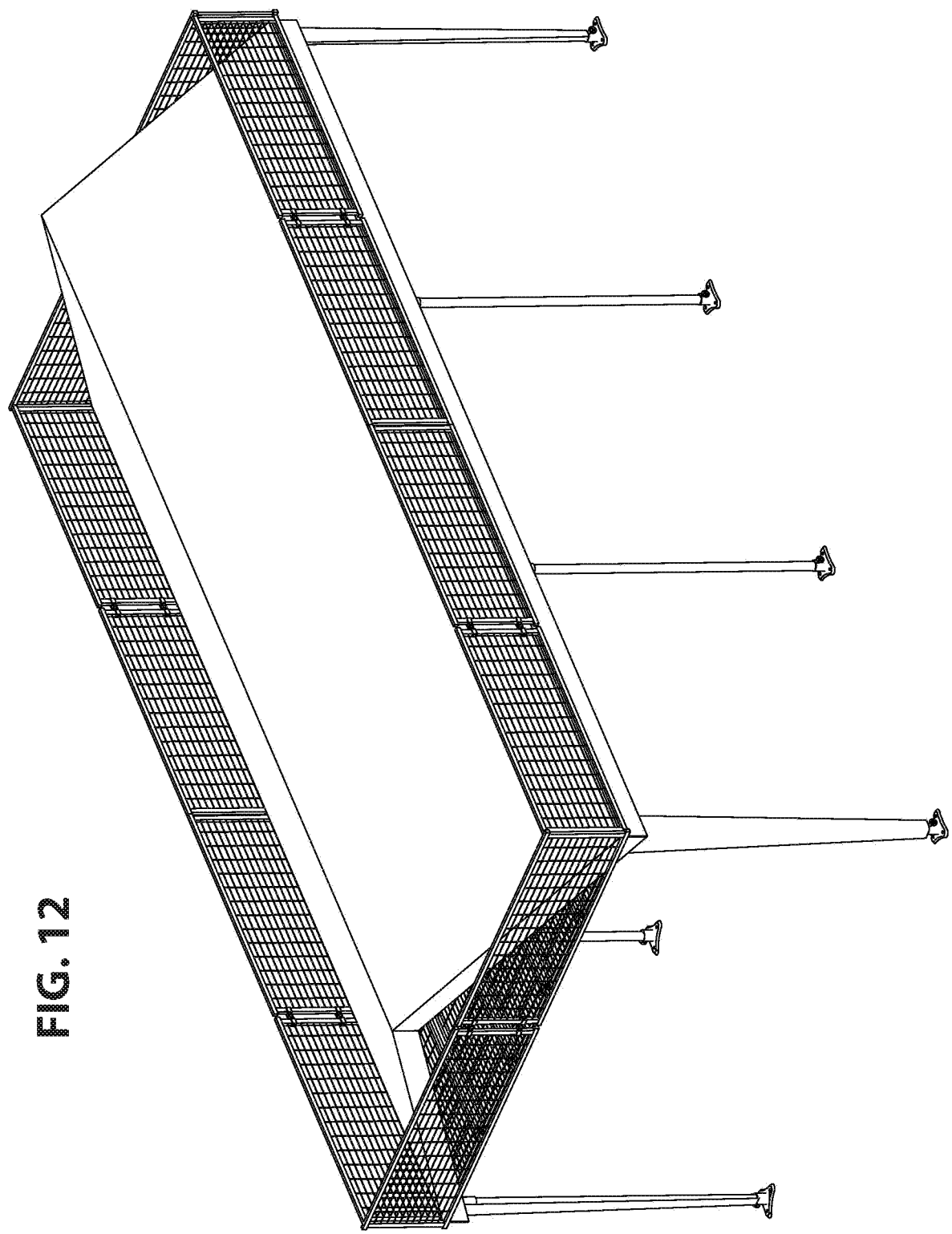
Figure 13:
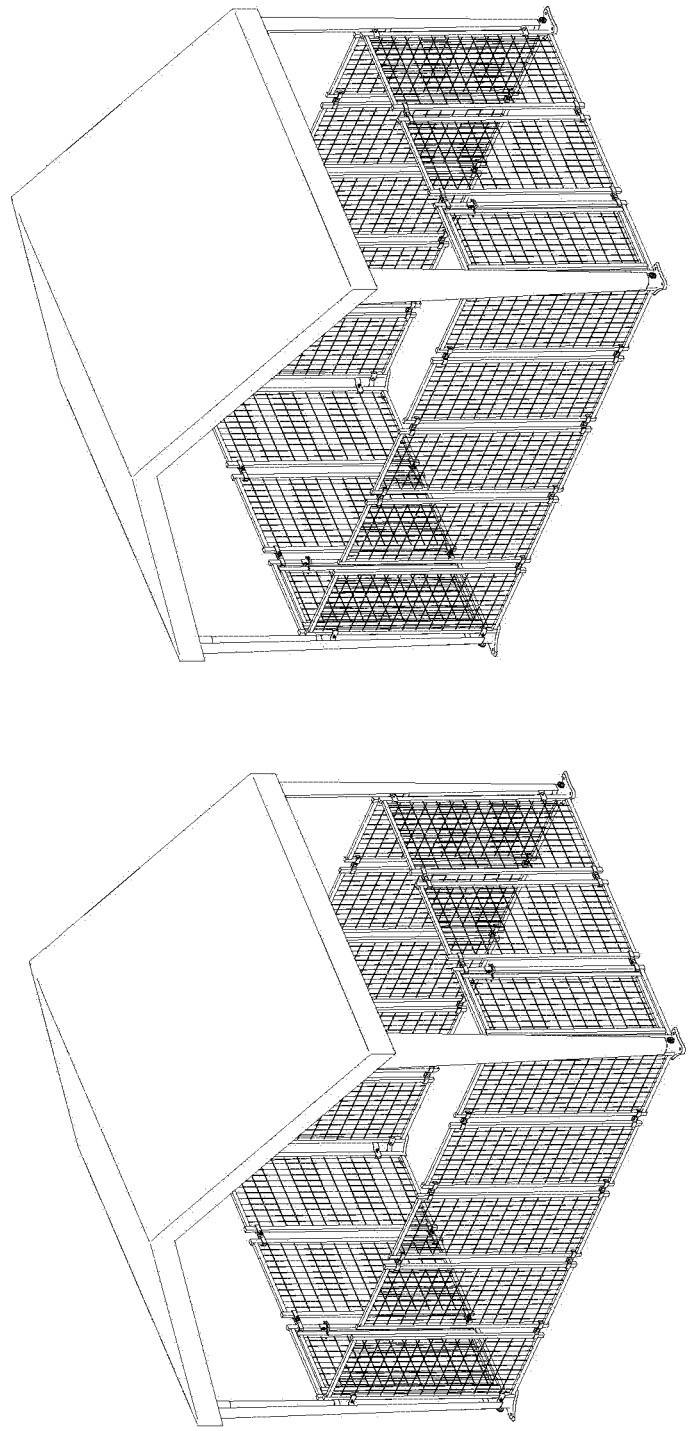
Figure 14:
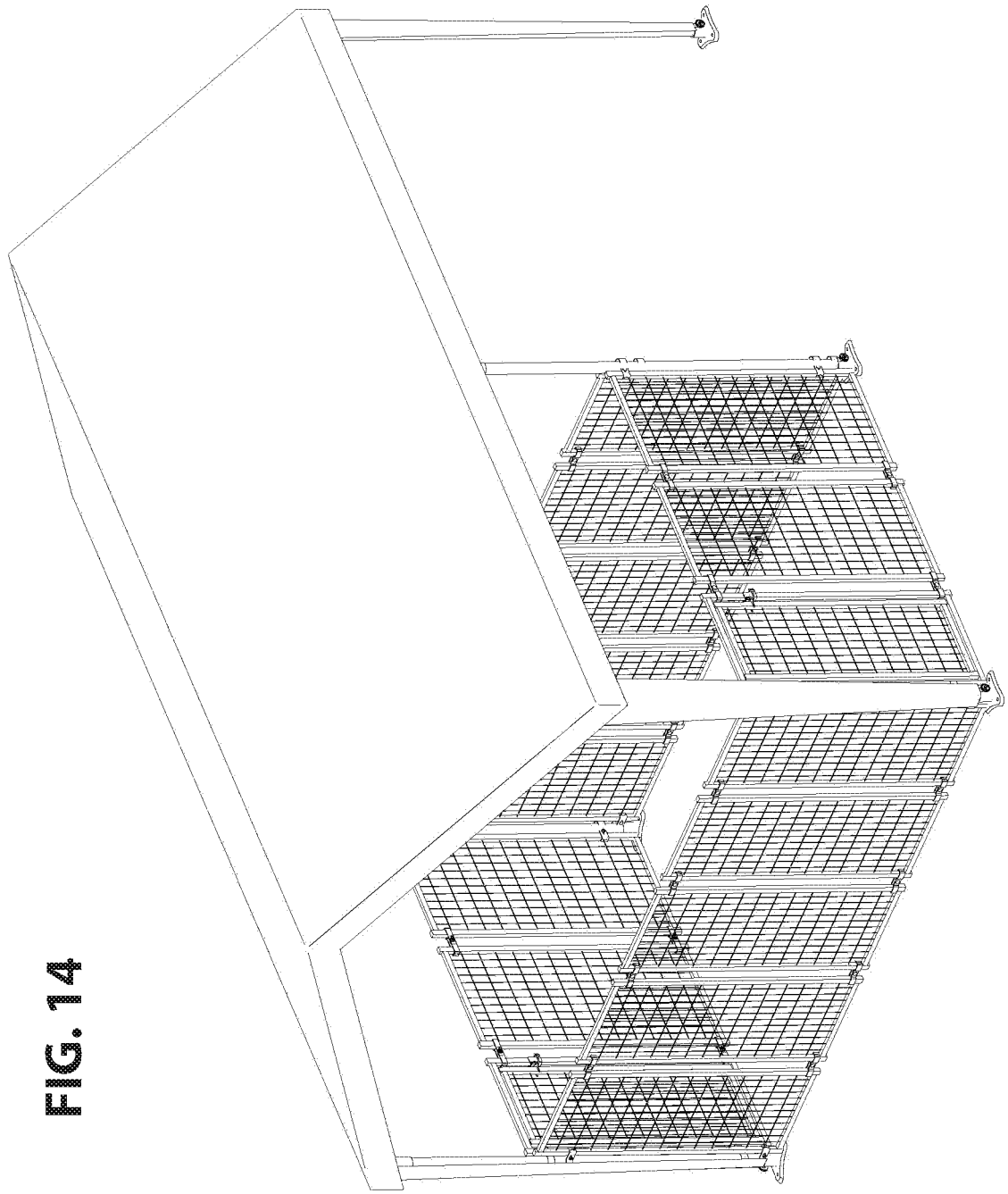
Figure 15:
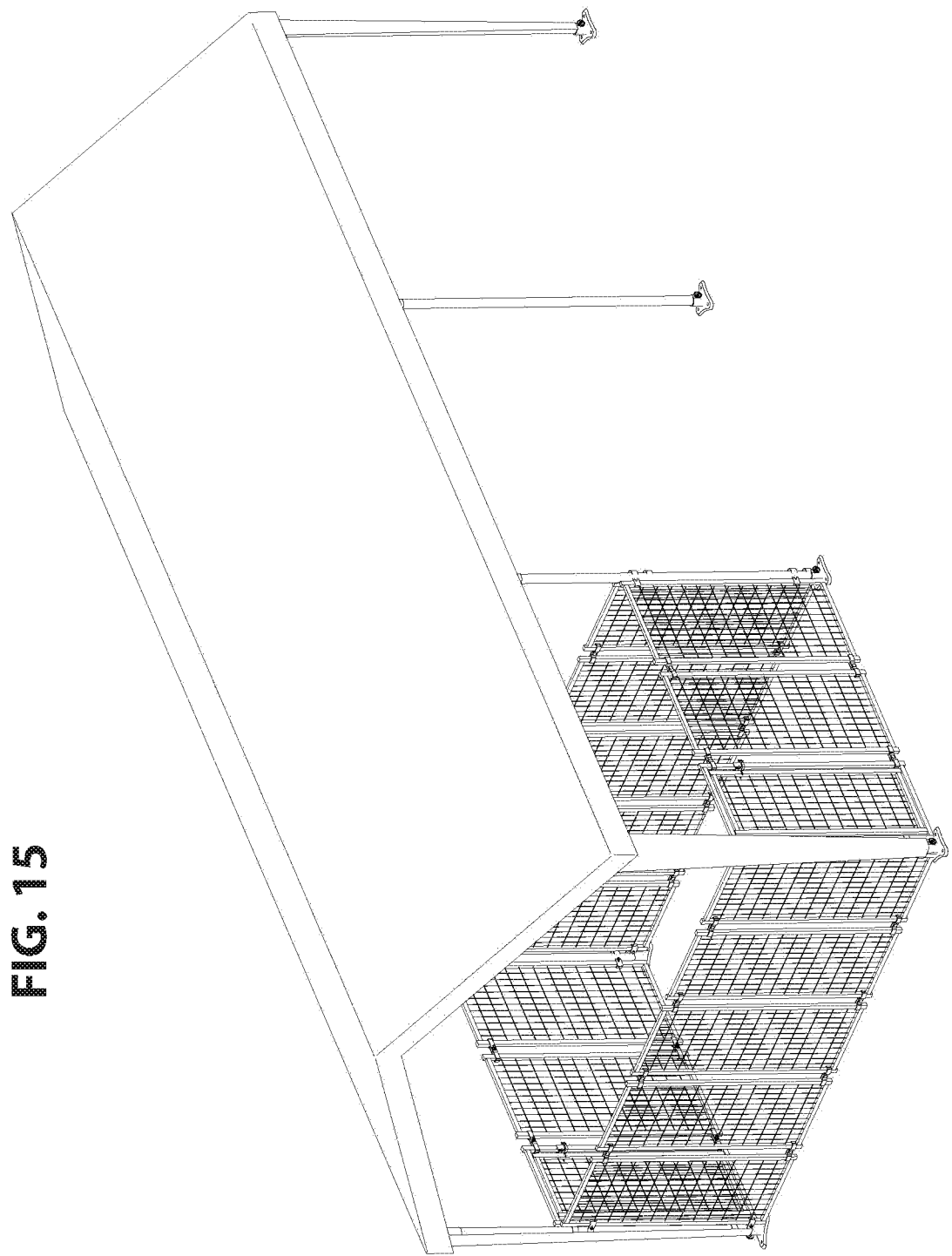
Figure 16:
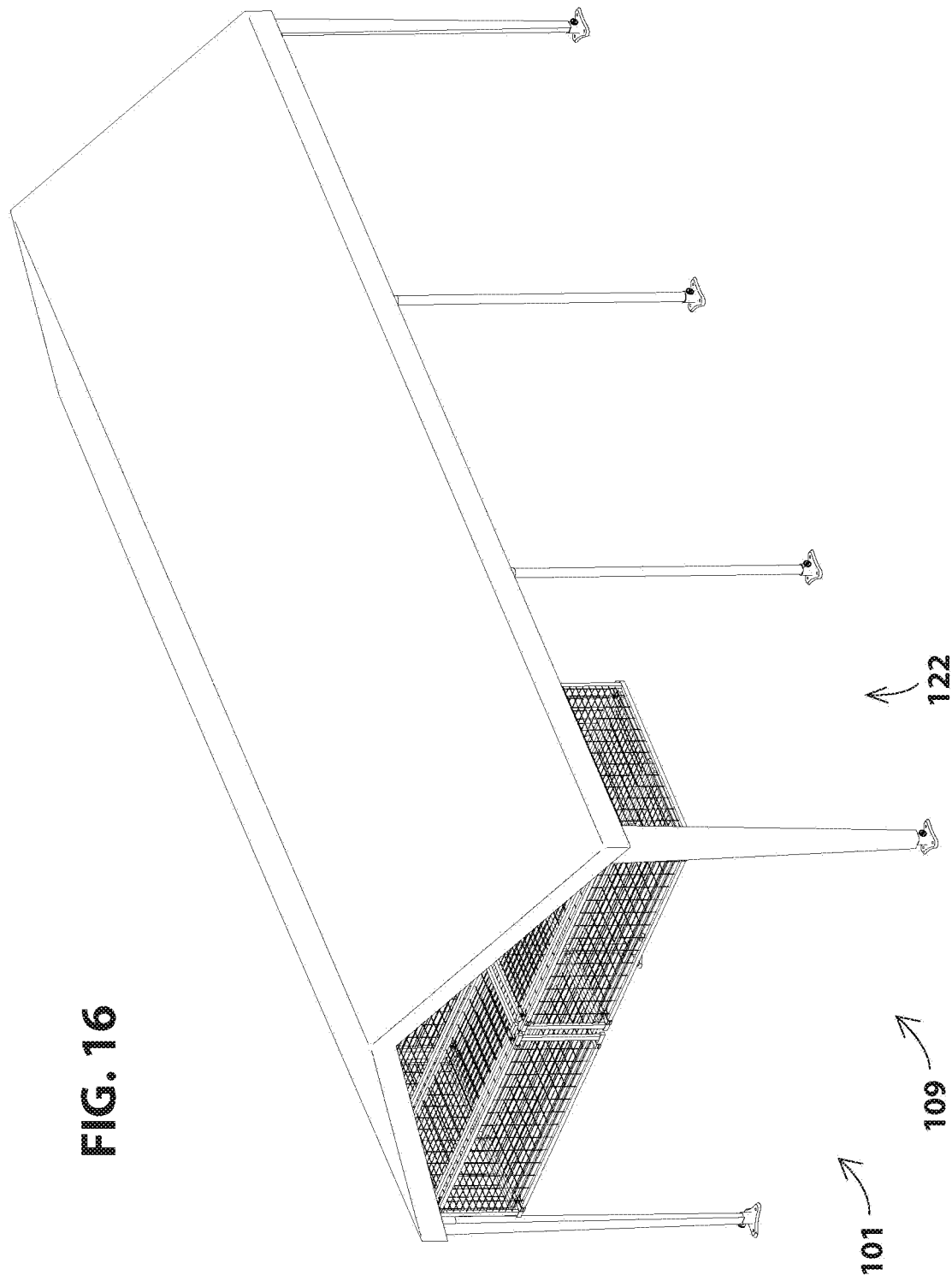
FIG. 16 illustrates a perspective view of reversible multi-function carport privacy-screen wind-screen cabana retail-booth canopy system 101, multi-configurable articulated canopy frame system 109, and multi-configurable kennel cabana wind-barrier privacy-screen privacy-room dog-run shelf attic cage table sign panel system 122.
Figure 17:
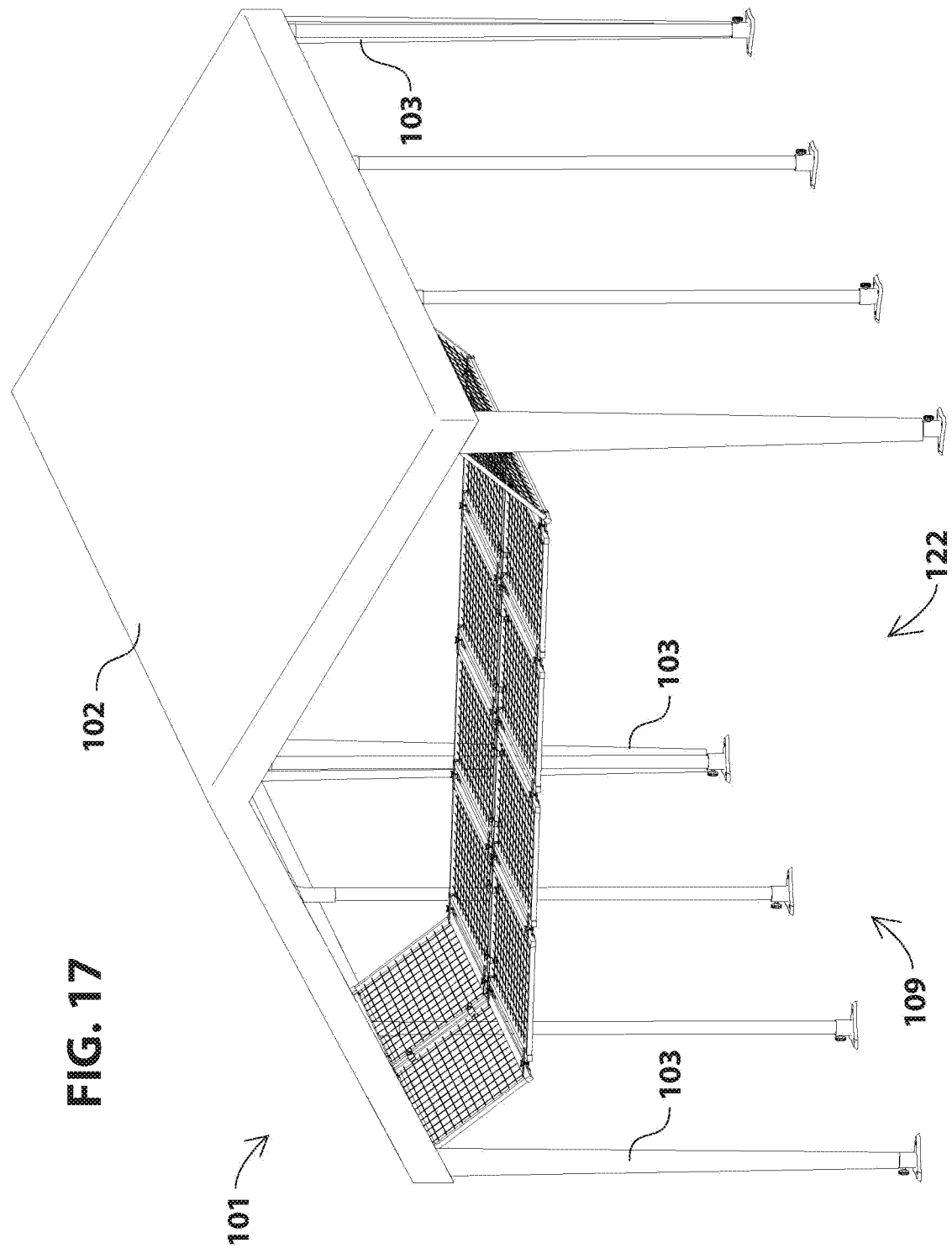
FIG. 17 illustrates a perspective view of reversible multi-function carport privacy-screen wind-screen cabana retail-booth canopy system 101, multi-configurable articulated canopy frame system 109, and multi-configurable kennel cabana wind-barrier privacy-screen privacy-room dog-run shelf attic cage table sign panel system 122.
Figure 18:
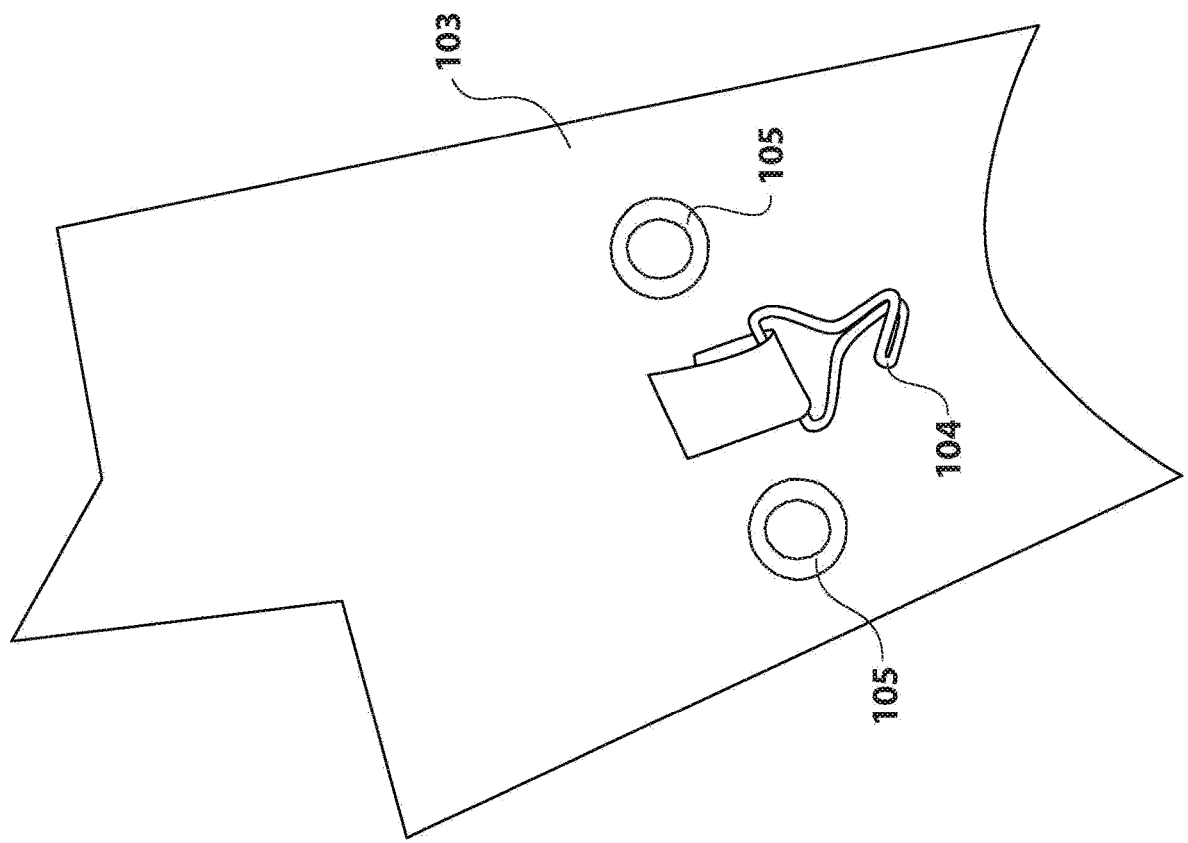
FIG. 18 illustrates a perspective view of corner canopy-tension adjusting hooks 104.
Figure 19:
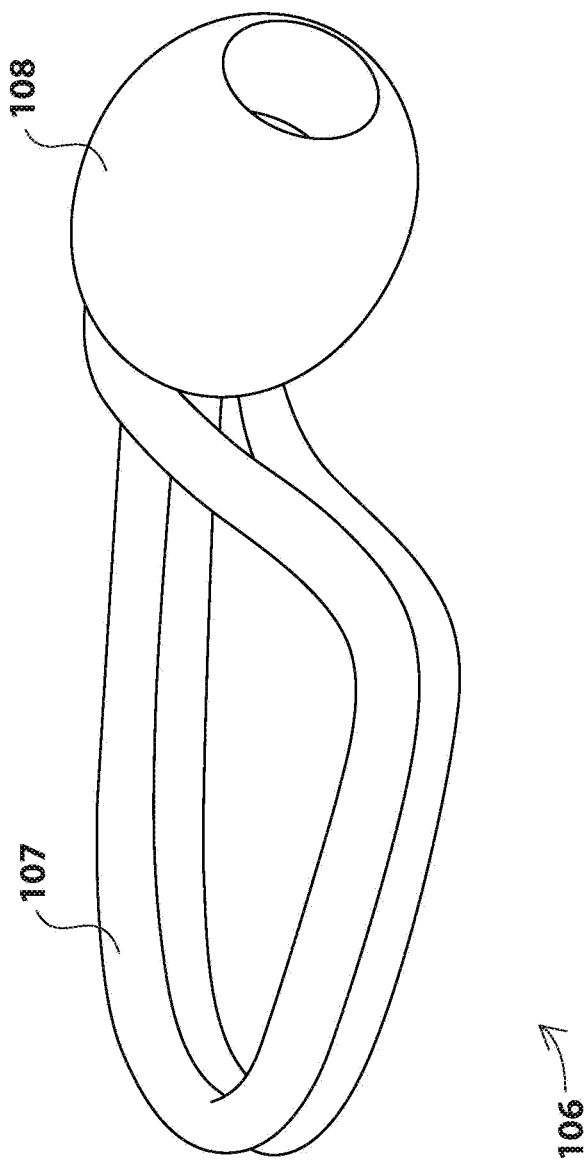
FIG. 19 illustrates a perspective view of tension-locking bungee-ball system 128.
Figure 20:
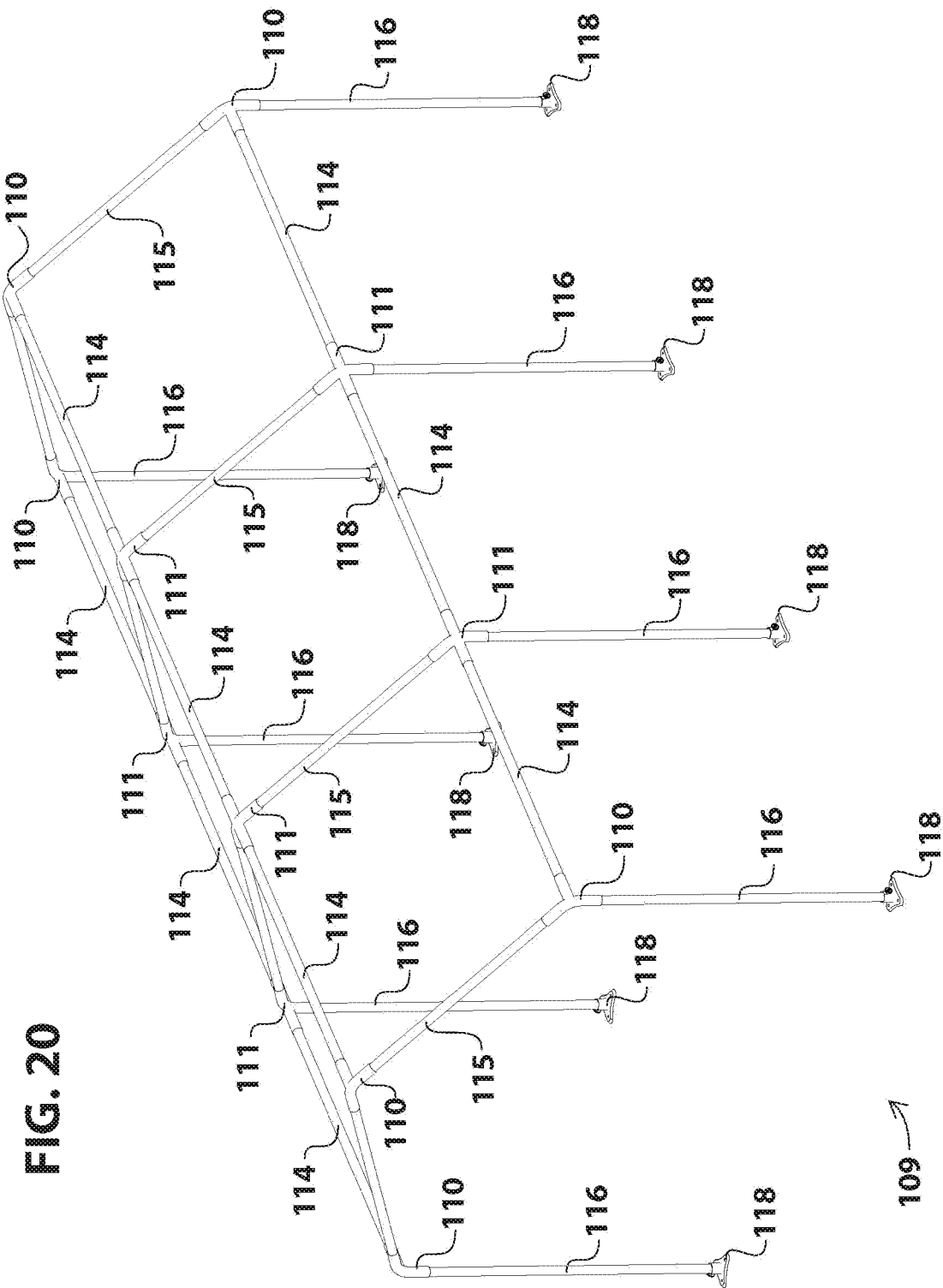
Figure 22:
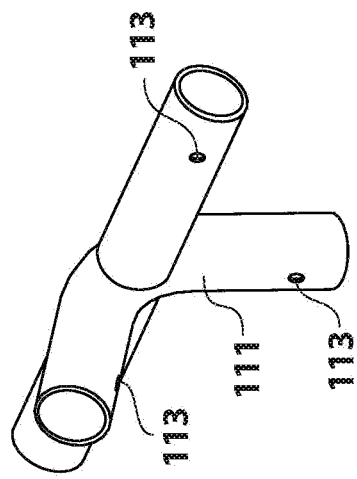
Figure 24:
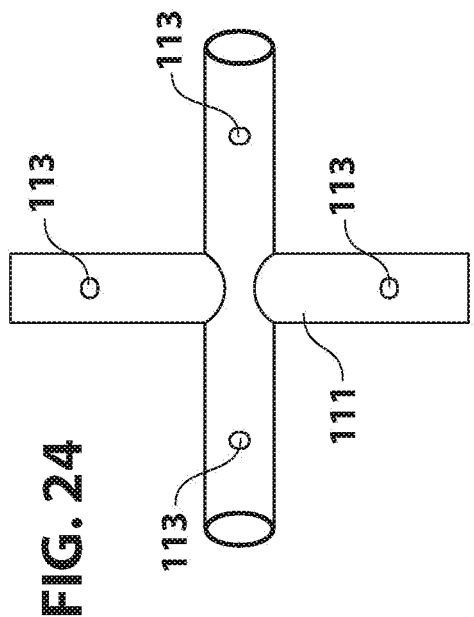
Figure 21:
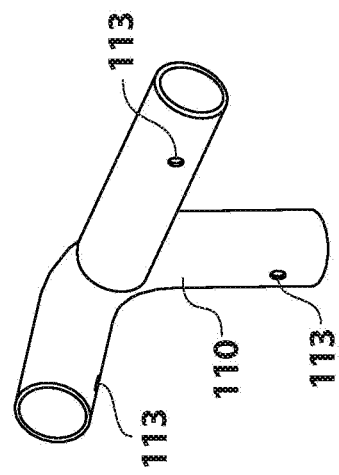
Figure 23:
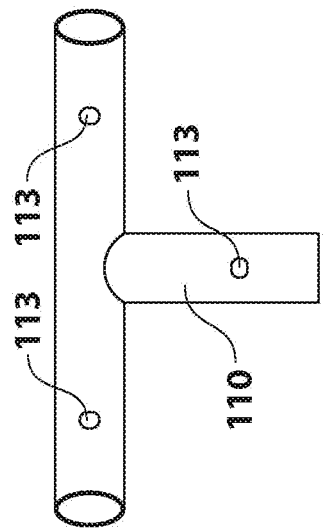
Figure 27:
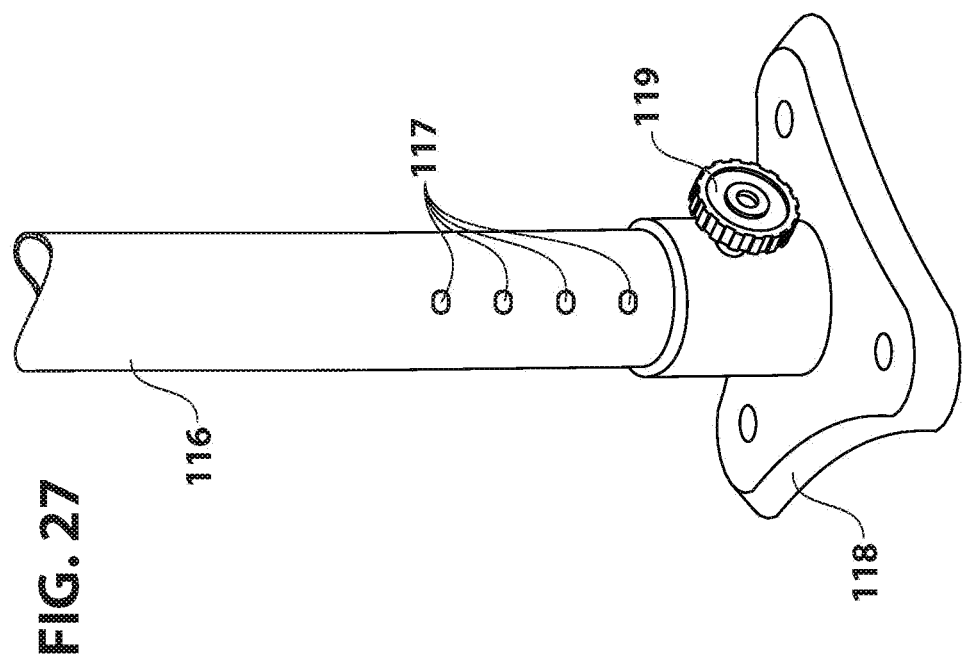
Figure 29:
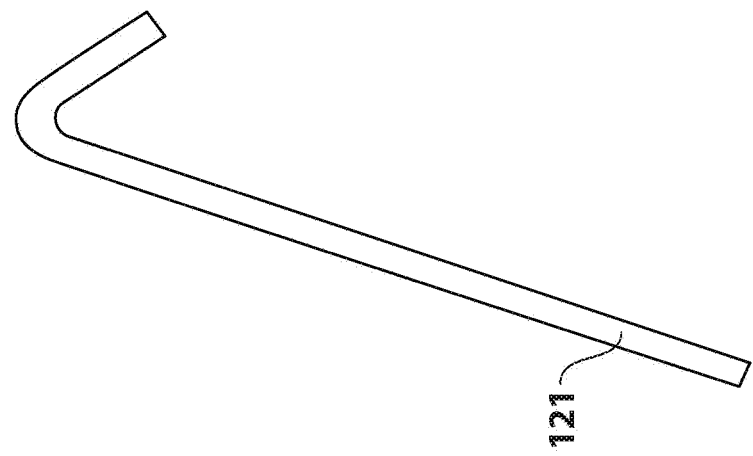
Figure 28:
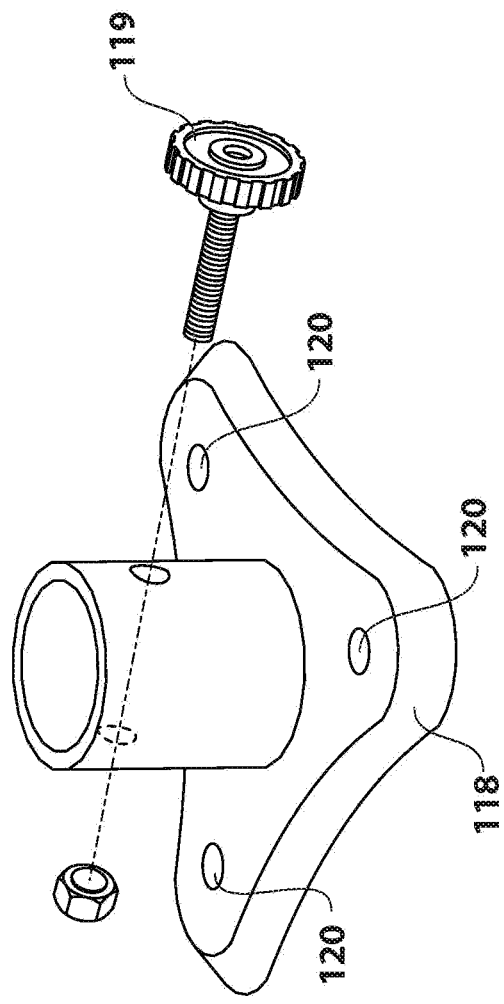
Figure 30:
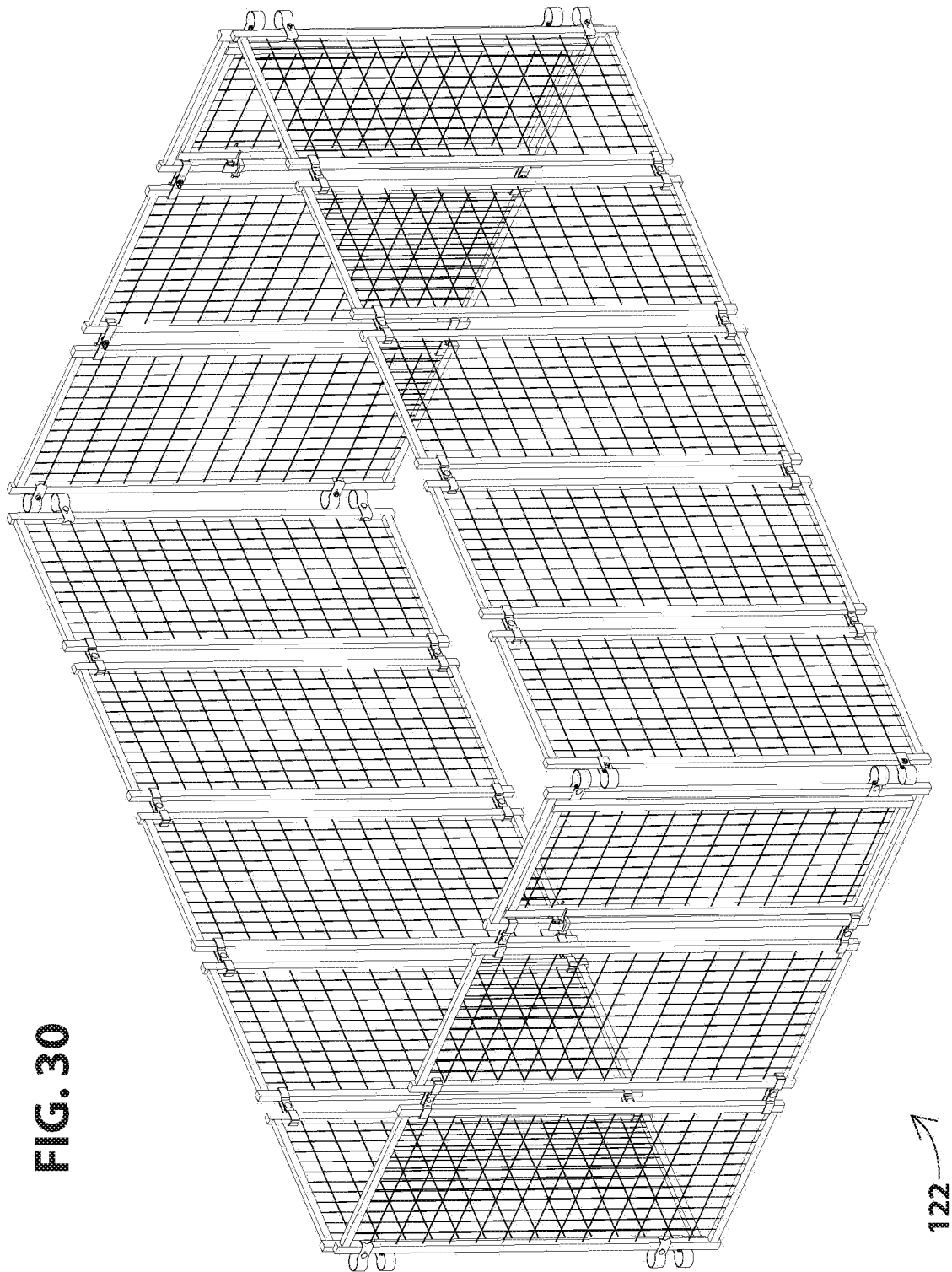
FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, and FIG. 45 illustrate perspective, front, and top cross-sectional views of multi-configurable panel-to-post-securing gap-controlling self-centering brackets 129 and its components.
Figure 32:
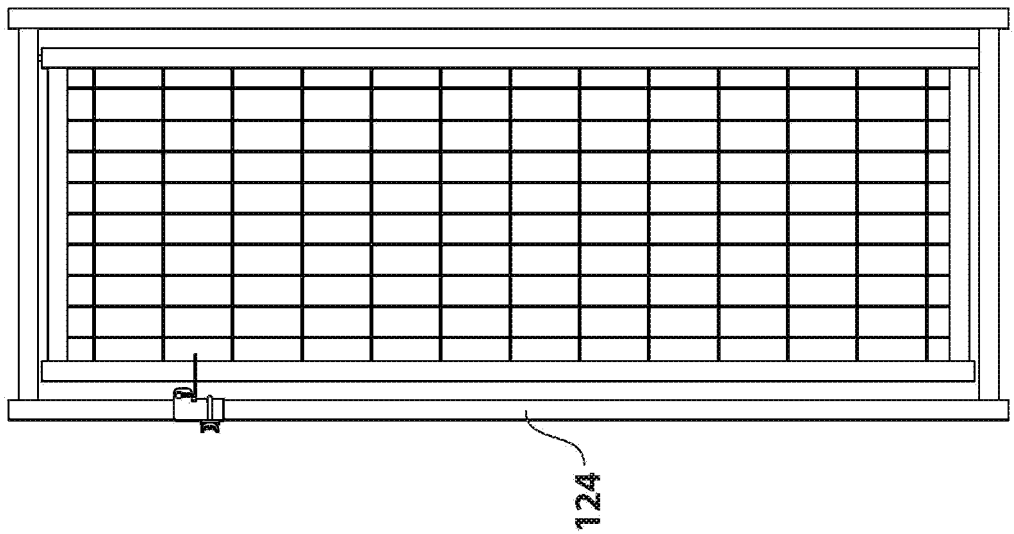
Figure 31:
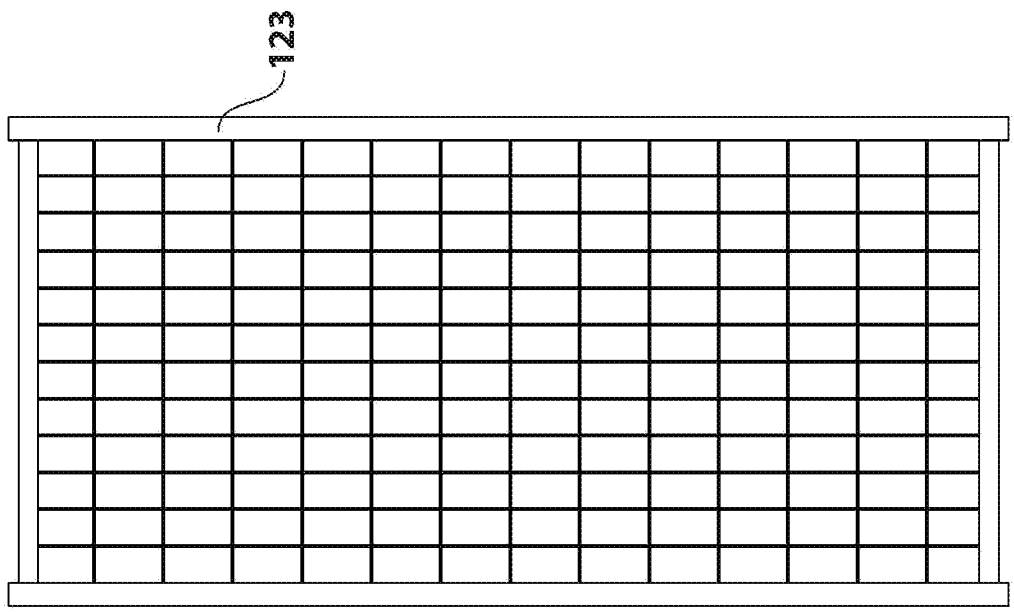
Figure 34:
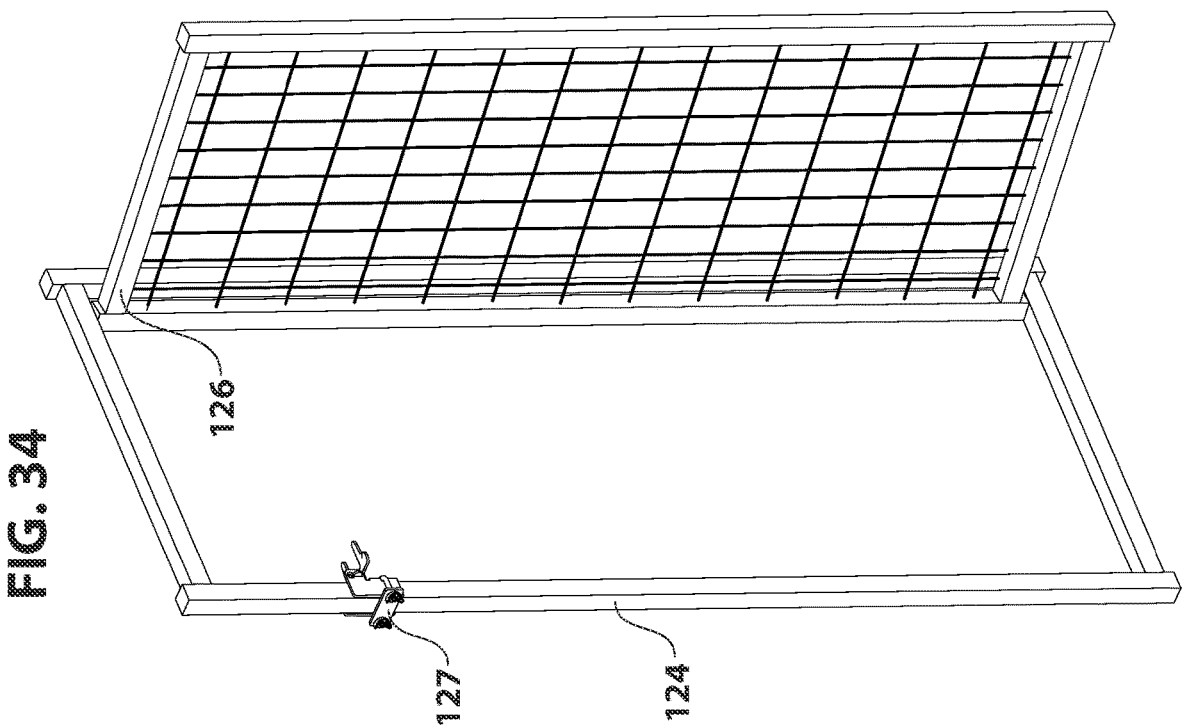
Figure 33:
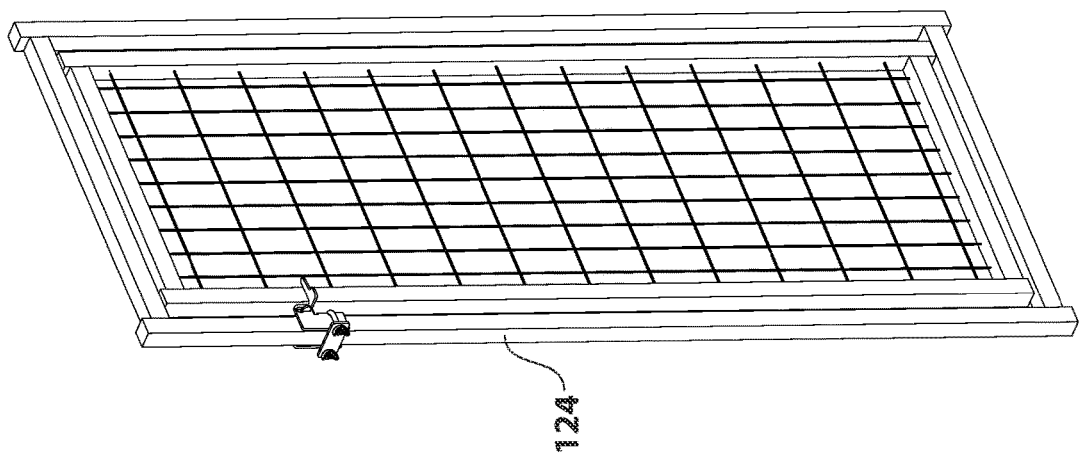
Figure 36:
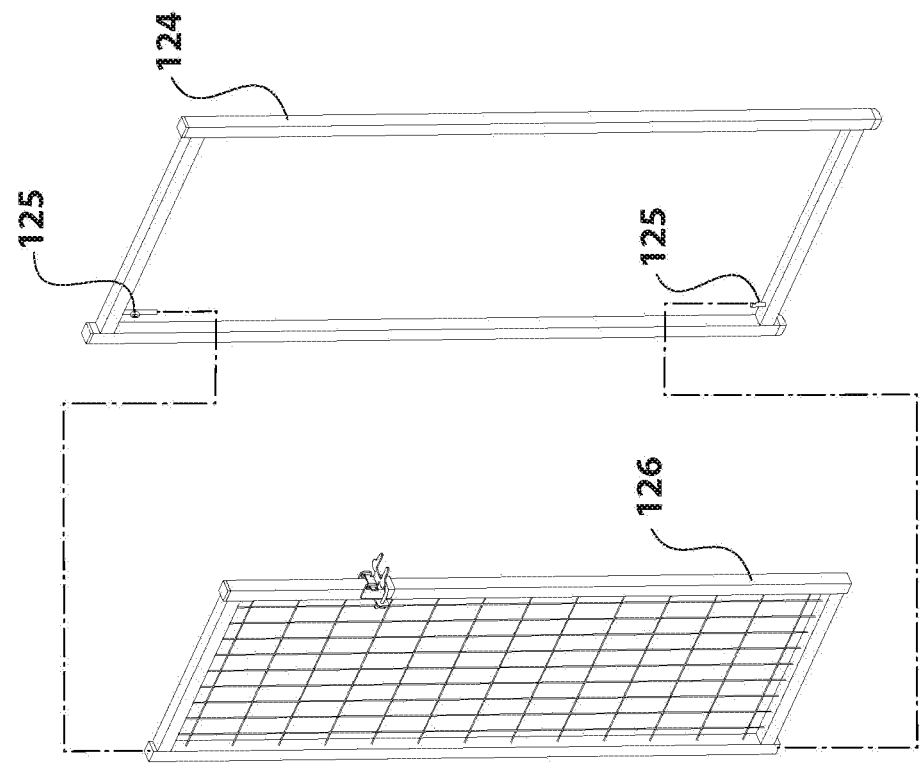
Figure 35:
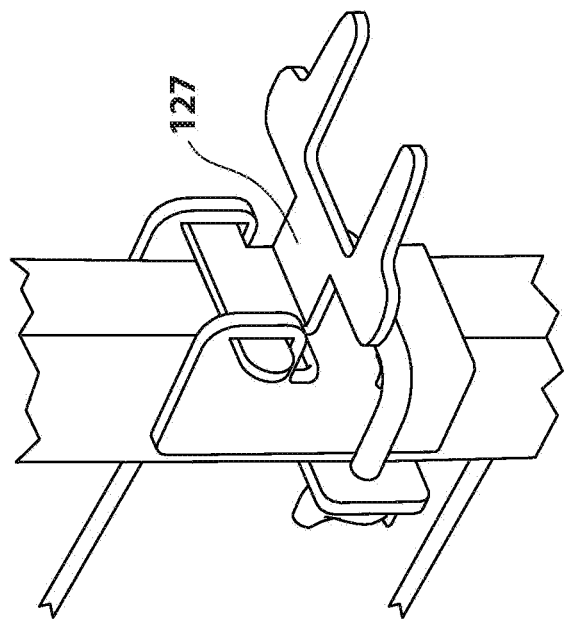
Figure 38:
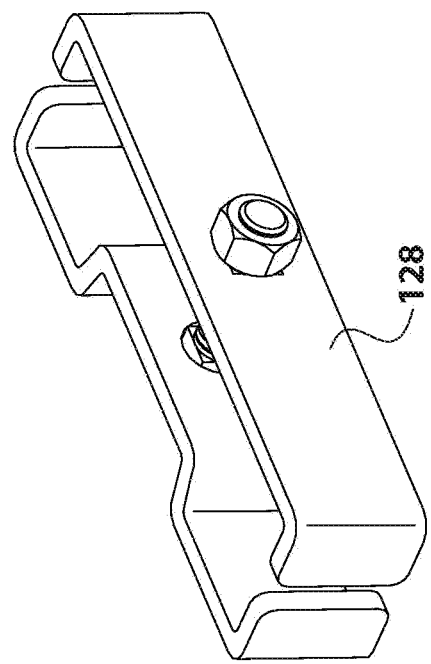
Figure 37:
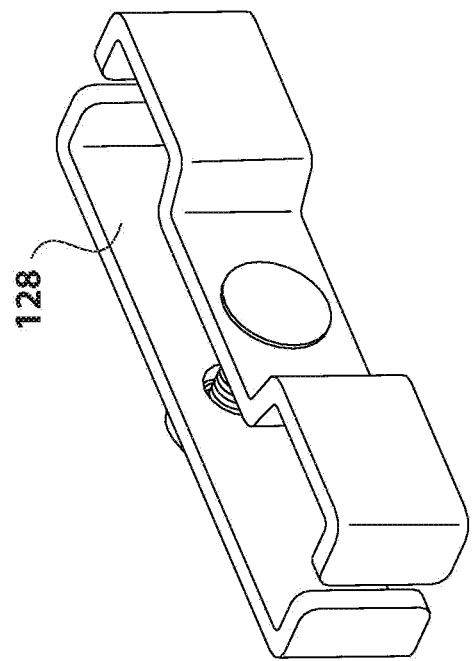
Figure 39:
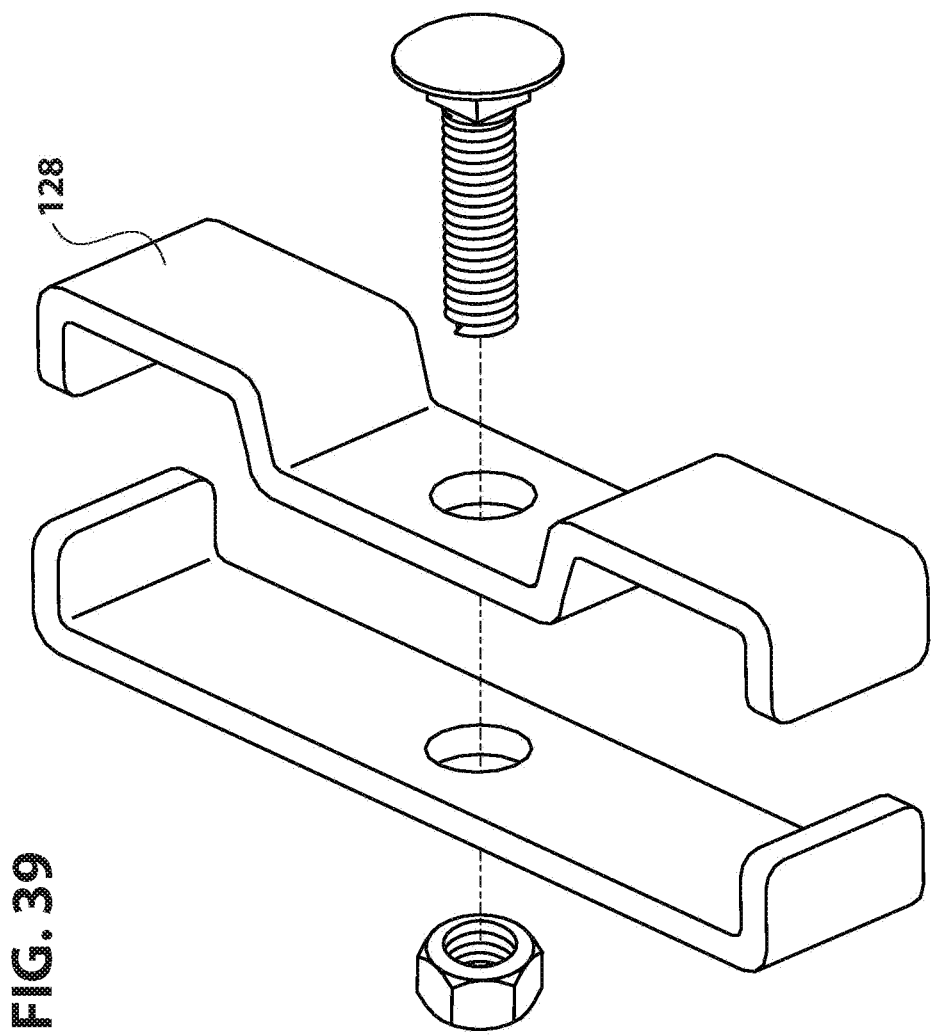
Figure 40:
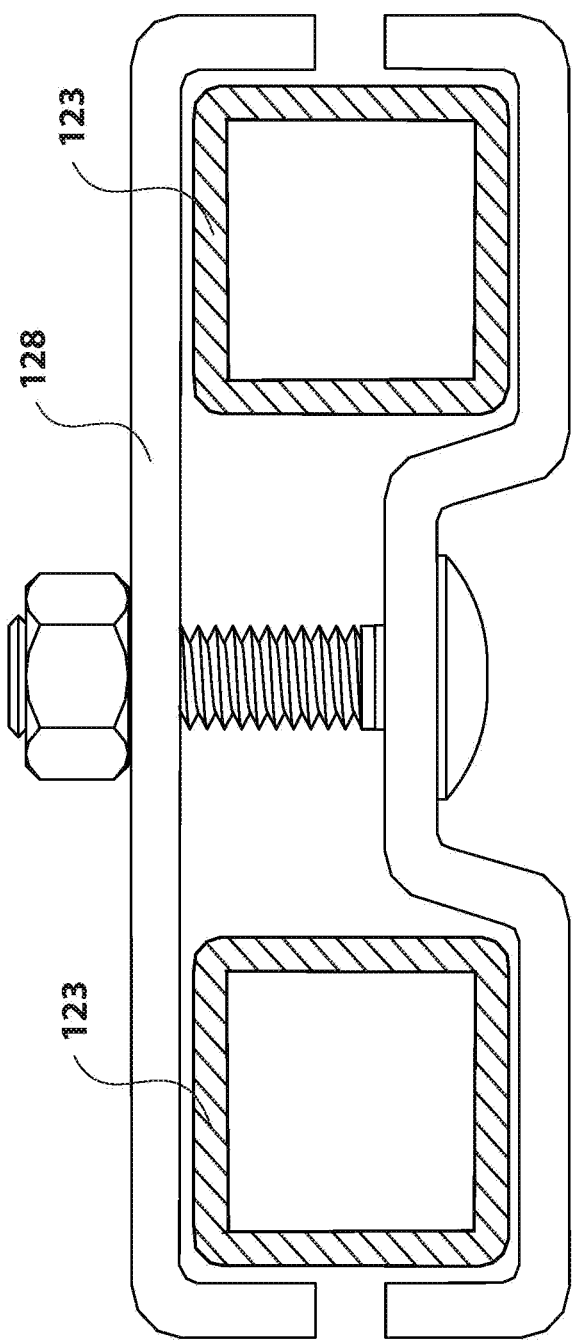
Figure 41:
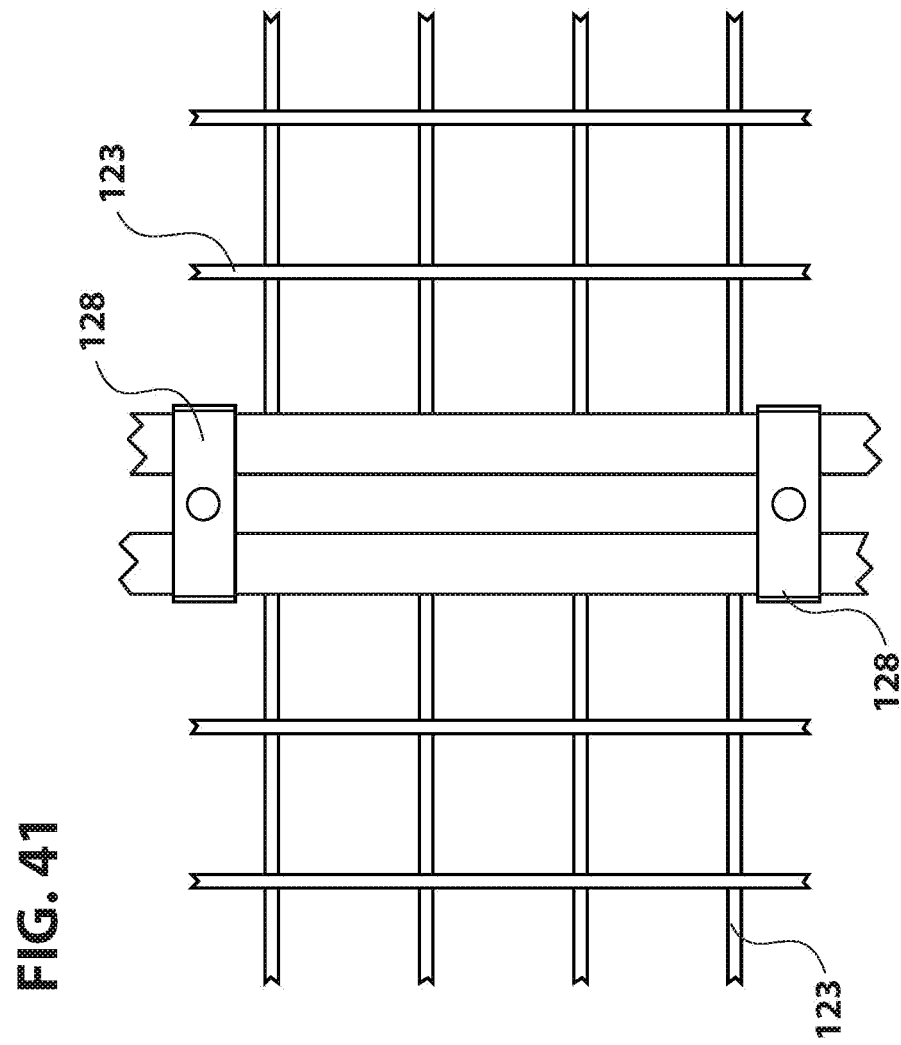
Figure 43:
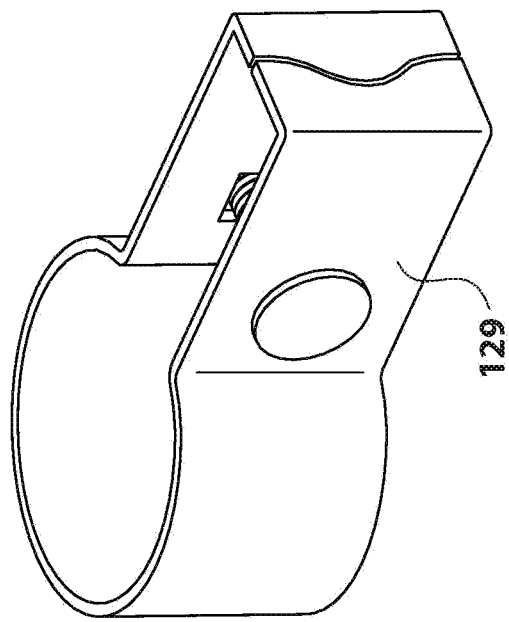
Figure 42:
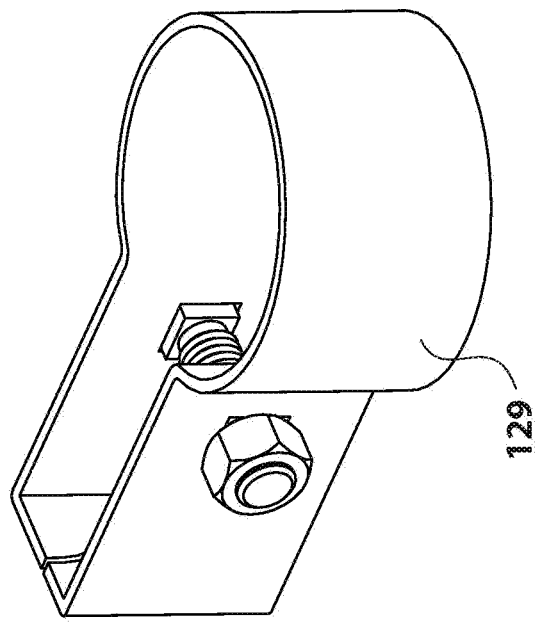
Figure 44:
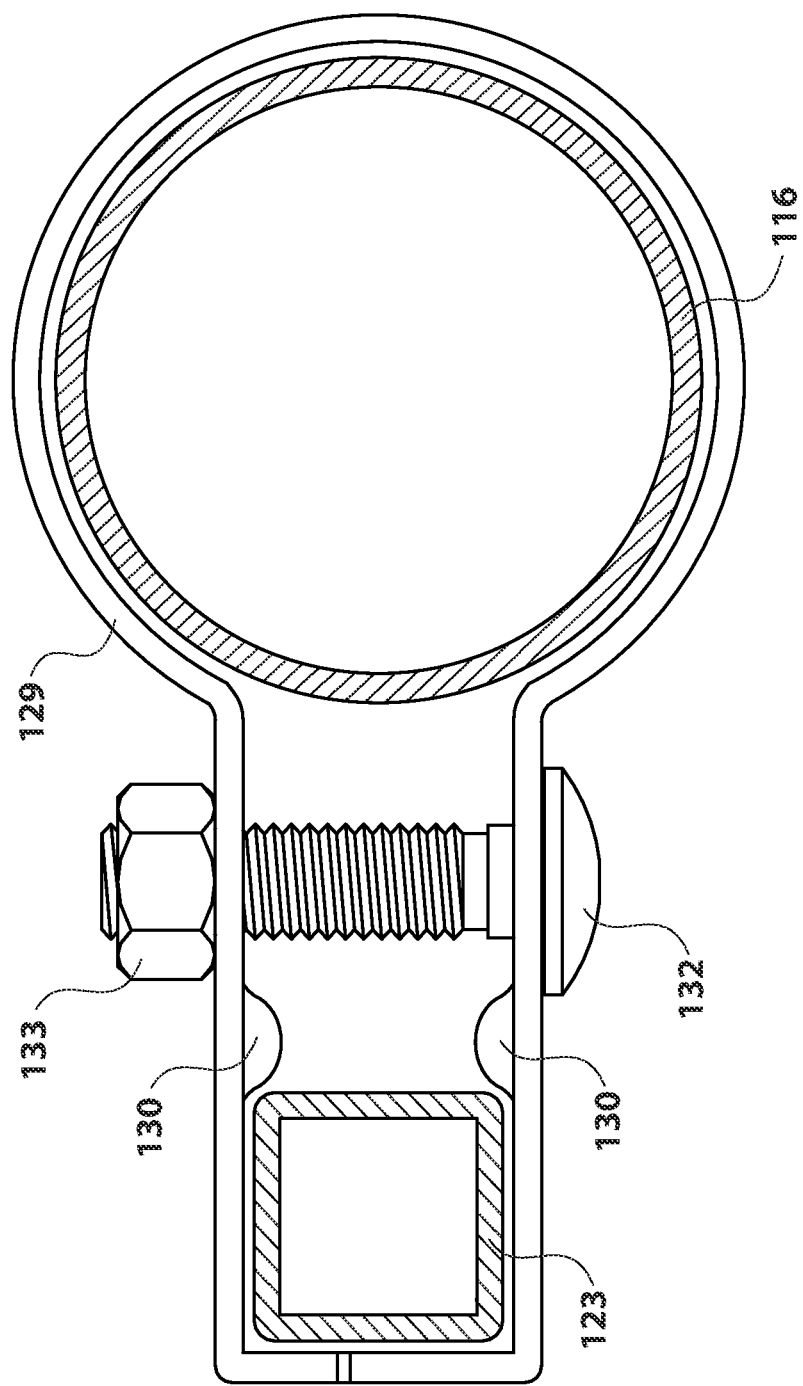
Figure 45:
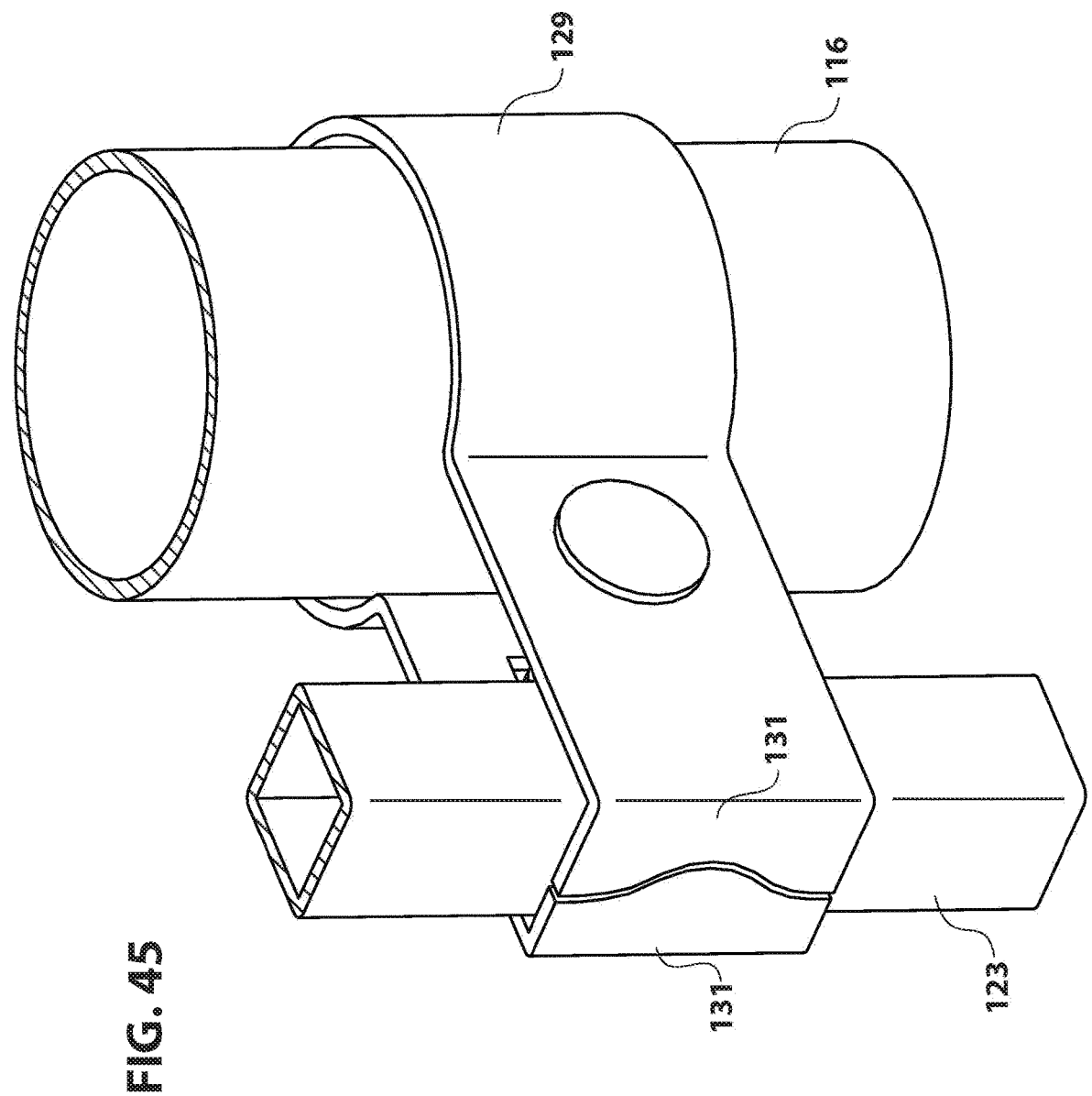
Figure 46:
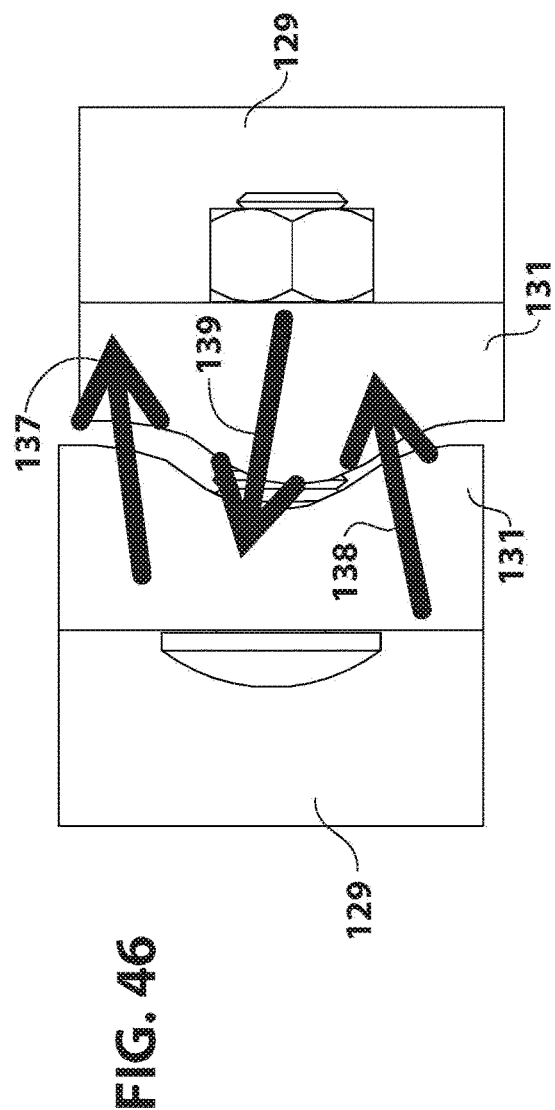
FIG. 46 and FIG. 47 illustrate front views demonstrating how the self-centering interlocking bracket heads 131 automatically align with each other when tightened.
Figure 47:
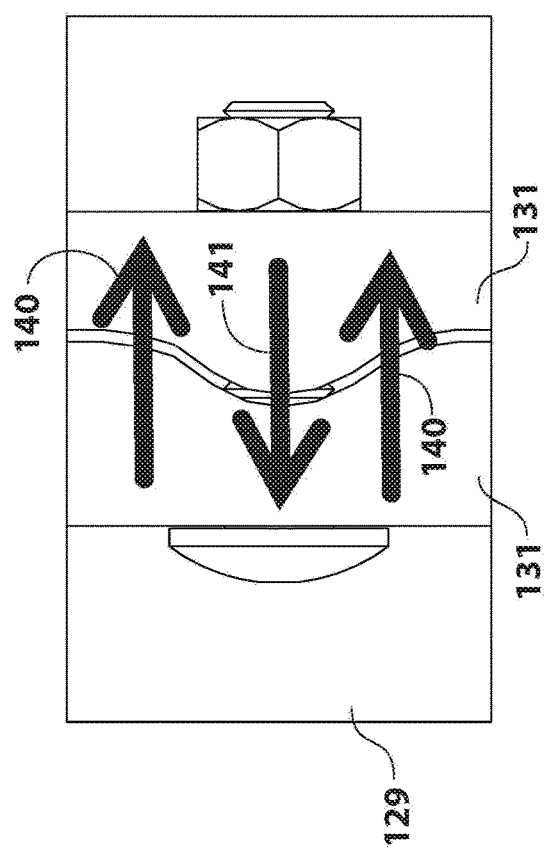

The ten-device-in-one reconfigurable adjustable carport (capable of functioning as a privacy screen, a wind screen, a cabana, a dog run, a retail-tradeshow booth, an attic, a storage, a picnic table, a kennel, and a carport) comprises:
1) Reversible multi-function carport privacy-screen windscreen cabana retail-booth canopy system,
2) Tension-locking bungee-ball system,
3) Multi-configurable multi-function articulated canopy frame system, and
4) Multi-configurable kennel cabana wind-barrier privacy-screen privacy-room dog-run shelf attic cage table sign panel system.

Component

Referring to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, and FIG. 45, the ten-device-in-one reconfigurable adjustable carport, (capable of functioning as a privacy screen, a wind screen, a cabana, a dog run, a retail-tradeshow booth, an attic, a storage, a picnic table, a kennel, and a carport) comprises:
1) Reversible multi-function carport privacy-screen windscreen cabana retail-booth canopy system 101 comprising (or each comprising):
2) Reversible roof carport privacy-screen windscreen cabana canopy 102,
3) Corner canopy-tension-adjusting frame-protecting louvers 103,
4) Corner canopy-tension adjusting hooks 104, and
5) Grommets 105;
6) Tension-locking bungee-ball system 106 comprising (or each comprising):
7) Tension-locking springable cord 107, and
8) Tension-securing ball-shaped hook 108;
9) Multi-configurable multi-function articulated canopy frame system 109 comprising (or each comprising):
10) Multi-configurable T-shaped joiner 110,
11) Multi-configurable X-shaped joiner 111,
12) Automatic spring-locking buttons 112,
13) Automatic spring-securing holes 113,
14) Multi-configurable roof spines 114,
15) Multi-configurable roof ribs 115,
16) Multi-configurable vertical leg posts 116,
17) Corner canopy-tension-adjusting holes 117,
18) Triple-anchorable feet 118,
19) Threaded feet-securing hand screws 119,
20) Terrain-anchoring spike holes 120, and
21) Terrain-anchoring spikes 121; and
22) Multi-configurable kennel cabana wind-barrier privacy-screen privacy-room dog-run shelf attic cage table sign panel system 122 comprising (or each comprising):
23) Multi-configurable panel 123,
24) Multi-configurable door frame panel 124,
25) Door hinge-pins 125,
26) Lockable door 126,
27) Automatic locking door latch 127,
28) Multi-configurable panel-to-panel-securing gap-controlling brackets 128,
29) Multi-configurable panel-to-post-securing gap-controlling self-centering brackets 129,
30) Post-securing gap-controlling nipples 130,
31) Self-centering interlocking bracket heads 131,
32) Bracket-securing bolts 132, and
33) Bracket-securing nuts 133.

Material

Referring to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, and FIG. 45:
1) Reversible multi-function carport privacy-screen windscreen cabana retail-booth canopy system 101 is (or are each) made of the combined materials of its components.
2) Reversible roof carport privacy-screen windscreen cabana canopy 102 is (or are each) made of canvas material.
3) Corner canopy-tension-adjusting frame-protecting louvers 103 is (or are each) made of canvas material.
4) Corner canopy-tension adjusting hooks 104 is (or are each) made of metallic material. 5) Grommets 105 is (or are each) made of metallic material.
6) Tension-locking bungee-ball system 106 is (or are each) made of the combined materials of its components.
7) Tension-locking springable cord 107 is (or are each) made of stretchy material.
8) Tension-securing ball-shaped hook 108 is (or are each) made of rubber material.
9) Multi-configurable multi-function articulated canopy frame system 109 is (or are each) made of the combined materials of its components.
10) Multi-configurable T-shaped joiner 110 is (or are each) made of metallic material.
11) Multi-configurable X-shaped joiner 111 is (or are each) made of metallic material.
12) Automatic spring-locking buttons 112 is (or are each) made of metallic material.
13) Automatic spring-securing holes 113 is (or are each) made of empty space.
14) Multi-configurable roof spines 114 is (or are each) made of metallic material.
15) Multi-configurable roof ribs 115 is (or are each) made of metallic material.
16) Multi-configurable vertical leg posts 116 is (or are each) made of metallic material.
17) Corner canopy-tension-adjusting holes 117 is (or are each) made of empty space.
18) Triple-anchorable feet 118 is (or are each) made of metallic material.
19) Threaded feet-securing hand screws 119 is (or are each) made of plastic and metallic material.
20) Terrain-anchoring spike holes 120 is (or are each) made of empty space.
21) Terrain-anchoring spikes 121 is (or are each) made of metallic material.
22) Multi-configurable kennel cabana wind-barrier privacy-screen privacy-room dog-run shelf attic cage table sign panel system 122 is (or are each) made of the combined materials of its components.
23) Multi-configurable panel 123 is (or are each) made of metallic material.
24) Multi-configurable door frame panel 124 is (or are each) made of metallic material.
25) Door hinge-pins 125 is (or are each) made of metallic material.
26) Lockable door 126 is (or are each) made of metallic material.
27) Automatic locking door latch 127 is (or are each) made of metallic material.

28) Multi-configurable panel-to-panel-securing gap-controlling brackets 128 is (or are each) made of metallic material.
29) Multi-configurable panel-to-post-securing gap-controlling self-centering brackets 129 is (or are each) made of metallic material.
30) Post-securing gap-controlling nipples 130 is (or are each) made of metallic material.
31) Self-centering interlocking bracket heads 131 is (or are each) made of metallic material.
32) Bracket-securing bolts 132 is (or are each) made of metallic material.
33) Bracket-securing nuts 133 is (or are each) made of metallic material.

SHAPE

Referring to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, and FIG. 45:

1) Reversible multi-function carport privacy-screen windscreen cabana retail-booth canopy system 101 is (or are each) formed into the combined shapes of its components.
2) Reversible roof carport privacy-screen windscreen cabana canopy 102 is (or are each) formed into rectangle shape.
3) Corner canopy-tension-adjusting frame-protecting louvers 103 is (or are each) formed into elongated trapezoidal shape.
4) Corner canopy-tension adjusting hooks 104 is (or are each) formed into hook shape. 5) Grommets 105 is (or are each) formed into circular.
6) Tension-locking bungee-ball system 106 is (or are each) formed into the combined shapes of its components.
7) Tension-locking springable cord 107 is (or are each) formed into cord shape.
8) Tension-securing ball-shaped hook 108 is (or are each) formed into ball shape.
9) Multi-configurable multi-function articulated canopy frame system 109 is (or are each) formed into the combined shapes of its components.
10) Multi-configurable T-shaped joiner 110 is (or are each) formed into T shape.
11) Multi-configurable X-shaped joiner 111 is (or are each) formed into X shape.
12) Automatic spring-locking buttons 112 is (or are each) formed into C with a nipple shape.
13) Automatic spring-securing holes 113 is (or are each) formed into round shape.
14) Multi-configurable roof spines 114 is (or are each) formed into tube shape.
15) Multi-configurable roof ribs 115 is (or are each) formed into tube shape.
16) Multi-configurable vertical leg posts 116 is (or are each) formed into tube shape.
17) Corner canopy-tension-adjusting holes 117 is (or are each) formed into oval shape.
18) Triple-anchorable feet 118 is (or are each) formed into rounded-triangle shape.
19) Threaded feet-securing hand screws 119 is (or are each) formed into cylinder with a threaded rod shape.
20) Terrain-anchoring spike holes 120 is (or are each) formed into round shape.
21) Terrain-anchoring spikes 121 is (or are each) formed into rod shape with a hook top shape.
22) Multi-configurable kennel cabana wind-barrier privacy-screen privacy-room dog-run shelf attic cage table sign panel system 122 is (or are each) formed into the combined shapes of its components shape.
23) Multi-configurable panel 123 is (or are each) formed into rectangle shape.
24) Multi-configurable door frame panel 124 is (or are each) formed into rectangle shape.
25) Door hinge-pins 125 is (or are each) formed into cylinder shape.
26) Lockable door 126 is (or are each) formed into rectangle shape.
27) Automatic locking door latch 127 is (or are each) formed into latch shape.
28) Multi-configurable panel-to-panel-securing gap-controlling brackets 128 is (or are each) formed into double-stacked rectangle shape.
29) Multi-configurable panel-to-post-securing gap-controlling self-centering brackets 129 is (or are each) formed into rectangle with a cylindrical end shape.
30) Post-securing gap-controlling nipples 130 is (or are each) formed into dome shape.
31) Self-centering interlocking bracket heads 131 is (or are each) formed into wavy split square shape.
32) Bracket-securing bolts 132 is (or are each) formed into threaded-cylinder-with-hexagon shape.
33) Bracket-securing nuts 133 is (or are each) formed into hexagon-with-a-round-hole shape.

Connection

Referring to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, and FIG. 45:

1) Reversible multi-function carport privacy-screen windscreen cabana retail-booth canopy system 101 is (or are respectively) connected by the combined connections of its components.
2) Reversible roof carport privacy-screen windscreen cabana canopy 102 is (or are respectively) sewn to corner canopy-tension-adjusting frame-protecting louvers 103.
3) Corner canopy-tension-adjusting frame-protecting louvers 103 is (or are respectively) sewn to reversible roof carport privacy-screen windscreen cabana canopy 102.
4) Corner canopy-tension adjusting hooks 104 is (or are respectively) sewn to corner canopy-tension-adjusting frame-protecting louvers 103.
5) Grommets 105 is (or are respectively) attached to the surface of reversible roof carport privacy-screen windscreen cabana canopy 102 and corner canopy-tension-adjusting frame-protecting louvers 103.
6) Tension-locking bungee-ball system 106 is (or are respectively) connected by the combined connections of its components.
7) Tension-locking springable cord 107 is (or are respectively) elastically threaded through tension-securing ball-shaped hook 108.
8) Tension-securing ball-shaped hook 108 is (or are respectively) attached to tension-locking springable cord 107.
9) Multi-configurable multi-function articulated canopy frame system 109 is (or are respectively) connected by the combined connections of its components.

10) Multi-configurable T-shaped joiner 110 is (or are respectively) spring-snappingly connected to multi-configurable roof spines 114, multi-configurable roof ribs 115, and/or multi-configurable vertical leg posts 116.
11) Multi-configurable X-shaped joiner 111 is (or are respectively) spring-snappingly connected to multi-configurable roof spines 114, multi-configurable roof ribs 115, and/or multi-configurable vertical leg posts 116.
12) Automatic spring-locking buttons 112 is (or are respectively) springingly inserted within multi-configurable roof spines 114, multi-configurable roof ribs 115, and multi configurable vertical leg posts 116.
13) Automatic spring-securing holes 113 is (or are respectively) drilled in multi-configurable t-shaped joiner 110 and multi-configurable x-shaped joiner 111.
14) Multi-configurable roof spines 114 is (or are respectively) inserted on an end of multi-configurable t-shaped joiner 110, and/or multi-configurable x-shaped joiner 111, and/or inserted into triple-anchorable feet 118.
15) Multi-configurable roof ribs 115 is (or are respectively) inserted on an end of multi-configurable t-shaped joiner 110, and/or multi-configurable x-shaped joiner 111, and/or inserted into triple-anchorable feet 118.
16) Multi-configurable vertical leg posts 116 is (or are respectively) inserted on an end of multi-configurable t-shaped joiner 110 and/or multi-configurable x-shaped joiner 111, and/or inserted into triple-anchorable feet 118.
17) Corner canopy-tension-adjusting holes 117 is (or are respectively) punched out of multi-configurable vertical leg posts 116.
18) Triple-anchorable feet 118 is (or are respectively) inserted on an end of multi-configurable roof spines 114, multi-configurable roof ribs 115, and/or multi-configurable vertical leg posts 116.
19) Threaded feet-securing hand screws 119 is (or are respectively) inserted through triple-anchorable feet 118 and bottom end of multi-configurable vertical leg posts 116.
20) Terrain-anchoring spike holes 120 is (or are respectively) drilled into triple-anchorable feet 118.
21) Terrain-anchoring spikes 121 is (or are respectively) inserted through terrain-anchoring spike holes 120.
22) Multi-configurable kennel cabana wind-barrier privacy-screen privacy-room dog-run shelf attic cage table sign panel system 122 is (or are respectively) connected by the combined connections of its components.
23) Multi-configurable panel 123 is (or are respectively) attached to multi-configurable panel-to-panel-securing gap-controlling brackets 128 and/or multi-configurable panel-to-post-securing gap-controlling self-centering brackets 129.
24) Multi-configurable door frame panel 124 is (or are respectively) attached to multi-configurable panel-to-panel-securing gap-controlling brackets 128 and/or multi-configurable panel-to-post-securing gap-controlling self-centering brackets 129.
25) Door hinge-pins 125 is (or are respectively) welded to multi-configurable door frame panel 124.
26) Lockable door 126 is (or are respectively) swingingly attached to door hinge-pins 125.
27) Automatic locking door latch 127 is (or are respectively) secured to multi-configurable door frame panel 124.
28) Multi-configurable panel-to-panel-securing gap-controlling brackets 128 is (or are respectively) bolted to multi-configurable panel 123 and/or multi-configurable door frame panel 124.
29) Multi-configurable panel-to-post-securing gap-controlling self-centering brackets 129 is (or are respectively) bolted to multi-configurable panel 123, multi-configurable door frame panel 124, multi-configurable roof spines 114, multi-configurable roof ribs 115, and/or multi-configurable vertical leg posts 116.
30) Post-securing gap-controlling nipples 130 is (or are respectively) stamped into multi configurable panel-to-post-securing gap-controlling self-centering brackets 129.
31) Self-centering interlocking bracket heads 131 is (or are respectively) formed into the end of multi-configurable panel-to-post-securing gap-controlling self-centering brackets 129.
32) Bracket-securing bolts 132 is (or are respectively) inserted through multi-configurable panel-to-panel-securing gap-controlling brackets 128 and multi-configurable panel-to-post-securing gap-controlling self-centering brackets 129.
33) Bracket-securing nuts 133 is (or are respectively) threadedly attached onto bracket-securing bolts 132.

Function

Figure 48:
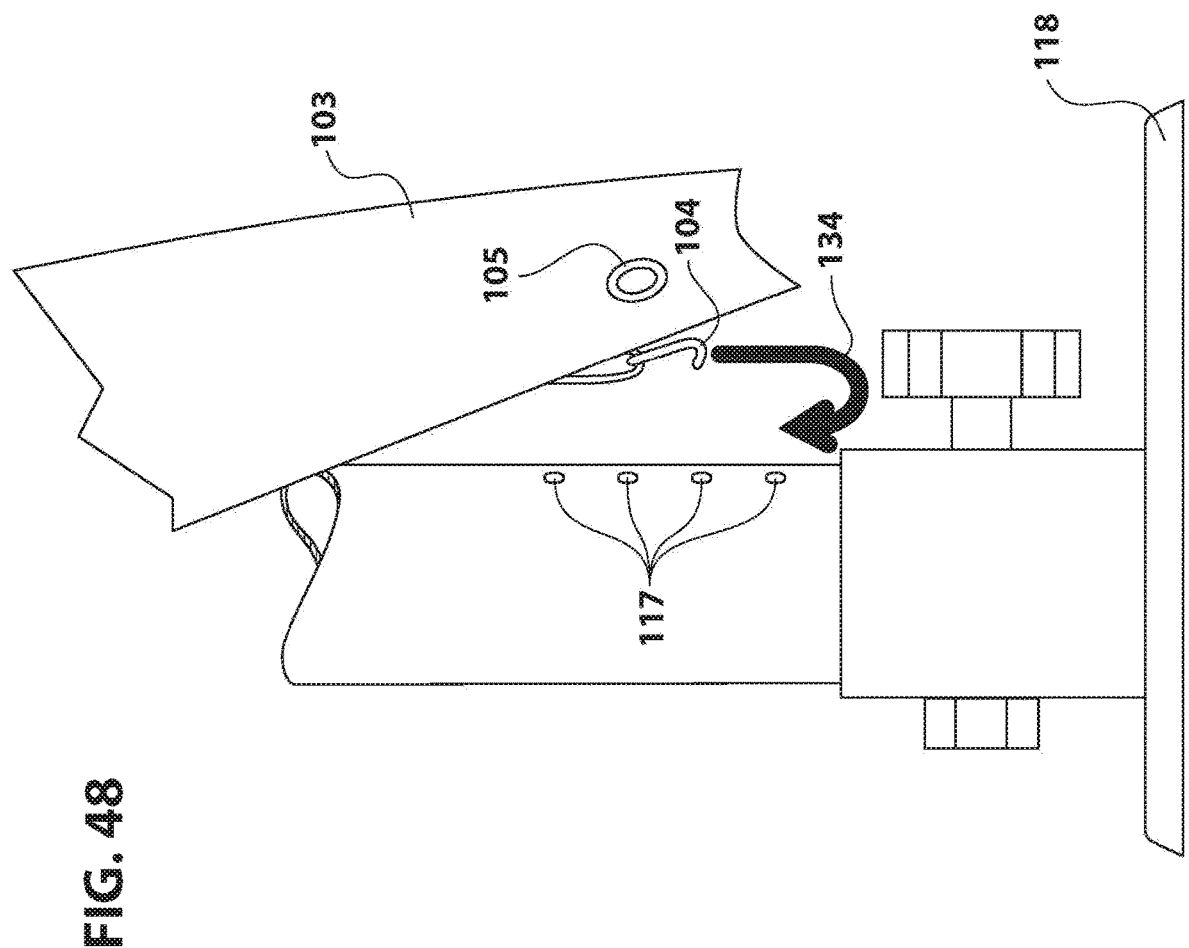
FIG. 48 illustrates a side view demonstrating the method for attaching and corner canopy-tension adjusting hooks 104 to corner canopy-tension-adjusting holes 117.
Figure 50:
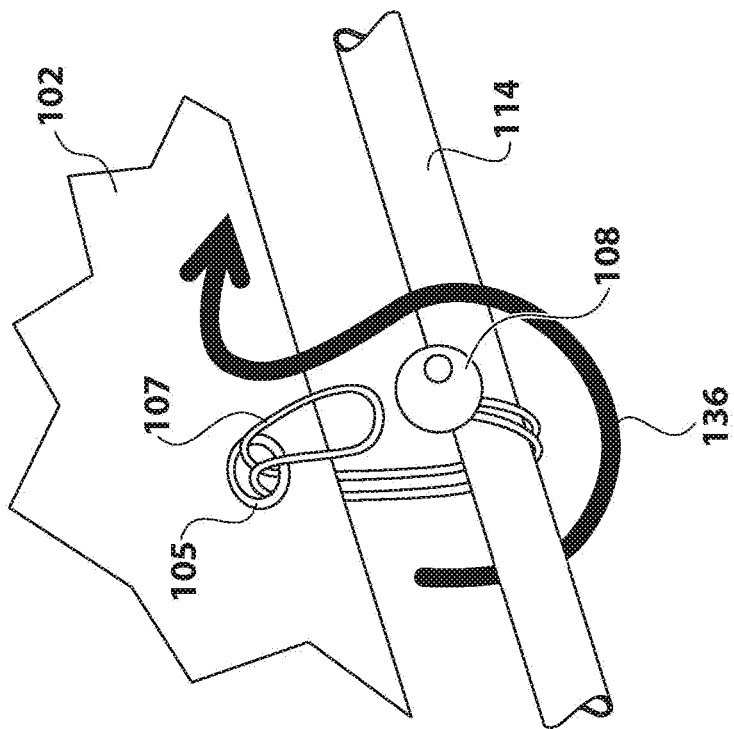
FIG. 49 and FIG. 50 illustrate perspective views demonstrating how tension-locking bungee-ball system 106 attaches to multi-configurable roof spines 114.
Figure 49:
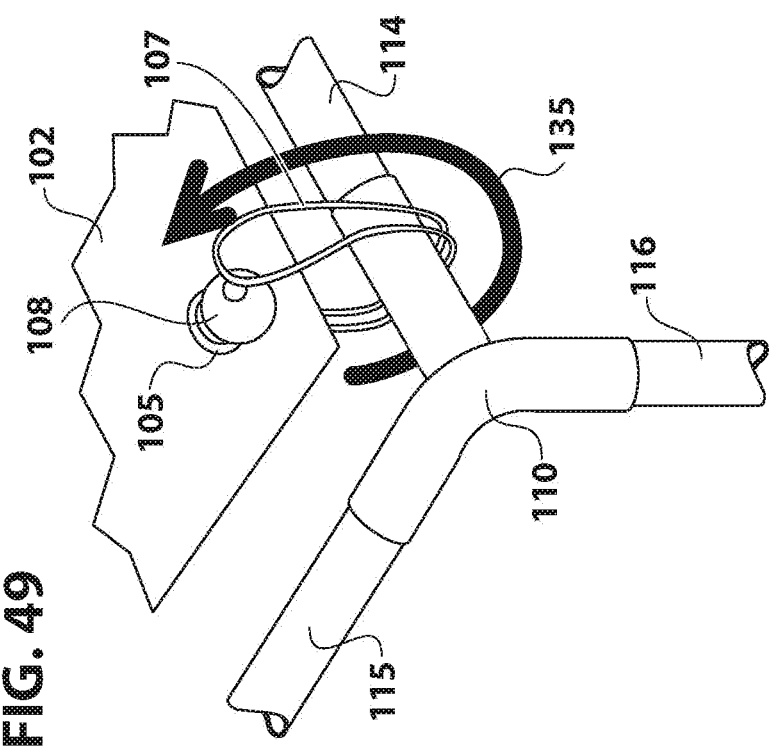
Figure 51:
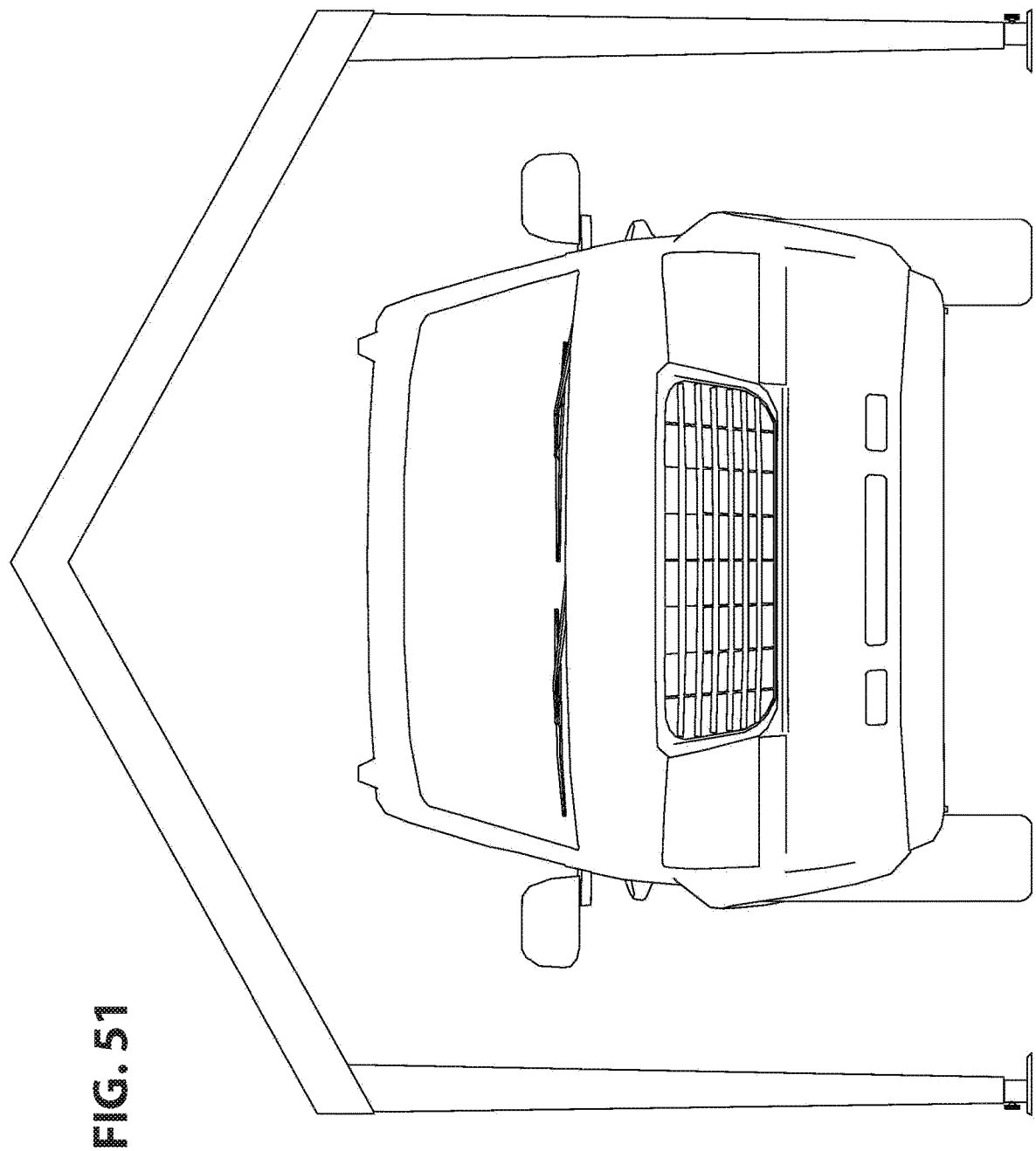
FIG. 51 illustrates a front view of a car parked within reversible multi-function carport privacy-screen wind-screen cabana retail-booth canopy system 101 when used as a carport.

Referring to FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62, FIG. 63, FIG. 64, FIG. 65, and FIG. 66:
1) Reversible multi-function carport privacy-screen windscreen cabana retail-booth canopy system 101 is (or are respectively) for performing the combined functions of its components.
2) Reversible roof carport privacy-screen windscreen cabana canopy 102 is (or are respectively) for:
   a) Providing shelter from rain for occupants and belongings; and
   b) Providing shelter from sun for occupants and belongings.
3) Corner canopy-tension-adjusting frame-protecting louvers 103 is (or are respectively) for:
   Protecting multi-configurable vertical leg posts 116 from getting wet to prevent rust which will prolong the lifetime canopy.
4) Corner canopy-tension adjusting hooks 104 is (or are respectively) for:
   Adjustably tensioning reversible roof carport privacy-screen windscreen cabana canopy 102 and corner canopy-tension-adjusting frame-protecting louvers 103 in the direction of arrow 134
   (see FIG. 48).
5) Grommets 105 is (or are respectively) for:
   Providing an opening to attach reversible roof carport privacy-screen windscreen cabana canopy 102 and corner canopy-tension-adjusting frame-protecting louvers 103 to multi-configurable multi-function articulated canopy frame system 109 using tension-locking bungee-ball system 106
   in the directions of arrows 135 and 136
   (see FIG. 49 and FIG. 50).
6) Tension-locking bungee-ball system 106 is (or are respectively) for performing the combined functions of its components
7) Tension-locking springable cord 107 is (or are respectively) for:
   Elastically connecting reversible multi-function carport privacy-screen wind-screen cabana retail-booth canopy system 101 to multi-configurable multi-function articulated canopy frame system 109
   in the directions of arrows 135 and 136
   (see FIG. 49 and FIG. 50).

8) Tension-securing ball-shaped hook 108 is (or are respectively) for:
   Providing a location for tension-locking springable cord 107 to attach to
   in the directions of arrows 135 and 136
   (see FIG. 49 and FIG. 50).
9) Multi-configurable multi-function articulated canopy frame system 109 is (or are respectively) for performing the combined functions of its components
10) Multi-configurable T-shaped joiner 110 is (or are respectively) for:
   a) Connecting multi-configurable roof spines 114, multi-configurable roof ribs 115, and/or multi-configurable vertical leg posts 116 together;
   b) Being configured as a car canopy
      (see FIG. 16);
   c) Being configured as a greenhouse
      (see FIG. 7 and FIG. 62);
   d) Being configured as an enclosure
      (see FIG. 10 and FIG. 65);
   e) Being configured as a barrier
      (see FIG. 9 and FIG. 64);
   f) Being configured as a cabana
      (see FIG. 7, FIG. 8, FIG. 62, and FIG. 63);
   g) Being configured as a privacy room
      (see FIG. 10 and FIG. 65);
   h) Being configured as a privacy screen
      (see FIG. 11 and FIG. 66);
   i) Being configured as a tradeshow booth
      (see FIG. 11 and FIG. 66); and
   j) Being configured as a wind barrier
      (see FIG. 9 and FIG. 64).
11) Multi-configurable X-shaped joiner 111 is (or are respectively) for:
   a) Connecting multi-configurable roof spines 114, multi-configurable roof ribs 115, and/or multi-configurable vertical leg posts 116 together;
   b) Being configured as a car canopy
      (see FIG. 16);
   c) Being configured as a greenhouse
      (see FIG. 7 and FIG. 62);
   d) Being configured as an enclosure
      (see FIG. 10 and FIG. 65);
   e) Being configured as a barrier
      (see FIG. 9 and FIG. 64);
   f) Being configured as a cabana
      (see FIG. 7, FIG. 8, FIG. 62, and FIG. 63);
   g) Being configured as a privacy room
      (see FIG. 10 and FIG. 65);
   h) Being configured as a privacy screen
      (see FIG. 11 and FIG. 66);
   i) Being configured as a tradeshow booth
      (see FIG. 11 and FIG. 66); and
   j) Being configured as a wind barrier
      (see FIG. 9 and FIG. 64).
12) Automatic spring-locking buttons 112 is (or are respectively) for:
   Preventing multi-configurable roof spines 114, multi-configurable roof ribs 115, and/or multi-configurable vertical leg posts 116 from detaching from multi-configurable T-shaped joiner 110 and/or multi-configurable X-shaped joiner 111 to prevent damage or injury to occupants and/or belongings.
13) Automatic spring-securing holes 113 is (or are respectively) for:
   Providing an opening for automatic spring-locking buttons 112.
14) Multi-configurable roof spines 114 is (or are respectively) for:
   a) Being Configured as a car canopy
      (see FIG. 16);
   b) Being configured as a greenhouse
      (see FIG. 7 and FIG. 62);
   c) Being configured as an enclosure
      (see FIG. 10 and FIG. 65);
   d) Being configured as a barrier
      (see FIG. 9 and FIG. 64);
   e) Being configured as a shed
      (see FIG. 13, FIG. 14, and FIG. 15);
   f) Being configured as a cabana
      (see FIG. 7, FIG. 8, FIG. 62, and FIG. 63);
   g) Being configured as a privacy room
      (see FIG. 10 and FIG. 65);
   h) Being configured as a privacy screen
      (see FIG. 11 and FIG. 66);
   i) Being configured as a tradeshow booth
      (see FIG. 11 and FIG. 66);
   j) Being configured as a wind barrier
      (see FIG. 9 and FIG. 64); and
   k) Providing structure and strength to multi-configurable multi-function articulated canopy frame system 109.
15) Multi-configurable roof ribs 115 is (or are respectively) for:
   a) Being configured as a car canopy
      (see FIG. 16);
   b) Being configured as a greenhouse
      (see FIG. 7 and FIG. 62);
   c) Being configured as an enclosure
      (see FIG. 10 and FIG. 65);
   d) Being configured as a barrier
      (see FIG. 9 and FIG. 64);
   e) Being configured as a shed
      (see FIG. 13, FIG. 14, and FIG. 15);
   f) Being configured as a cabana
      (see FIG. 7, FIG. 8, FIG. 62, and FIG. 63);
   g) Being configured as a privacy room
      (see FIG. 10 and FIG. 65);
   h) Being configured as a privacy screen
      (see FIG. 11 and FIG. 66);
   i) Being configured as a tradeshow booth
      (see FIG. 11 and FIG. 66);
   j) Being configured as a wind barrier
      (see FIG. 9 and FIG. 64); and
   k) Providing structure and strength to multi-configurable multi-function articulated canopy frame system 109.
16) Multi-configurable vertical leg posts 116 is (or are respectively) for:
   a) Being configured as a car canopy
      (see FIG. 16);
   b) Being configured as a greenhouse
      (see FIG. 7 and FIG. 62);
   c) Being configured as an enclosure
      (see FIG. 10 and FIG. 65);
   d) Being configured as a barrier
      (see FIG. 9 and FIG. 64);
   e) Being configured as a shed
      (see FIG. 13, FIG. 14, and FIG. 15);
   f) Being configured as a cabana
      (see FIG. 7, FIG. 8, FIG. 62, and FIG. 63);
   g) Being configured as a privacy room
      (see FIG. 10 and FIG. 65);
   h) Being configured as a privacy screen
      (see FIG. 11 and FIG. 66);

i) Being configured as a tradeshow booth
   (see FIG. 11 and FIG. 66);
j) Being configured as a wind barrier
   (see FIG. 9 and FIG. 64); and
k) Providing structure and strength to multi-configurable multi-function articulated canopy frame system 109.

17) Corner canopy-tension-adjusting holes 117 is (or are respectively) for:
   Providing a place for corner canopy-tension adjusting hooks 104 to attach.

18) Triple-anchorable feet 118 is (or are respectively) for:
   Providing stability and anchorability for multi-configurable multi-function articulated canopy frame system 109.

19) Threaded feet-securing hand screws 119 is (or are respectively) for:
   Attaching triple-anchorable feet 118 to multi-configurable vertical leg posts 116.

20) Terrain-anchoring spike holes 120 is (or are respectively) for:
   Providing holes, through which terrain-anchoring spikes 121 can secure triple-anchorable feet 118 to the ground.

21) Terrain-anchoring spikes 121 is (or are respectively) for:
   Securing triple-anchorable feet 118 to the ground.

Figure 52:
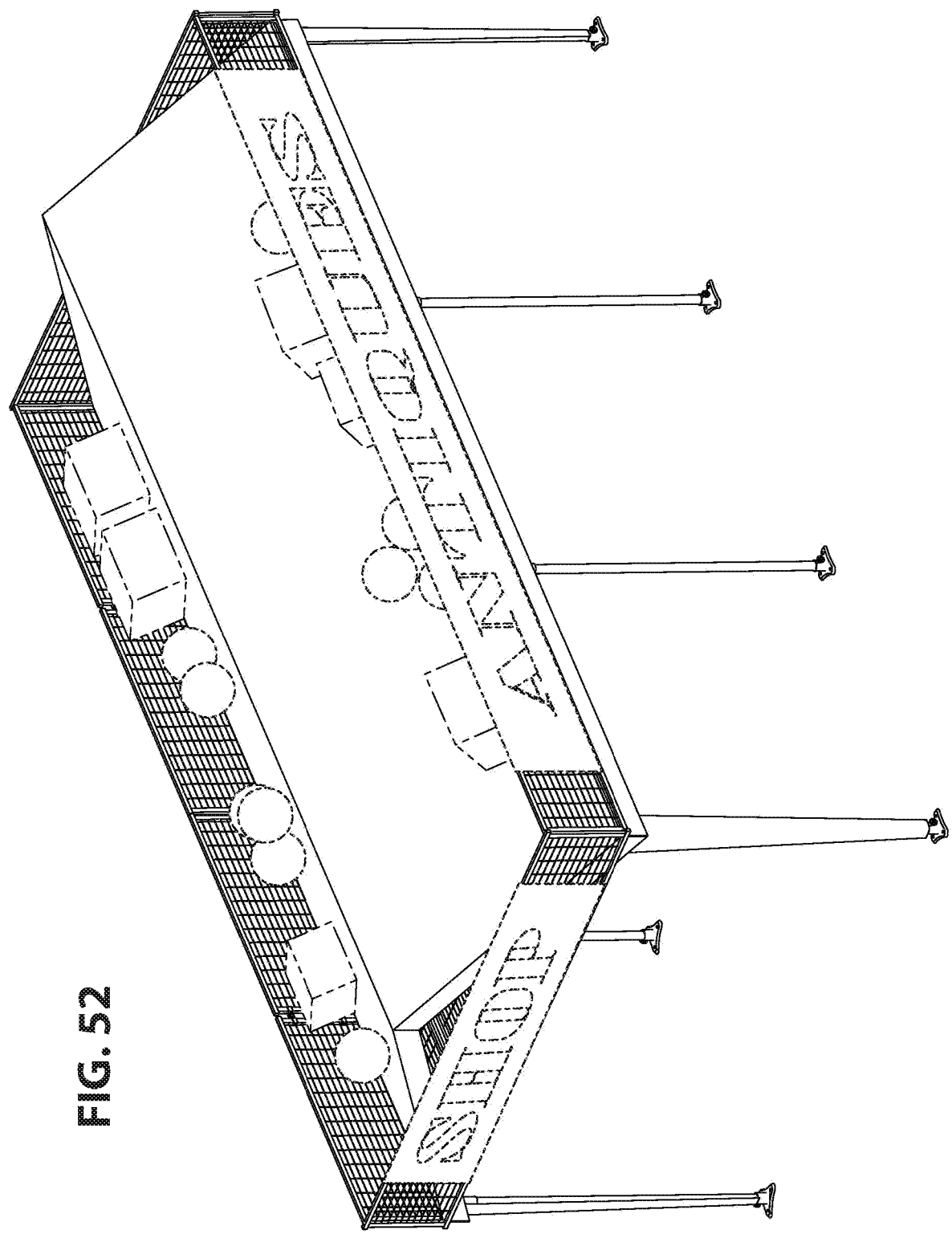
FIG. 52 illustrates a perspective view demonstrating the ten-device-in-one reconfigurable adjustable carport being configured as a canopy with sign displays and roof storage.
Figure 53:
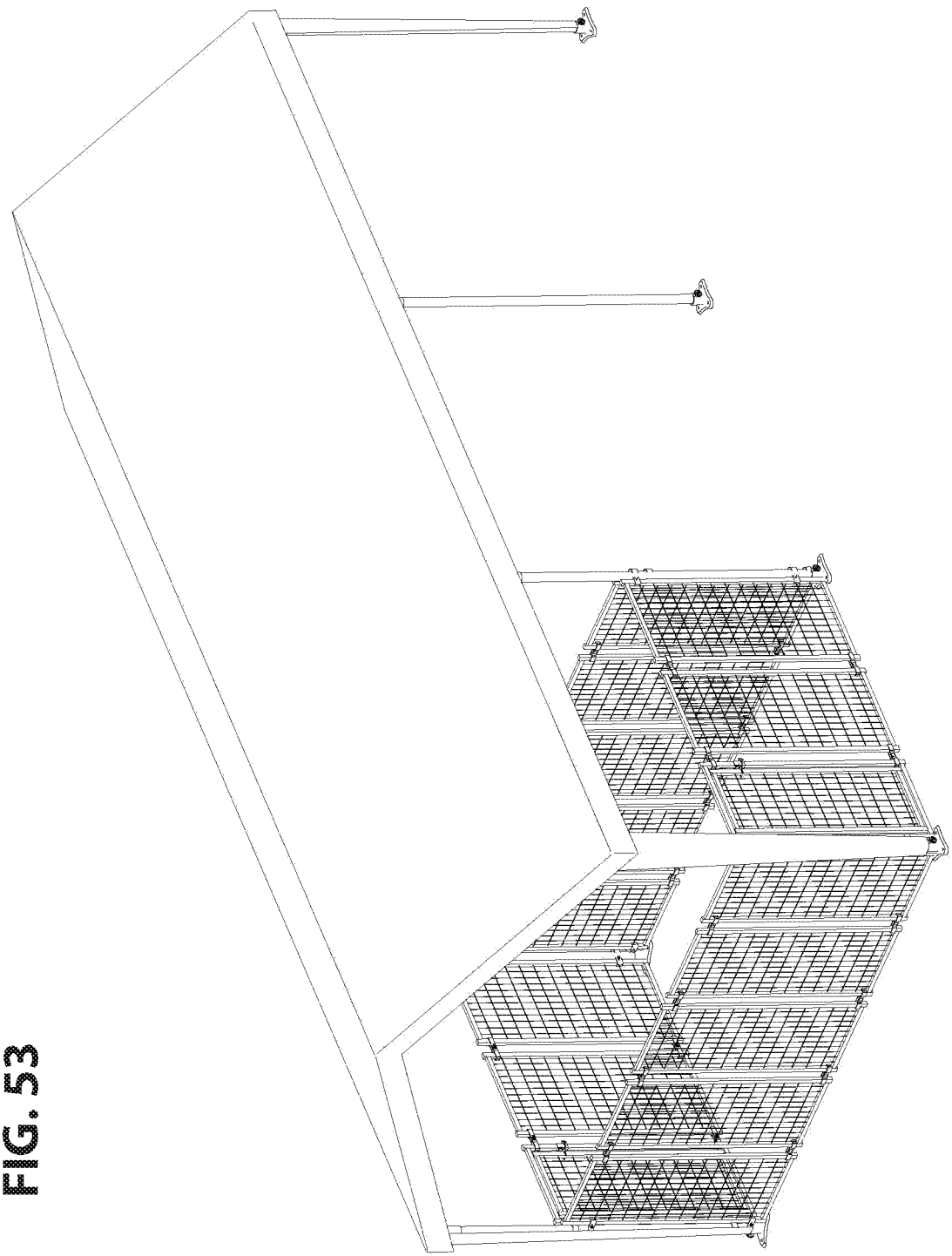
FIG. 53 illustrates a perspective view demonstrating the ten-device-in-one reconfigurable adjustable carport being configured as a full canopy with covered kennel.
Figure 54:
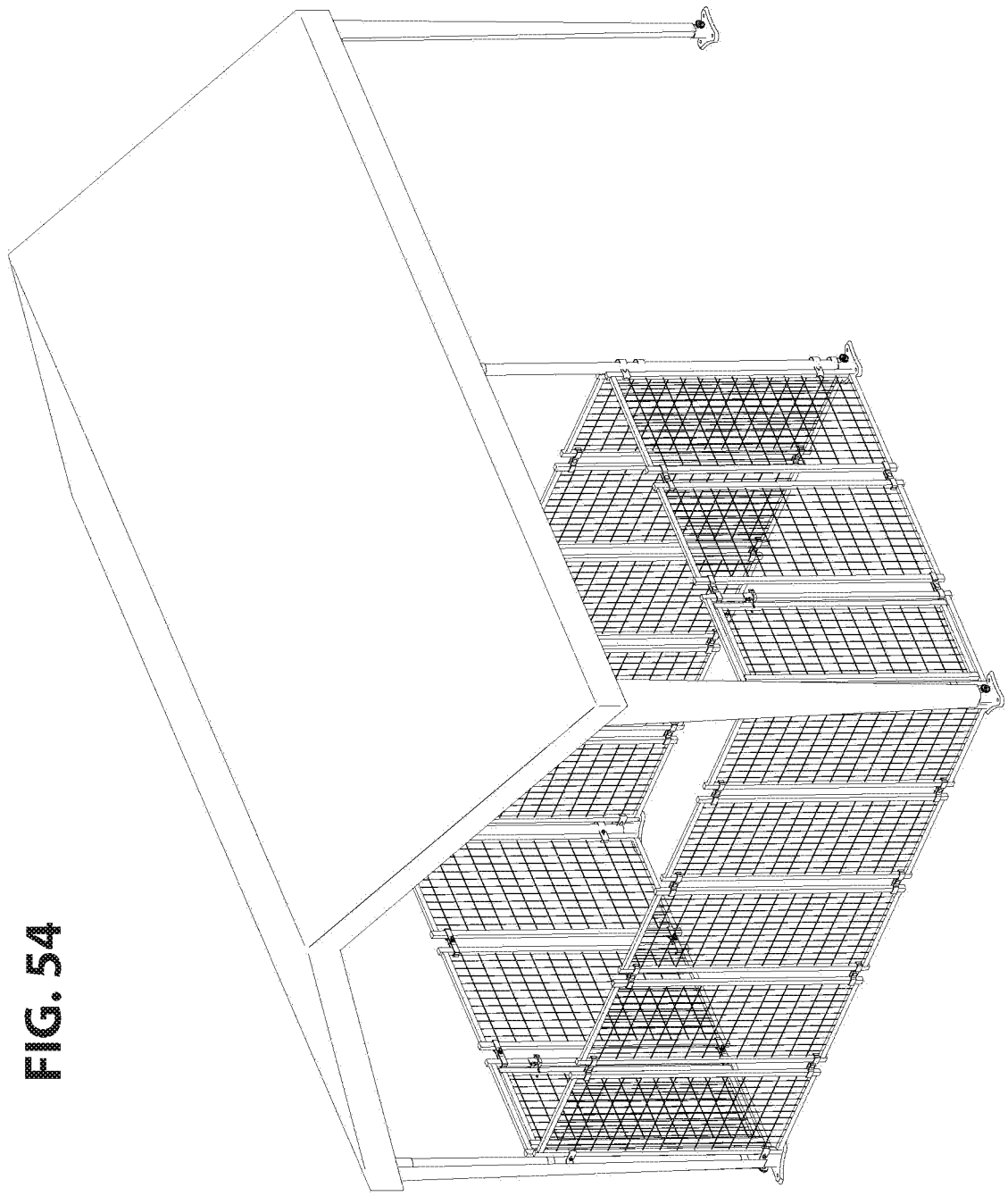
FIG. 54 illustrates a perspective view demonstrating the ten-device-in-one reconfigurable adjustable carport being configured as a shorter canopy with covered kennel.
Figure 55:
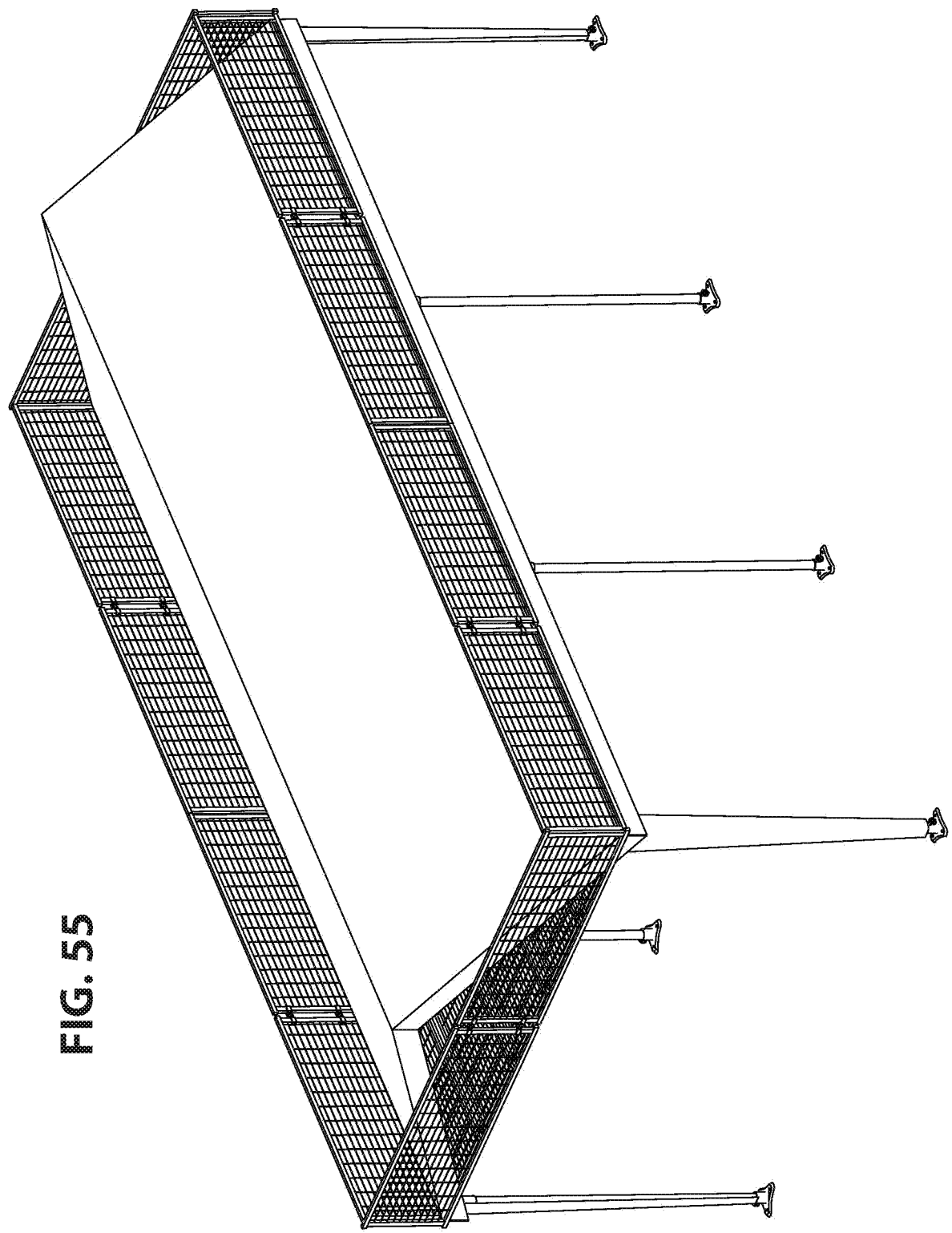
FIG. 55 illustrates a perspective view demonstrating the ten-device-in-one reconfigurable adjustable carport being configured as a canopy with canopy-sized storage atop.
Figure 57:
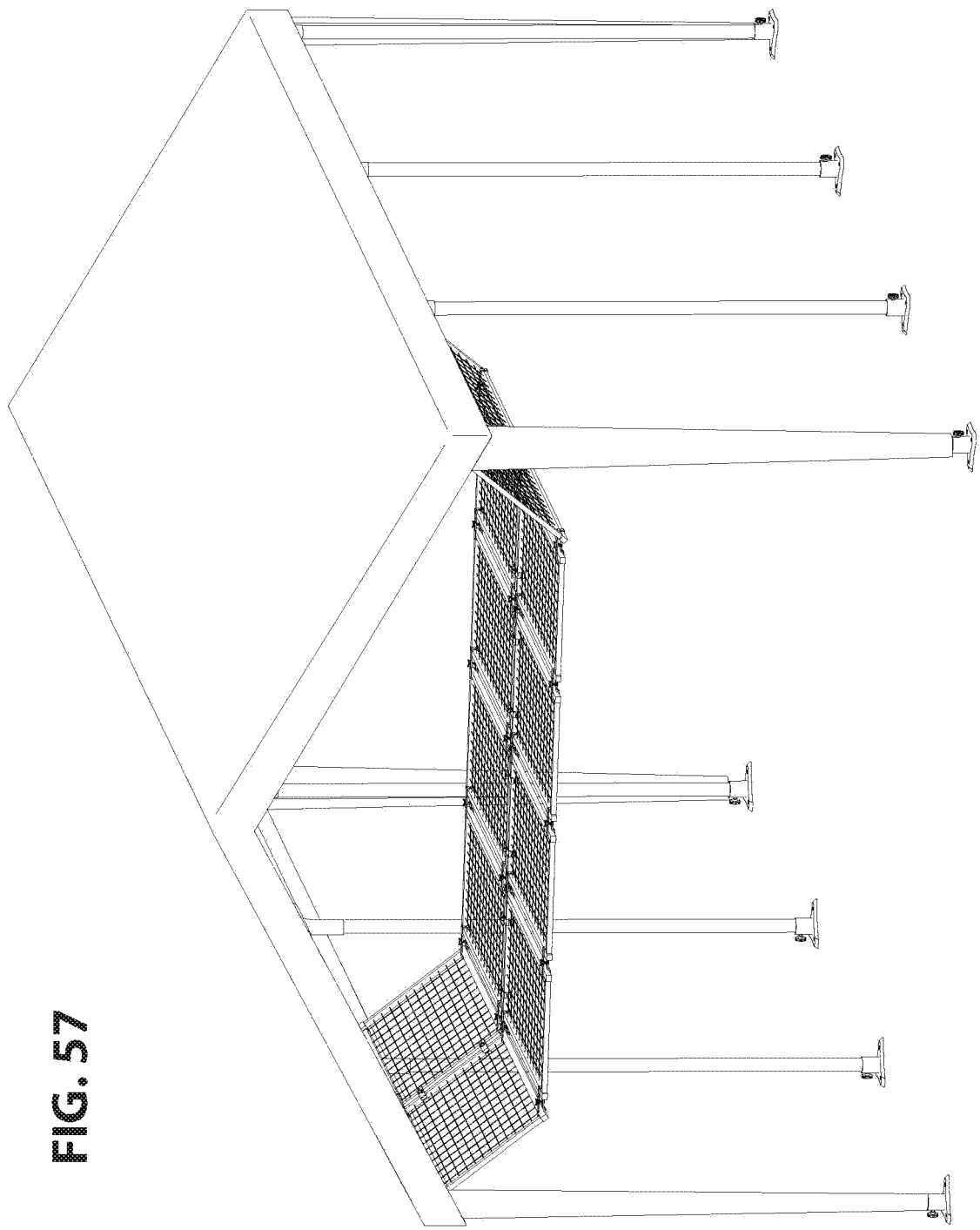
FIG. 57 illustrates a perspective view demonstrating the ten-device-in-one reconfigurable adjustable carport being configured as a canopy with a hanging attic.
Figure 58:
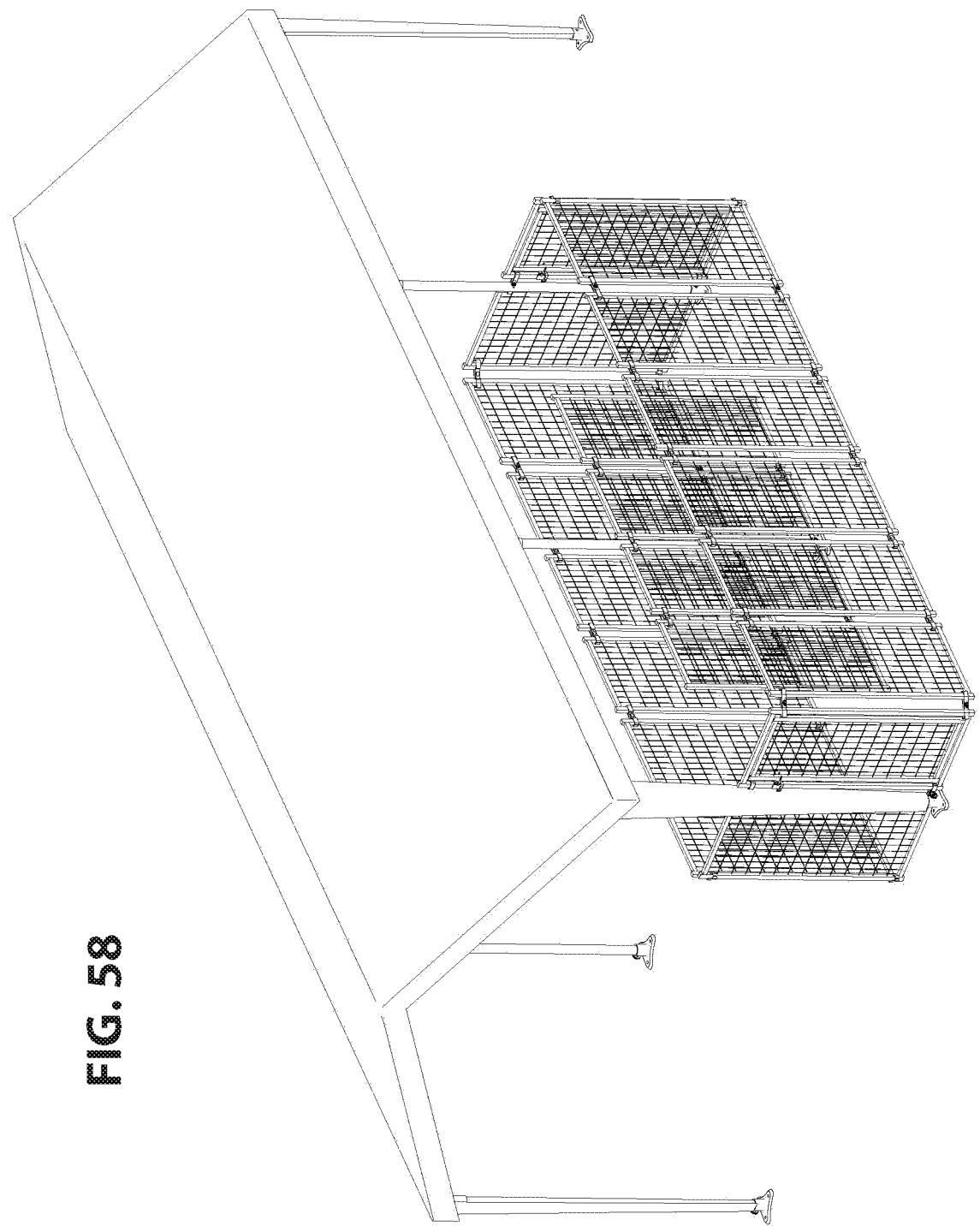
FIG. 58 illustrates a perspective view demonstrating the ten-device-in-one reconfigurable adjustable carport being configured as a canopy with dog run.
Figure 59:
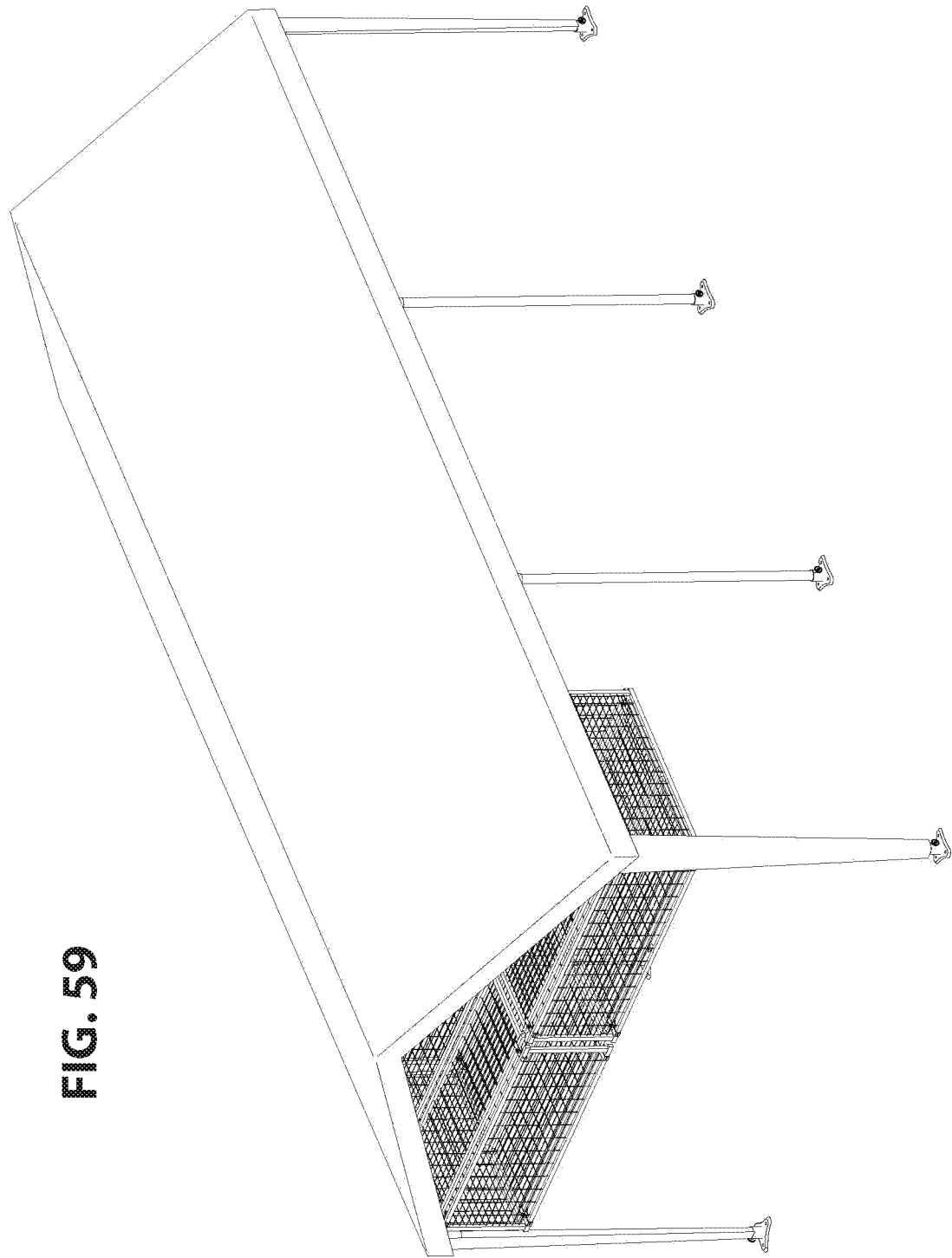
FIG. 59 illustrates a perspective view demonstrating the ten-device-in-one reconfigurable adjustable carport being configured as a canopy with a hanging cage.
Figure 60:
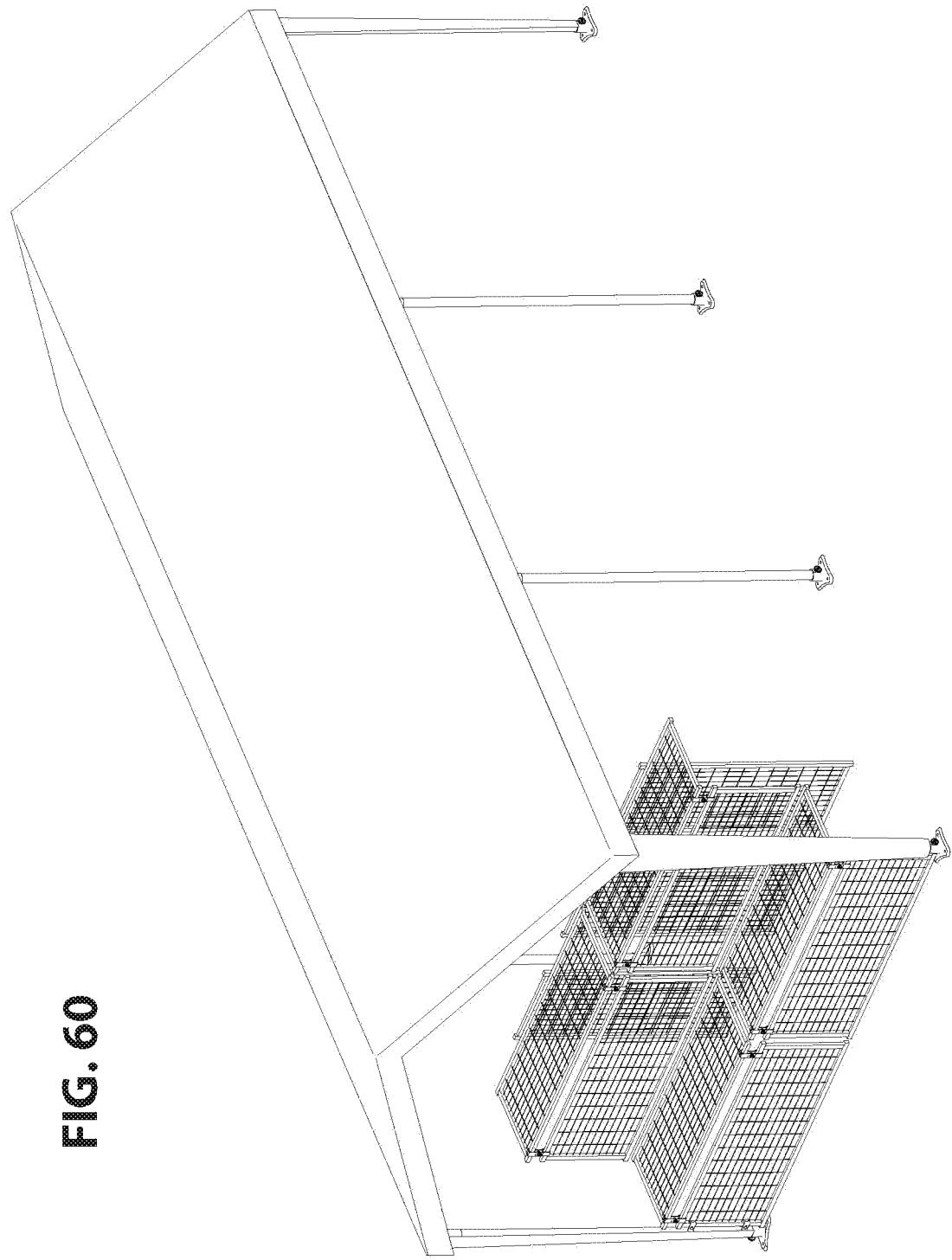
FIG. 60 illustrates a perspective view demonstrating the ten-device-in-one reconfigurable adjustable carport being configured as a canopy with shelves.
Figure 61:
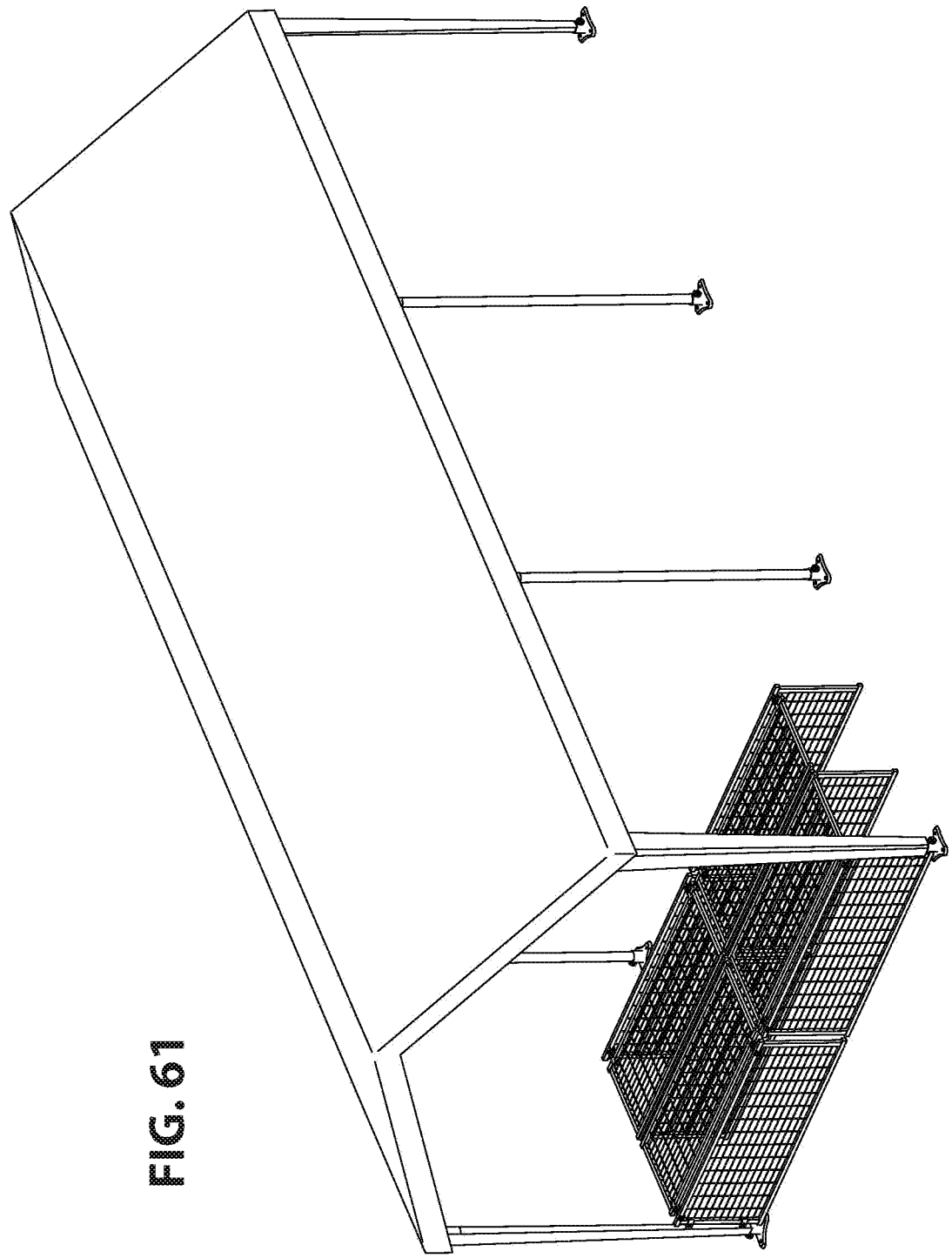
FIG. 61 illustrates a perspective view demonstrating the ten-device-in-one reconfigurable adjustable carport being configured canopy with a table.
Figure 62:
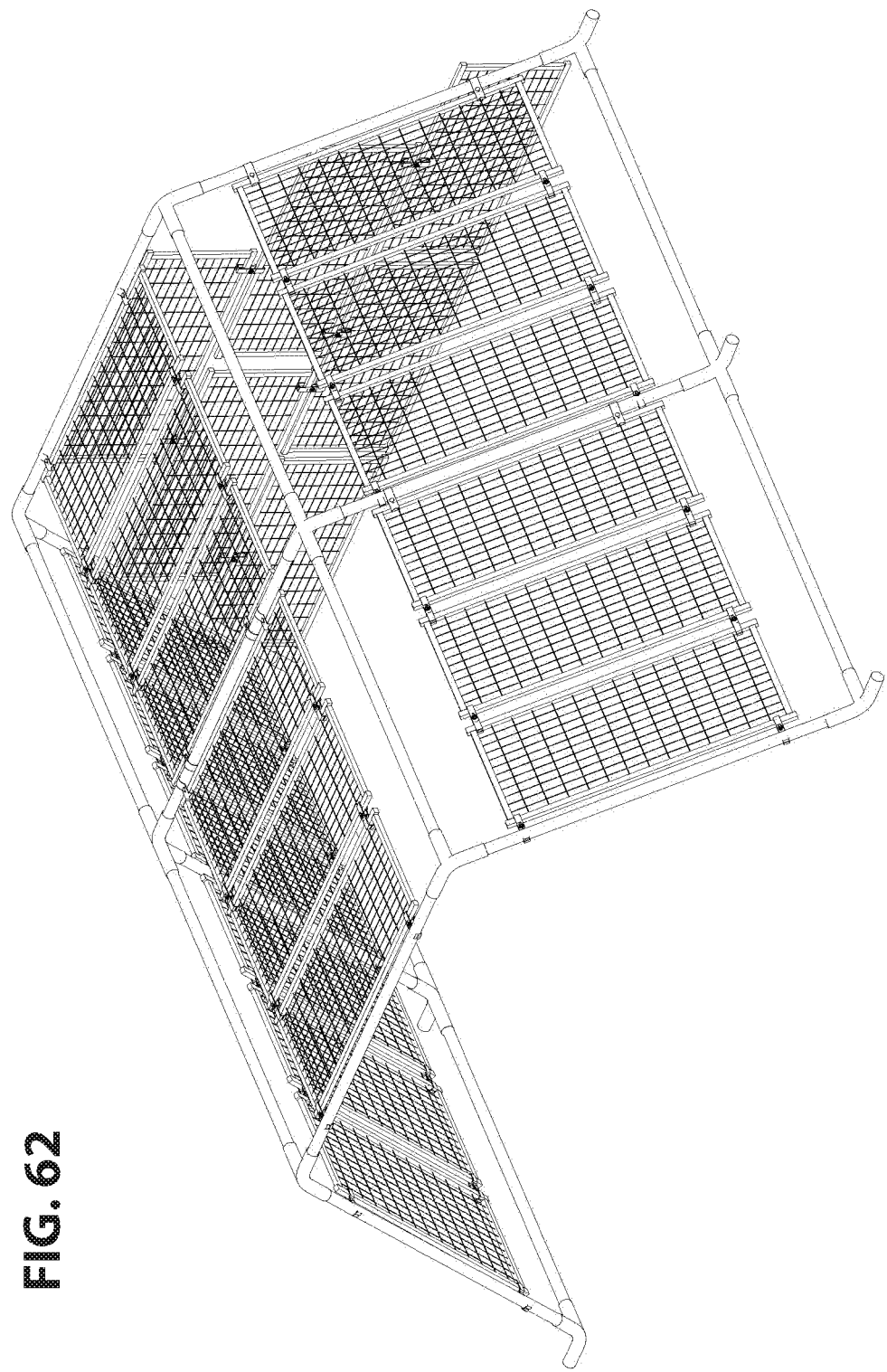
FIG. 62 illustrates a perspective view demonstrating the ten-device-in-one reconfigurable adjustable carport being configured as a cabana.
Figure 63:
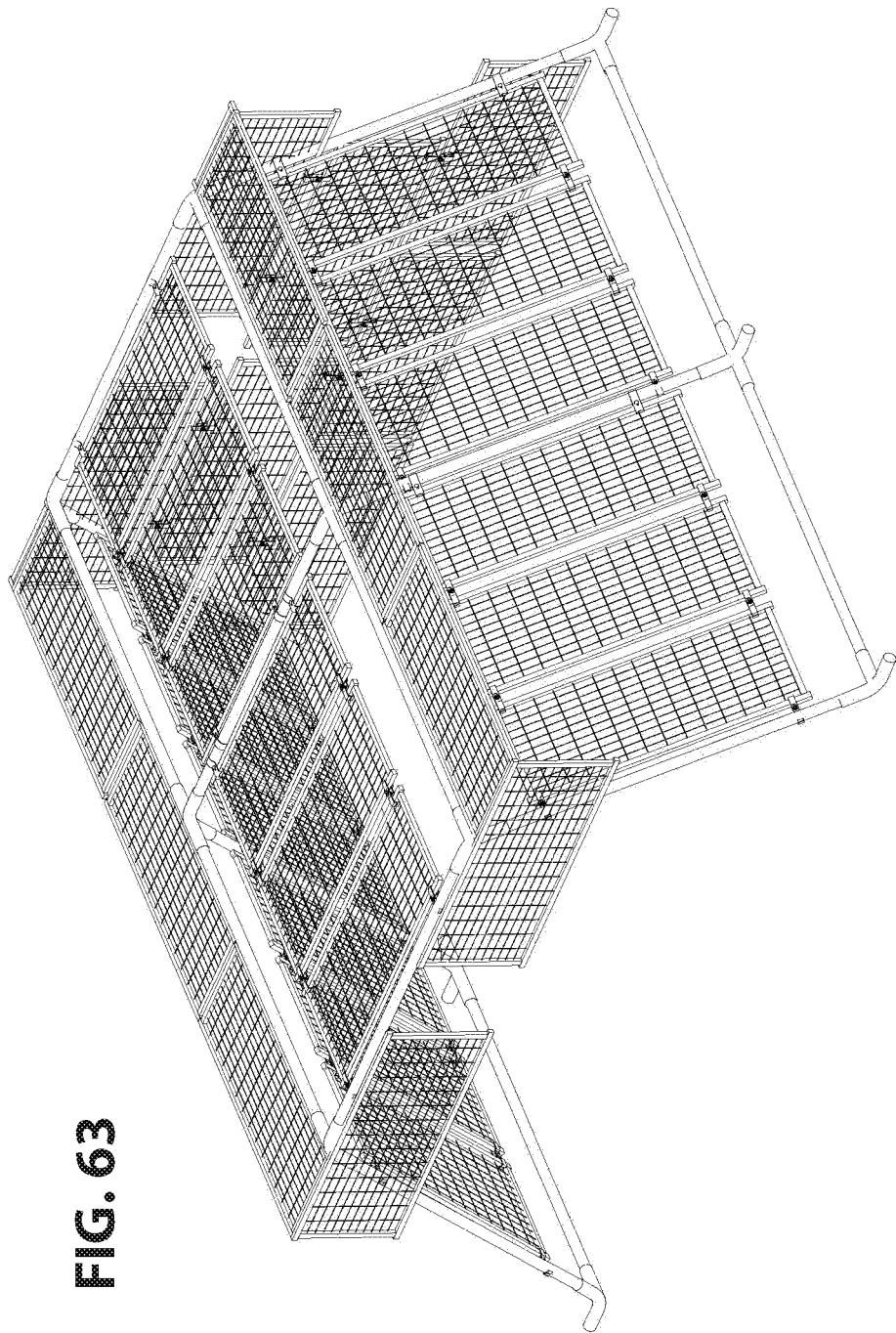
FIG. 63 illustrates a perspective view demonstrating the ten-device-in-one reconfigurable adjustable carport being configured as a cabana with roof storage.
Figure 64:
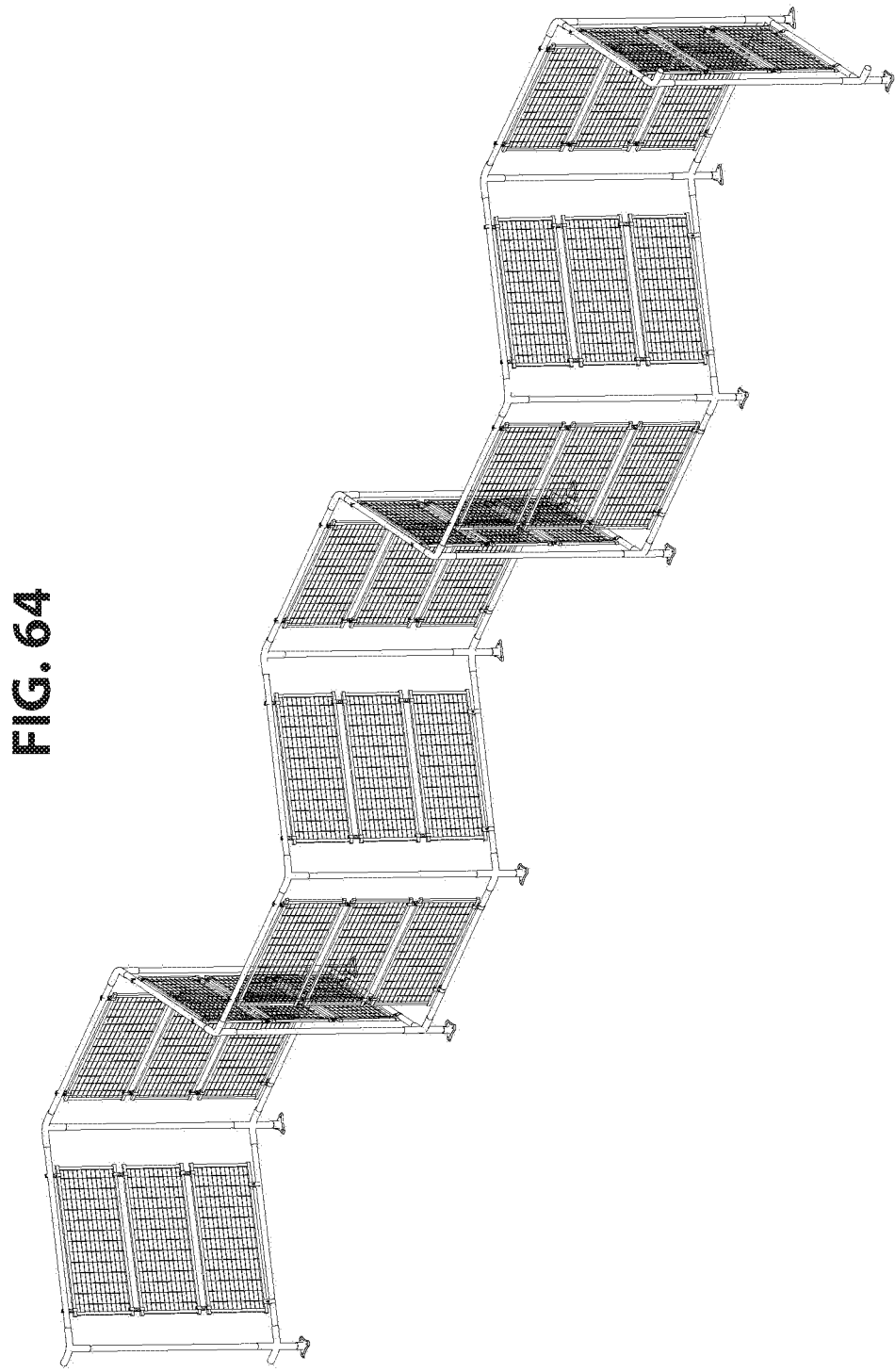
FIG. 64 illustrates a perspective view demonstrating the ten-device-in-one reconfigurable adjustable carport being configured as a wind barrier.
Figure 65:
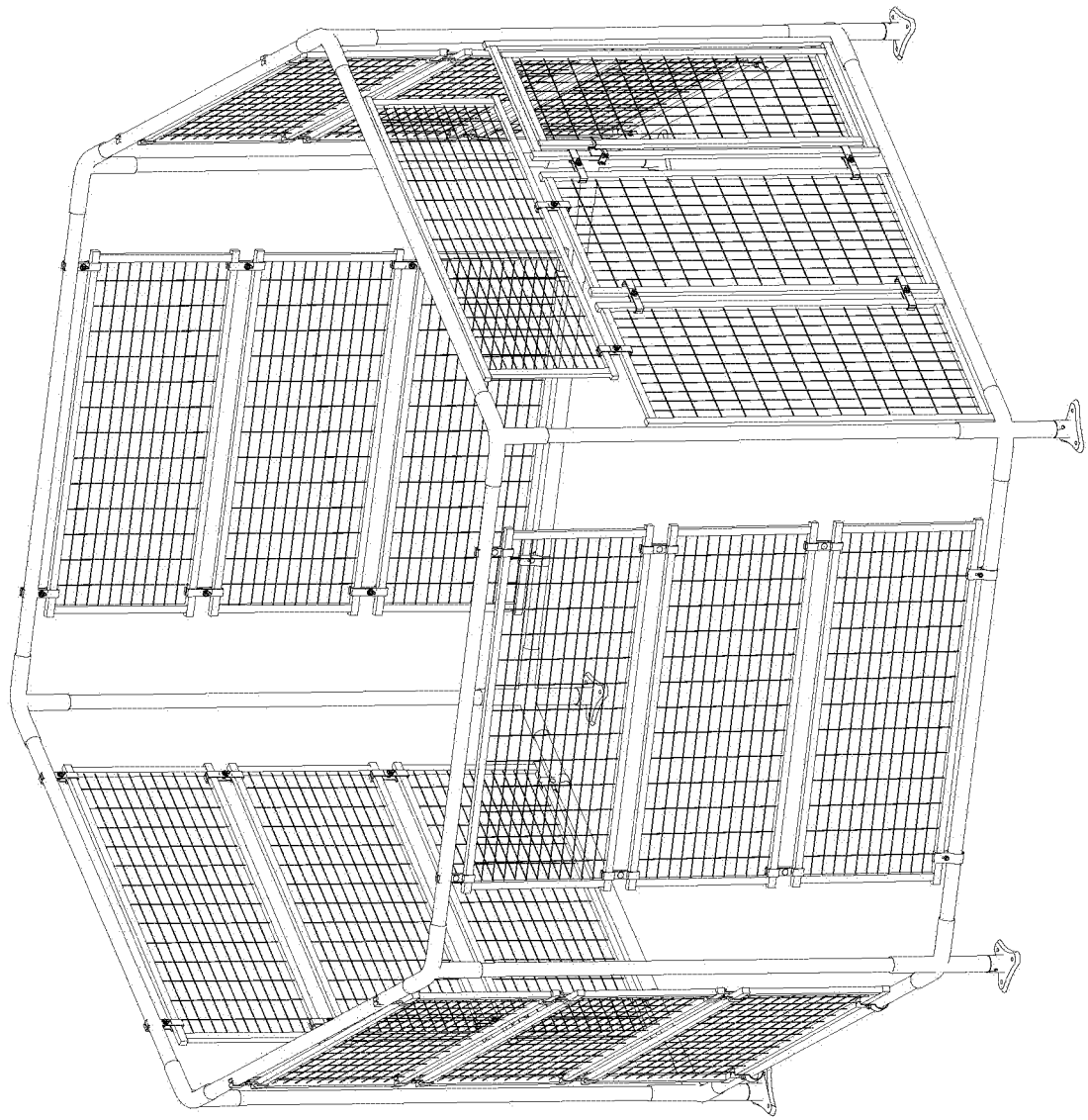
FIG. 65 illustrates a perspective view demonstrating the ten-device-in-one reconfigurable adjustable carport being configured as a privacy room.
Figure 66:
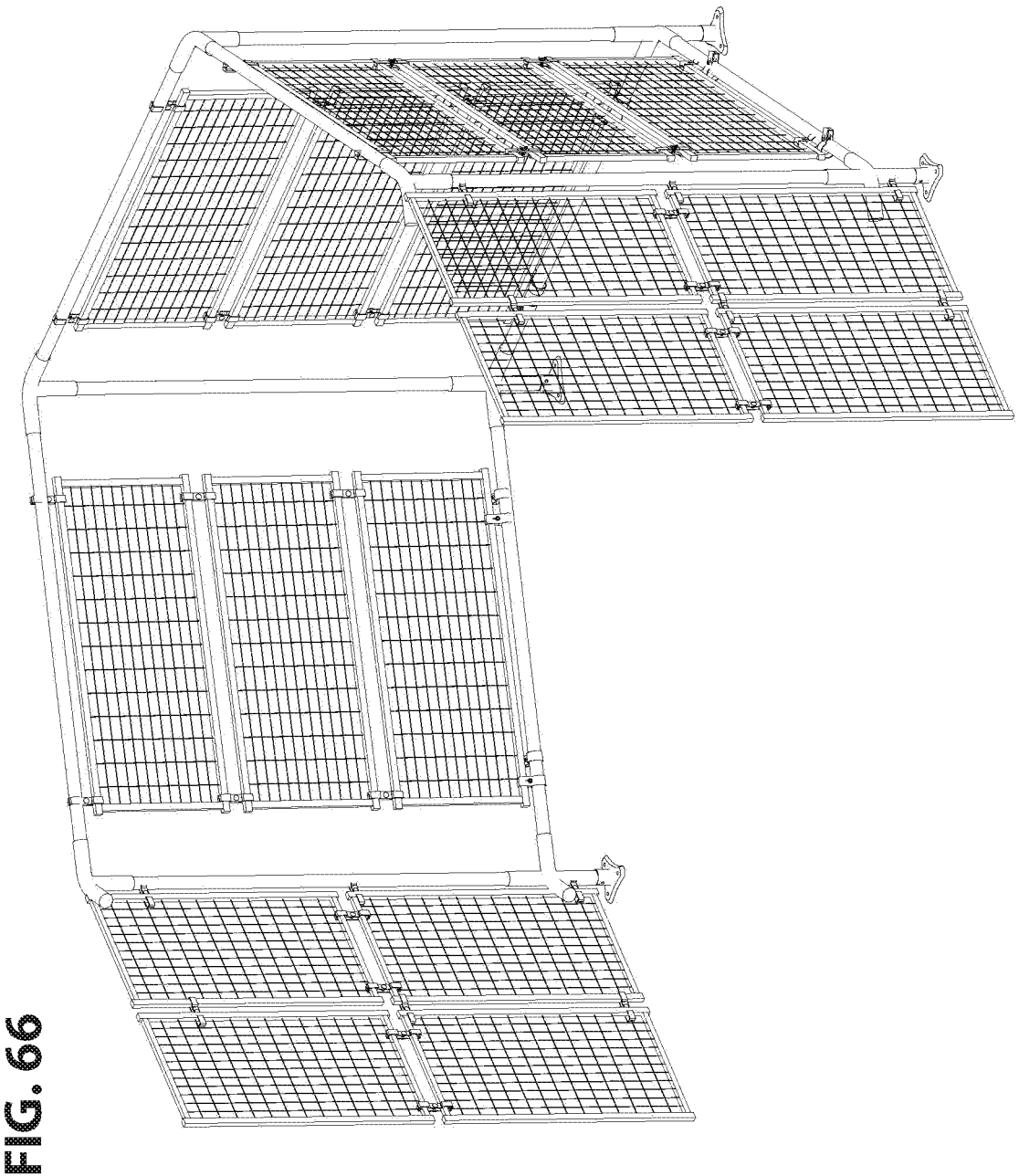
FIG. 66 illustrates a perspective view demonstrating the ten-device-in-one reconfigurable adjustable carport being configured as a privacy screen or tradeshow booth.
Figure 68:
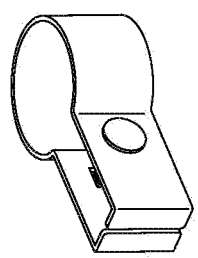
FIG. 67, FIG. 68, FIG. 69, FIG. 70, and FIG. 71 illustrate perspective views showing variations of multi-configurable panel-to-post-securing gap-controlling self-centering brackets 129.
Figure 71:
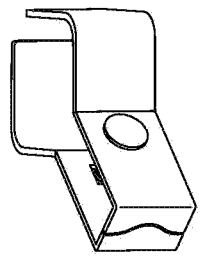
Figure 70:
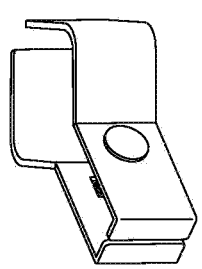
Figure 69:
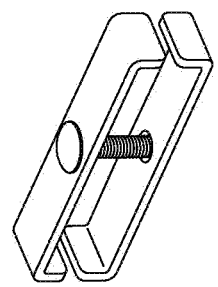

22) Multi-configurable kennel cabana wind-barrier privacy-screen privacy-room dog-run shelf attic cage table sign panel system 122 is (or are respectively) for performing the combined functions of its components 23) Multi-configurable panel 123 is (or are respectively) for:
   a) Providing a modular building options for multi-configurable multi-function articulated canopy frame system 109;
   b) Being configured as a dog run
      (see FIG. 4 and FIG. 58);
   c) Being configured as a greenhouse
      (see FIG. 7 and FIG. 62);
   d) Being configured as an enclosure
      (see FIG. 10 and FIG. 65);
   e) Being configured as a barrier
      (see FIG. 9 and FIG. 64);
   f) Being configured as bleacher shelves to store or display items
      (see FIG. 5 and FIG. 60);
   g) Being configured as an attic to store items off the ground
      (see FIG. 3 and FIG. 57);
   h) Being configured as a hanging cage to house animals off the ground
      (see FIG. 2 and FIG. 56);
   i) Being configured as a table
      (see FIG. 6 and FIG. 61);
   j) Being configured as structures for displaying signs
      (see FIG. 1 and FIG. 52); and
   k) Being configured for roof storage
      (see FIG. 1 and FIG. 52).

24) Multi-configurable door frame panel 124 is (or are respectively) for:
   Providing a frame to attach lockable door 126.

25) Door hinge-pins 125 is (or are respectively) for:
   Providing a location for lockable door 126 to pivot.

26) Lockable door 126 is (or are respectively) for:
   Providing a closable and lockable method of securing multi-configurable kennel cabana wind-barrier privacy-screen privacy-room dog-run shelf attic cage table sign panel system 122.

27) Automatic locking door latch 127 is (or are respectively) for:
   Locking and latching lockable door 126.

28) Multi-configurable panel-to-panel-securing gap-controlling brackets 128 is (or are respectively) for:
   a) Connecting one or more multi-configurable panel 123 and/or multi-configurable door frame panel 124 together;
   b) Being configured as a dog run
      (see FIG. 4 and FIG. 58);
   c) Being configured as a greenhouse
      (see FIG. 7 and FIG. 62);
   d) Being configured as an enclosure
      (see FIG. 10 and FIG. 65);
   e) Being configured as a barrier
      (see FIG. 9 and FIG. 64);
   f) Being configured as bleacher shelves to store or display items
      (see FIG. 5 and FIG. 60);
   g) Being configured as an attic to store items off the ground
      (see FIG. 3 and FIG. 57);
   h) Being configured as a hanging cage to house animals off the ground
      (see FIG. 2 and FIG. 56);
   i) Being configured as a table
      (see FIG. 6 and FIG. 61);
   j) Being configured as structures for displaying signs
      (see FIG. 1 and FIG. 52); and
   k) Being configured for roof storage
      (see FIG. 1 and FIG. 52).

29) Multi-configurable panel-to-post-securing gap-controlling self-centering brackets 129 is (or are respectively) for:
   a) Connecting at least one multi-configurable panel 123 and/or at least one multi-configurable door frame panel 124 to multi-configurable roof spines 114, multi-configurable roof ribs 115, and/or multi-configurable vertical leg posts 116 together;
   b) Being configured as a dog run
      (see FIG. 4 and FIG. 58);
   c) Being configured as a greenhouse
      (see FIG. 7 and FIG. 62);
   d) Being configured as an enclosure
      (see FIG. 10 and FIG. 65);
   e) Being configured as a barrier
      (see FIG. 9 and FIG. 64);
   f) Being configured as bleacher shelves to store or display items
      (see FIG. 5 and FIG. 60);
   g) Being configured as an attic to store items off the ground
      (see FIG. 3 and FIG. 57);
   h) Being configured as a hanging cage to house animals off the ground
      (see FIG. 2 and FIG. 56);
   i) Being configured as a table
      (see FIG. 6 and FIG. 61);
   j) Being configured as structures for displaying signs
      (see FIG. 1 and FIG. 52); and
   k) Being configured for roof storage
      (see FIG. 1 and FIG. 52).

30) Post-securing gap-controlling nipples 130 is (or are respectively) for:
   Creating a controlled separation gap between multi-configurable panel 123 or multi-configurable door frame panel 124 and multi-configurable roof spines 114, multi-configurable roof ribs 115, or multi-configurable vertical leg posts 116.
31) Self-centering interlocking bracket heads 131 is (or are respectively) for:
Automatically centering bracket ends
in the directions of arrows 137, 138, 139, 140, and 141 (see FIG. 46 and FIG. 47).
32) Bracket-securing bolts 132 is (or are respectively) for:
Clamping multi-configurable panel-to-post-securing gap-controlling self-centering brackets 129 securely.
33) Bracket-securing nuts 133 is (or are respectively) for:
Threadedly attaching to bracket-securing bolts 132.

Variation

Figure 72:
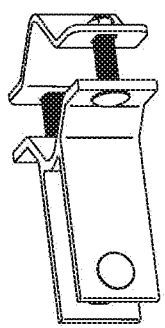
FIG. 72 illustrates a perspective view of a variation of multi-configurable panel-to-panel-securing gap-controlling brackets 128.
Figure 67:
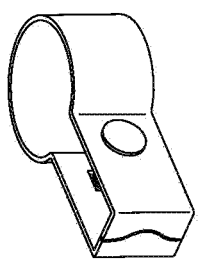
Figure 73:
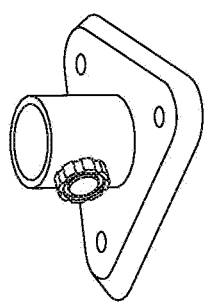
FIG. 73 illustrates a perspective view of a variation of triple-anchorable feet 118.

Any component of the ten-device-in-one reconfigurable adjustable carport can have any shape and size. Any component of the ten-device-in-one reconfigurable adjustable carport can be made of any material(s). FIG. 61, FIG. 62, FIG. 63, FIG. 64, FIG. 65, and FIG. 66 illustrate perspective views of variations of the ten-device-in-one reconfigurable adjustable carport. FIG. 67, FIG. 68, FIG. 69, FIG. 70, and FIG. 71 illustrate perspective views of variations of multi-configurable panel-to-post-securing gap-controlling self-centering brackets 129. FIG. 72 illustrates a perspective view of a variation of multi-configurable panel-to-panel-securing gap-controlling brackets 128. FIG. 73 illustrates a perspective view of a variation of triple-anchorable feet 118.

Major Advantages of the Invention

The new invention substantially departs from the conventional concepts and designs of the prior art. In doing so, the new invention provides (a or an) ten-device-in-one reconfigurable adjustable carport (capable of functioning as a privacy screen, a wind screen, a cabana, a dog run, a retail-tradeshow booth, an attic, a storage, a picnic table, a kennel, and a carport) having many unique and significant features, functions, and advantages, which overcome all the disadvantages of the prior art, as follows:
1) It is an object of the new invention to provide (a or an) ten-device-in-one reconfigurable adjustable carport, having
   multi-configurable T-shaped joiner 110.
   Therefore, the ten-device-in-one reconfigurable adjustable carport is (or are each):
   a) Capable of connecting multi-configurable roof spines 114, multi-configurable roof ribs 115, and/or multi-configurable vertical leg posts 116 together;
   b) Capable of being configured as a car canopy (see FIG. 16);
   c) Capable of being configured as a greenhouse (see FIG. 7 and FIG. 62);
   d) Capable of being configured as an enclosure (see FIG. 10 and FIG. 65);
   e) Capable of being configured as a barrier (see FIG. 9 and FIG. 64);
   f) Capable of being configured as a cabana (see FIG. 7, FIG. 8, FIG. 62, and FIG. 63);
   g) Capable of being configured as a privacy room (see FIG. 10 and FIG. 65);
   h) Capable of being configured as a privacy screen (see FIG. 11 and FIG. 66);
   i) Capable of being configured as a tradeshow booth (see FIG. 11 and FIG. 66); and
   j) Capable of being configured as a wind barrier (see FIG. 9 and FIG. 64).
2) It is another object of the new invention to provide (a or an) ten-device-in-one reconfigurable adjustable carport, having
   multi-configurable X-shaped joiner 111.
   Therefore, the ten-device-in-one reconfigurable adjustable carport is (or are each):
   a) Capable of connecting multi-configurable roof spines 114, multi-configurable roof ribs 115, and/or multi-configurable vertical leg posts 116 together;
   b) Capable of being configured as a car canopy (see FIG. 16);
   c) Capable of being configured as a greenhouse (see FIG. 7 and FIG. 62);
   d) Capable of being configured as an enclosure (see FIG. 10 and FIG. 65);
   e) Capable of being configured as a barrier (see FIG. 9 and FIG. 64);
   f) Capable of being configured as a cabana (see FIG. 7, FIG. 8, FIG. 62, and FIG. 63);
   g) Capable of being configured as a privacy room (see FIG. 10 and FIG. 65);
   h) Capable of being configured as a privacy screen (see FIG. 11 and FIG. 66);
   i) Capable of being configured as a tradeshow booth (see FIG. 11 and FIG. 66); and
   j) Capable of being configured as a wind barrier (see FIG. 9 and FIG. 64).
3) It is still another object of the new invention to provide (a or an) ten-device-in-one reconfigurable adjustable carport, having
   multi-configurable roof spines 114.
   Therefore, the ten-device-in-one reconfigurable adjustable carport is (or are each):
   a) Capable of being Configured as a car canopy (see FIG. 16);
   b) Capable of being configured as a greenhouse (see FIG. 7 and FIG. 62);
   c) Capable of being configured as an enclosure (see FIG. 10 and FIG. 65);
   d) Capable of being configured as a barrier (see FIG. 9 and FIG. 64);
   e) Capable of being configured as a shed (see FIG. 13, FIG. 14, and FIG. 15);
   f) Capable of being configured as a cabana (see FIG. 7, FIG. 8, FIG. 62, and FIG. 63);
   g) Capable of being configured as a privacy room (see FIG. 10 and FIG. 65);
   h) Capable of being configured as a privacy screen (see FIG. 11 and FIG. 66);
   i) Capable of being configured as a tradeshow booth (see FIG. 11 and FIG. 66);
   j) Capable of being configured as a wind barrier (see FIG. 9 and FIG. 64); and
   k) Capable of providing structure and strength to multi-configurable multi-function articulated canopy frame system 109.
4) It is yet still another object of the new invention to provide (a or an) ten-device-in-one reconfigurable adjustable carport, having
   multi-configurable roof ribs 115.
   Therefore, the ten-device-in-one reconfigurable adjustable carport is (or are each):
   a) Capable of being configured as a car canopy (see FIG. 16);
   b) Capable of being configured as a greenhouse (see FIG. 7 and FIG. 62);

c) Capable of being configured as an enclosure
(see FIG. 10 and FIG. 65);
d) Capable of being configured as a barrier
(see FIG. 9 and FIG. 64);
e) Capable of being configured as a shed
(see FIG. 13, FIG. 14, and FIG. 15);
f) Capable of being configured as a cabana
(see FIG. 7, FIG. 8, FIG. 62, and FIG. 63);
g) Capable of being configured as a privacy room
(see FIG. 10 and FIG. 65);
h) Capable of being configured as a privacy screen
(see FIG. 11 and FIG. 66);
i) Capable of being configured as a tradeshow booth
(see FIG. 11 and FIG. 66);
j) Capable of being configured as a wind barrier
(see FIG. 9 and FIG. 64); and
k) Capable of providing structure and strength to multi-configurable multi-function articulated canopy frame system 109.

5) It is a further object of the new invention to provide (a or an) ten-device-in-one reconfigurable adjustable carport, having
multi-configurable vertical leg posts 116.
Therefore, the ten-device-in-one reconfigurable adjustable carport is (or are each):
a) Capable of being configured as a car canopy
(see FIG. 16);
b) Capable of being configured as a greenhouse
(see FIG. 7 and FIG. 62);
c) Capable of being configured as an enclosure
(see FIG. 10 and FIG. 65);
d) Capable of being configured as a barrier
(see FIG. 9 and FIG. 64);
e) Capable of being configured as a shed
(see FIG. 13, FIG. 14, and FIG. 15);
f) Capable of being configured as a cabana
(see FIG. 7, FIG. 8, FIG. 62, and FIG. 63);
g) Capable of being configured as a privacy room
(see FIG. 10 and FIG. 65);
h) Capable of being configured as a privacy screen
(see FIG. 11 and FIG. 66);
i) Capable of being configured as a tradeshow booth
(see FIG. 11 and FIG. 66);
j) Capable of being configured as a wind barrier
(see FIG. 9 and FIG. 64); and
k) Capable of providing structure and strength to multi-configurable multi-function articulated canopy frame system 109.

6) It is an even further object of the new invention to provide (a or an) ten-device-in-one reconfigurable adjustable carport, having
multi-configurable panel 123.
Therefore, the ten-device-in-one reconfigurable adjustable carport is (or are each):
a) Capable of providing a modular building options for multi-configurable multi-function articulated canopy frame system 109;
b) Capable of being configured as a dog run
(see FIG. 4 and FIG. 58);
c) Capable of being configured as a greenhouse
(see FIG. 7 and FIG. 62);
d) Capable of being configured as an enclosure
(see FIG. 10 and FIG. 65);
e) Capable of being configured as a barrier
(see FIG. 9 and FIG. 64);
f) Capable of being configured as bleacher shelves to store or display items
(see FIG. 5 and FIG. 60);
g) Capable of being configured as an attic to store items off the ground
(see FIG. 3 and FIG. 57);
h) Capable of being configured as a hanging cage to house animals off the ground
(see FIG. 2 and FIG. 56);
i) Capable of being configured as a table
(see FIG. 6 and FIG. 61);
j) Capable of being configured as structures for displaying signs
(see FIG. 1 and FIG. 52); and
k) Capable of being configured for roof storage
(see FIG. 1 and FIG. 52).

7) It is still an even further object of the new invention to provide (a or an) ten-device-in-one reconfigurable adjustable carport, having
multi-configurable panel-to-panel-securing gap-controlling brackets 128.
Therefore, the ten-device-in-one reconfigurable adjustable carport is (or are each):
a) Capable of connecting one or more multi-configurable panel 123 and/or multi-configurable door frame panel 124 together;
b) Capable of being configured as a dog run
(see FIG. 4 and FIG. 58);
c) Capable of being configured as a greenhouse
(see FIG. 7 and FIG. 62);
d) Capable of being configured as an enclosure
(see FIG. 10 and FIG. 65);
e) Capable of being configured as a barrier
(see FIG. 9 and FIG. 64);
f) Capable of being configured as bleacher shelves to store or display items
(see FIG. 5 and FIG. 60);
g) Capable of being configured as an attic to store items off the ground
(see FIG. 3 and FIG. 57);
h) Capable of being configured as a hanging cage to house animals off the ground
(see FIG. 2 and FIG. 56);
i) Capable of being configured as a table
(see FIG. 6 and FIG. 61);
j) Capable of being configured as structures for displaying signs
(see FIG. 1 and FIG. 52); and
k) Capable of being configured for roof storage
(see FIG. 1 and FIG. 52).

8) It is yet still an even further object of the new invention to provide (a or an) ten-device-in-one reconfigurable adjustable carport, having
multi-configurable panel-to-post-securing gap-controlling self-centering brackets 129.
Therefore, the ten-device-in-one reconfigurable adjustable carport is (or are each):
a) Capable of connecting at least one multi-configurable panel 123 and/or at least one multi-configurable door frame panel 124 to multi-configurable roof spines 114, multi-configurable roof ribs 115, and/or multi-configurable vertical leg posts 116 together;
b) Capable of being configured as a dog run
(see FIG. 4 and FIG. 58);
c) Capable of being configured as a greenhouse
(see FIG. 7 and FIG. 62);

d) Capable of being configured as an enclosure
(see FIG. 10 and FIG. 65);
e) Capable of being configured as a barrier
(see FIG. 9 and FIG. 64);
f) Capable of being configured as bleacher shelves to store or display items
(see FIG. 5 and FIG. 60);
g) Capable of being configured as an attic to store items off the ground
(see FIG. 3 and FIG. 57);
h) Capable of being configured as a hanging cage to house animals off the ground
(see FIG. 2 and FIG. 56);
i) Capable of being configured as a table
(see FIG. 6 and FIG. 61);
j) Capable of being configured as structures for displaying signs
(see FIG. 1 and FIG. 52); and
k) Capable of being configured for roof storage
(see FIG. 1 and FIG. 52).

What is claimed is:

1. A ten-device-in-one reconfigurable adjustable carport, capable of functioning as a privacy screen, a wind screen, a cabana, a dog run, a retail-tradeshow booth, an attic, a storage, a picnic table, a kennel, and a carport, comprising:
a reversible roof carport privacy-screen windscreen cabana canopy having a canopy surface;
a plurality of corner canopy-tension-adjusting frame-protecting louvers having a louver surface;
a plurality of corner canopy-tension adjusting hooks; a plurality of grommets;
a plurality of tension-locking springable cords;
a plurality of tension-securing ball-shaped hooks;
a plurality of multi-configurable T-shaped joiners having T-shaped joiner ends;
a plurality of multi-configurable X-shaped joiners having X-shaped joiner ends;
a plurality of automatic spring-locking buttons;
a plurality of automatic spring-securing holes;
a plurality of multi-configurable roof spines having roof-spine ends;
a plurality of multi-configurable roof ribs;
a plurality of multi-configurable vertical leg posts having vertical-leg-post bottom ends;
a plurality of corner canopy-tension-adjusting holes;
a plurality of triple-anchorable feet;
a plurality of threaded feet-securing hand screws;
a plurality of terrain-anchoring spike holes;
a plurality of terrain-anchoring spikes;
a plurality of multi-configurable panels,
a multi-configurable door frame panel;
a plurality of door hinge-pins;
a lockable door; an automatic locking door latch;
a plurality of multi-configurable panel-to-panel-securing gap-controlling brackets;
a plurality of multi-configurable panel-to-post-securing gap-controlling self-centering brackets having panel-to-post bracket ends;
a plurality of post-securing gap-controlling nipples;
a plurality of self-centering interlocking bracket heads having interlocking-bracket-head ends;
a plurality of bracket-securing bolts; and
a plurality of bracket-securing nuts, wherein:
said reversible roof carport privacy-screen windscreen cabana canopy is sewn to said corner canopy-tension-adjusting frame-protecting louvers for providing shelter from rain for occupants and belongings, and for providing shelter from sun for occupants and belongings,
said corner canopy-tension adjusting hooks are respectively sewn to said corner canopy-tension-adjusting frame-protecting louvers,
said grommets are respectively attached to said canopy surface of said reversible roof carport privacy-screen windscreen cabana canopy and to said louver surface of said corner canopy-tension-adjusting frame-protecting louvers,
each said tension-locking springable cord is elastically threaded through one said tension-securing ball-shaped hook,
each said tension-securing ball-shaped hook is attached to one said tension-locking springable cord,
said multi-configurable T-shaped joiners are spring-snappingly connected to said multi-configurable roof spines, said multi-configurable roof ribs, and/or said multi-configurable vertical leg posts for connecting said multi-configurable roof spines, said multi-configurable roof ribs, and/or said multi-configurable vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said multi-configurable X-shaped joiners are spring-snappingly connected to said multi-configurable roof spines, said multi-configurable roof ribs, and/or said multi-configurable vertical leg posts for connecting said multi-configurable roof spines, said multi-configurable roof ribs, and/or said multi-configurable vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said automatic spring-locking buttons are respectively springingly inserted within said multi-configurable roof spines, said multi-configurable roof ribs, and said multi-configurable vertical leg posts,
said automatic spring-securing holes are respectively drilled in said multi-configurable T-shaped joiners and said multi-configurable X-shaped joiners, said multi-configurable roof spines are respectively inserted on said T-shaped joiner ends of said multi-configurable T-shaped joiners or said X-shaped joiner ends of said multi-configurable X-shaped joiners, or inserted into said triple-anchorable feet
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, for being configured as a wind barrier, and
for providing structure and strength to said ten-device-in-one reconfigurable adjustable carport,
said multi-configurable roof ribs are respectively inserted on said T-shaped joiner ends of said multi-configurable T-shaped joiners or said X-shaped joiner ends of said multi-configurable X-shaped joiners, or inserted into said triple-anchorable feet
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one reconfigurable adjustable carport,
said multi-configurable vertical leg posts are respectively inserted on said T-shaped joiner ends of said multi-configurable T-shaped joiners or said X-shaped joiner ends of said multi-configurable X-shaped joiners, or inserted into said triple-anchorable feet for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one reconfigurable adjustable carport,
said corner canopy-tension-adjusting holes are respectively punched out of said multi-configurable vertical leg posts, said triple-anchorable feet are respectively inserted on said roof-spine ends of said multi-configurable roof spines, said multi-configurable roof ribs, or said multi-configurable vertical leg posts,
said threaded feet-securing hand screws are respectively inserted through said triple-anchorable feet and said vertical-leg-post bottom ends of said multi-configurable vertical leg posts,
said terrain-anchoring spike holes are respectively drilled into said triple-anchorable feet,
said terrain-anchoring spikes are respectively inserted through said terrain-anchoring spike holes,
said multi-configurable panels are respectively attached to said multi-configurable panel-to-panel-securing gap-controlling brackets or said multi-configurable panel-to-post-securing gap controlling self-centering brackets for providing modular building options for said ten-device-in-one reconfigurable adjustable carport,
for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table, for being configured as structures for displaying signs, and
for being configured for roof storage, said multi-configurable door frame panel is attached to said multi-configurable panel-to-panel-securing gap-controlling brackets or said multi-configurable panel-to-post-securing gap-controlling self-centering brackets,
said door hinge-pins is are respectively welded to said multi-configurable door frame panel,
said lockable door is swingingly attached to said door hinge-pins,
said automatic locking door latch is secured to said multi-configurable door frame panel,
said multi-configurable panel-to-panel-securing gap-controlling brackets are respectively bolted to said multi-configurable panels or said multi-configurable door frame panel for connecting one or more said multi-configurable panels or multi-configurable door frame panels together,
for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage,
said multi-configurable panel-to-post-securing gap-controlling self-centering brackets are respectively bolted to said multi-configurable panels, said multi-configurable door frame panel, said multi-configurable roof spines, said multi-configurable roof ribs, or said multi-configurable vertical leg posts for connecting one or more said multi-configurable panels or multi-configurable door frame panels together,
for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table, for being configured as structures for displaying signs, and
for being configured for roof storage,
said post-securing gap-controlling nipples are respectively stamped into said multi-configurable panel-to-post-securing gap-controlling self-centering brackets for creating a controlled-separation gap between said multi-configurable panel or said multi-configurable door frame panel and said multi-configurable roof spines, said multi-configurable roof ribs, or said multi-configurable vertical leg posts, said self-centering interlocking bracket heads are respectively formed into said panel-to-post bracket ends of said multi-configurable panel-to-post-securing gap-controlling self-centering brackets for automatically centering said interlocking-bracket-head ends, said bracket-securing bolts are respectively inserted through said multi-configurable panel-to-panel-securing gap-controlling brackets and said multi-configurable panel-to-post-securing gap-controlling self-centering brackets, said bracket-securing nuts are respectively threadedly attached to said bracket-securing bolts.

2. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said reversible roof carport privacy-screen windscreen cabana canopy is made of canvas material.

3. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said corner canopy-tension-adjusting frame-protecting louvers are each made of canvas material.

4. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1, wherein:
said multi-configurable T-shaped joiners are made of metallic material.

5. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1, wherein:
said multi-configurable X-shaped joiners are made of metallic material.

6. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said multi-configurable panels are each formed into a rectangle shape.

7. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said multi-configurable panel-to-post-securing gap-controlling self-centering brackets are each formed into a rectangle shape with a cylindrical end.

8. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said post-securing gap-controlling nipples are each formed into a dome shape.

9. The ten-device-in-one reconfigurable adjustable carport, capable of functioning as a privacy screen, a wind screen, a cabana, a dog run, a retail-tradeshow booth, an attic, a storage, a picnic table, a kennel, and a carport of claim 1,
wherein:
said self-centering interlocking bracket heads are each formed into a wavy split square shape.

10. A ten-device-in-one reconfigurable adjustable carport, comprising:
a reversible roof carport canopy;
a plurality of corner canopy louvers;
a plurality of multi-configurable T-shaped joiners having T-shaped joiner ends;
a plurality of multi-configurable X-shaped joiners having X-shaped joiner ends;
a plurality of multi-configurable roof spines;
a plurality of multi-configurable roof ribs;
a plurality of multi-configurable vertical leg posts;
a plurality of multi-configurable panels;
a multi-configurable door frame panel;
a lockable door;
a plurality of multi-configurable panel-to-panel-securing brackets;
a plurality of multi-configurable panel-to-post-securing brackets having panel-to-post bracket ends;
a plurality of post-securing nipples; and
a plurality of interlocking bracket heads having interlocking-bracket-head ends,
wherein: said reversible roof carport canopy is sewn to said corner canopy louvers, said multi-configurable T-shaped joiners are spring-snapingly connected to said multi-configurable roof spines, said multi-configurable roof ribs, and/or said multi-configurable vertical leg posts for connecting said multi-configurable roof spines, said multi-configurable roof ribs, and/or said multi-configurable vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said multi-configurable X-shaped joiners are spring-snapingly connected to said multi-configurable roof spines, said multi-configurable roof ribs, and/or said multi-configurable vertical leg posts for connecting said multi-configurable roof spines, said multi-configurable roof ribs, and/or said multi-configurable vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said multi-configurable roof spines are respectively inserted on said T-shaped joiner ends of said multi-configurable T-shaped joiners and/or said X-shaped joiner ends of said multi-configurable X-shaped joiners
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and for providing structure and strength to said ten-device-in-one reconfigurable adjustable carport, said multi-configurable roof ribs are respectively inserted on said T-shaped joiner ends of said multi-configurable T-shaped joiners and/or said X-shaped joiner ends of said multi-configurable X-shaped joiners for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one reconfigurable adjustable carport, said multi-configurable vertical leg posts are respectively inserted on said T-shaped joiner ends of said multi-configurable T-shaped joiners or said X-shaped joiner ends of said multi-configurable X-shaped joiners for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one reconfigurable adjustable carport, said multi-configurable panels are respectively attached to said multi-configurable panel-to-panel-securing brackets or said multi-configurable panel-to-post-securing brackets for providing modular building options for said ten-device-in-one reconfigurable adjustable carport, for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage, said multi-configurable door frame panel is attached to said multi-configurable panel-to-panel-securing brackets or said multi-configurable panel-to-post-securing brackets, said lockable door is swingingly attached to said door hinge-pins, said multi-configurable panel-to-panel-securing brackets are respectively bolted to said multi-configurable panels or said multi-configurable door frame panel for connecting one or more said multi-configurable panels or multi-configurable door frame panels together, for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage, said multi-configurable panel-to-post-securing brackets are respectively bolted to said multi-configurable panels, said multi-configurable door frame panel, said multi-configurable roof spines, said multi-configurable roof ribs, or said multi-configurable vertical leg posts for connecting one or more said multi-configurable panels or multi-configurable door frame panels together, for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage, said post-securing nipples are respectively stamped into said multi-configurable panel-to-post-securing brackets for creating a controlled-separation gap between said multi-configurable panel or said multi-configurable door frame panel and said multi-configurable roof spines, said multi-configurable roof ribs, or said multi-configurable vertical leg posts, said interlocking bracket heads are respectively formed into said panel-to-post bracket ends of said multi-configurable panel-to-post-securing brackets for automatically centering said interlocking-bracket-head ends.

11. The ten-device-in-one reconfigurable adjustable carport of claim 10,
wherein:
said reversible roof carport canopy is made of canvas material.

12. The ten-device-in-one reconfigurable adjustable carport of claim 10,
wherein:
said corner canopy louvers are each made of canvas material.

13. The ten-device-in-one reconfigurable adjustable carport of claim 10, wherein: said multi-configurable T-shaped joiners are made of metallic material.

14. The ten-device-in-one reconfigurable adjustable carport of claim 10, wherein: said multi-configurable X-shaped joiners are made of metallic material.

15. The ten-device-in-one reconfigurable adjustable carport of claim 10,
wherein:
said multi-configurable panels are each formed into a rectangle shape.

16. The ten-device-in-one reconfigurable adjustable carport of claim 10,
wherein:
said multi-configurable panel-to-post-securing brackets are each formed into a rectangle shape with a cylindrical end.

17. The ten-device-in-one reconfigurable adjustable carport of claim 10,
wherein:
said post-securing nipples are each formed into a dome shape.

18. The ten-device-in-one reconfigurable adjustable carport of claim 10,
wherein:
said interlocking bracket heads are each formed into a wavy split square shape.

19. A ten-device-in-one carport, comprising:
a canopy;
a plurality of canopy louvers;
a plurality of T-shaped joiners having T-shaped joiner ends;
a plurality of X-shaped joiners having X-shaped joiner ends;
a plurality of roof spines;
a plurality of roof ribs;
a plurality of vertical leg posts;
a plurality of panels;
a door frame panel;
a door;
a plurality of panel-to-panel-securing brackets;
a plurality of panel-to-post-securing brackets having panel-to-post bracket ends; and
a plurality of bracket heads having bracket-head ends, wherein:
said canopy is sewn to said canopy louvers,
said T-shaped joiners are spring-snapingly connected to said roof spines, said roof ribs, and/or said vertical leg posts for connecting said roof spines, said roof ribs, and/or said vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said X-shaped joiners are spring-snapingly connected to said roof spines, said roof ribs, and/or said vertical leg posts for connecting said roof spines, said roof ribs, and/or said vertical leg posts together,
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth, and
for being configured as a wind barrier,
said roof spines are respectively inserted on said t-shaped joiner ends of said T-shaped joiners or said X-shaped joiner ends of said X-shaped joiners, or inserted into said anchorable feet f
or being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one carport,
said roof ribs are respectively inserted on said T-shaped joiner ends of said T-shaped joiners or said X-shaped joiner ends of said X-shaped joiners, or inserted into said anchorable feet
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one carport,
said vertical leg posts are respectively inserted on said T-shaped joiner ends of said T-shaped joiners or said X-shaped joiner ends of said X-shaped joiners, or inserted into said anchorable feet
for being configured as a car canopy,
for being configured as a greenhouse,
for being configured as an enclosure,
for being configured as a barrier,
for being configured as a cabana,
for being configured as a privacy room,
for being configured as a privacy screen,
for being configured as a tradeshow booth,
for being configured as a wind barrier, and
for providing structure and strength to said ten-device-in-one carport,
said panels are respectively attached to said panel-to-panel-securing brackets or said panel-to-post-securing brackets for providing modular building options for said ten-device-in-one carport,
for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage,
said door frame panel is attached to said panel-to-panel-securing brackets or said panel-to-post-securing brackets,
said door is swingingly attached to said door hinge-pins,
said panel-to-panel-securing brackets are respectively bolted to said panels or said door frame panel for connecting one or more said panels or door frame panels together,
for being configured as a dog run,
for being configured as a greenhouse, for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage,
said panel-to-post-securing brackets are respectively bolted to said panels, said door frame panel, said roof spines, said roof ribs, or said vertical leg posts for connecting one or more said panels or door frame panels together,
for being configured as a dog run,
for being configured as a greenhouse,
for being configured as an enclosure,
for being configured as a barrier,
for being configured as bleacher shelves to store or display items,
for being configured as an attic to store items off the ground,
for being configured as a hanging cage to house animals off the ground,
for being configured as a table,
for being configured as structures for displaying signs, and
for being configured for roof storage,
said bracket heads are respectively formed into said panel-to-post bracket ends of said panel-to-post-securing brackets for automatically centering said bracket-head ends.

20. The ten-device-in-one carport of claim 19,
wherein:
said canopy is made of canvas material.

* * * * *